US012382269B2

(12) United States Patent
Cabanas et al.

(10) Patent No.: US 12,382,269 B2
(45) Date of Patent: Aug. 5, 2025

(54) FACILITATING A RESPONSE TO AN EMERGENCY USING AN EMERGENCY RESPONSE DEVICE

(71) Applicant: RapidSOS, Inc., New York, NY (US)

(72) Inventors: Jordi Cabanas, Brooklyn, NY (US); John Michael DiDonato, Wexford, PA (US); Lucas Richard Eager Leavitt, Forest Hills, NY (US); James Patrick Olejar, Fort Lauderdale, FL (US); Ethan Reid Roberts, Woodside, NY (US)

(73) Assignee: RapidSOS, Inc., New York, NY (US)

( * ) Notice: Subject to any disclaimer, the term of this patent is extended or adjusted under 35 U.S.C. 154(b) by 277 days.

(21) Appl. No.: 17/823,302

(22) Filed: Aug. 30, 2022

(65) Prior Publication Data
US 2023/0066525 A1 Mar. 2, 2023

Related U.S. Application Data

(60) Provisional application No. 63/238,603, filed on Aug. 30, 2021.

(51) Int. Cl.
*H04W 4/90* (2018.01)
*H04W 4/029* (2018.01)

(52) U.S. Cl.
CPC .............. *H04W 4/90* (2018.02); *H04W 4/029* (2018.02)

(58) Field of Classification Search
CPC ..... H04W 4/90; H04W 4/029; H04M 1/72418
USPC ......................................................... 455/404.1
See application file for complete search history.

(56) References Cited

U.S. PATENT DOCUMENTS

| | | | |
|---|---|---|---|
| 11,330,104 B1* | 5/2022 | Pappas | H04L 65/1069 |
| 11,368,586 B2* | 6/2022 | Lindenau | G06Q 50/265 |
| 2005/0209770 A1* | 9/2005 | O'Neill | G08B 27/001 |
| | | | 701/411 |
| 2007/0061393 A1* | 3/2007 | Moore | H04L 67/02 |
| | | | 709/201 |
| 2014/0368601 A1* | 12/2014 | deCharms | H04N 7/148 |
| | | | 348/14.02 |

\* cited by examiner

*Primary Examiner* — Maria El-Zoobi
(74) *Attorney, Agent, or Firm* — Sterne, Kessler, Goldstein & Fox P.L.L.C.

(57) ABSTRACT

Disclosed herein are systems, devices, media, and methods for facilitating and/or managing emergency response. An emergency response data platform (ERDP) may receive emergency information that indicates a type of an emergency and a location associated with the emergency. Based on the type of the emergency, the location associated with the emergency, and an indication of an emergency response service provided by a user of an emergency response device, the EDRP may cause a first user interface of an emergency management application to display a notification of the emergency on the emergency response device. Based on an indication of a current location of the emergency response device, the EDRP may cause a second user interface of the emergency management application to display a notification indicating that the emergency response device is en route to the location associated with the emergency on a user device.

21 Claims, 21 Drawing Sheets

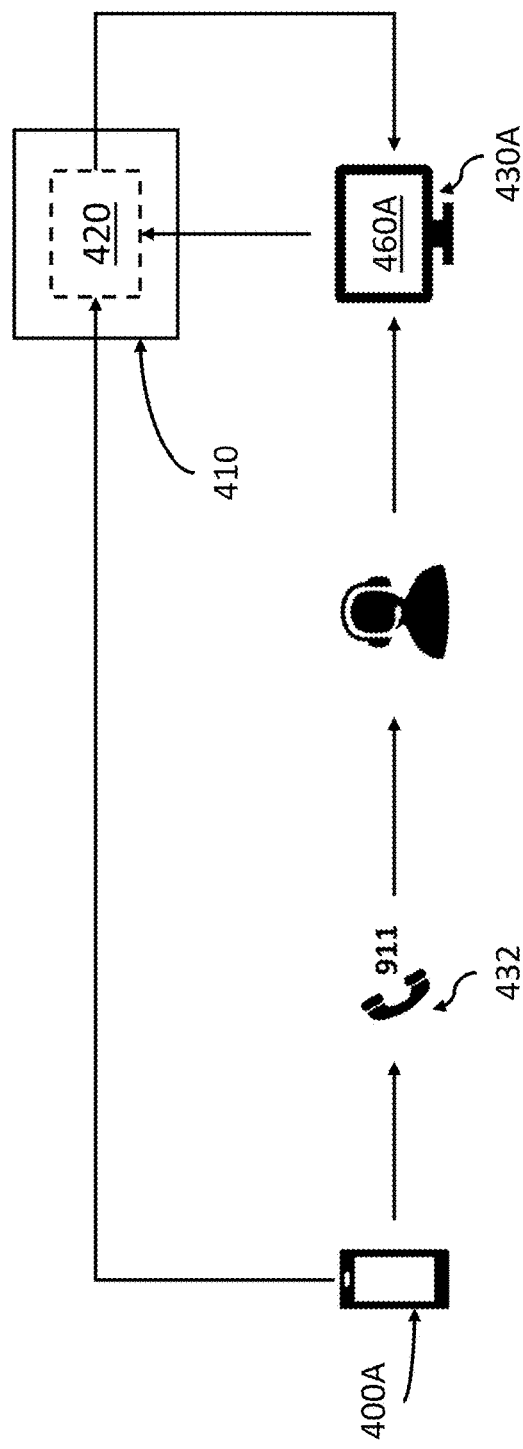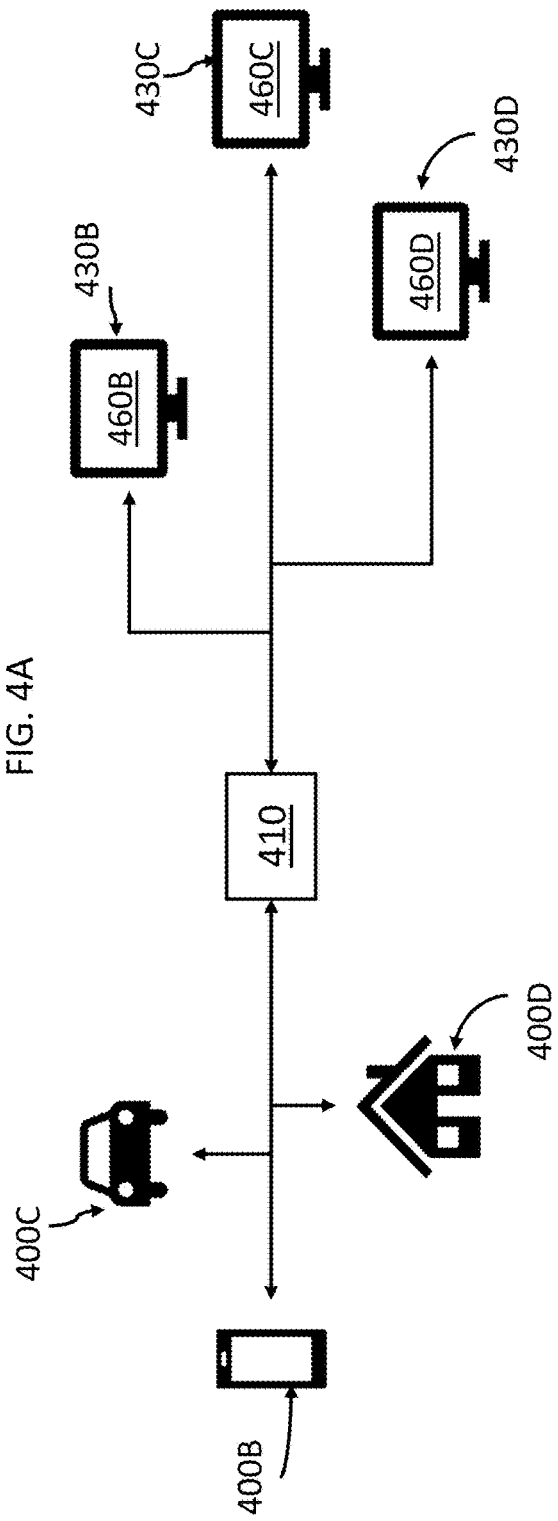

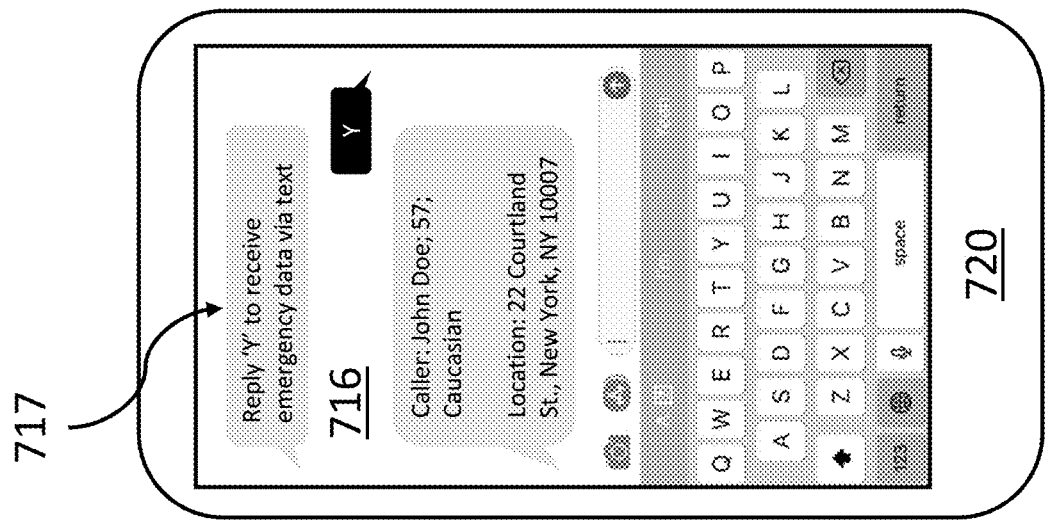
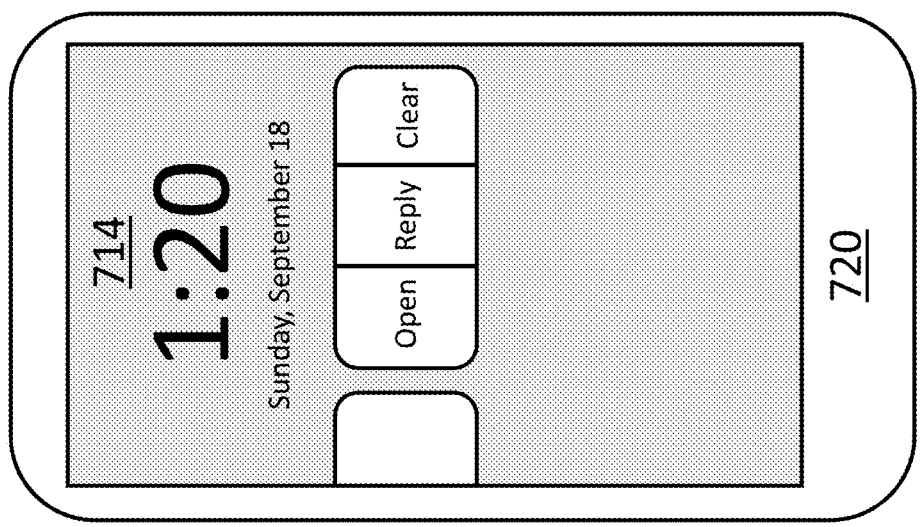
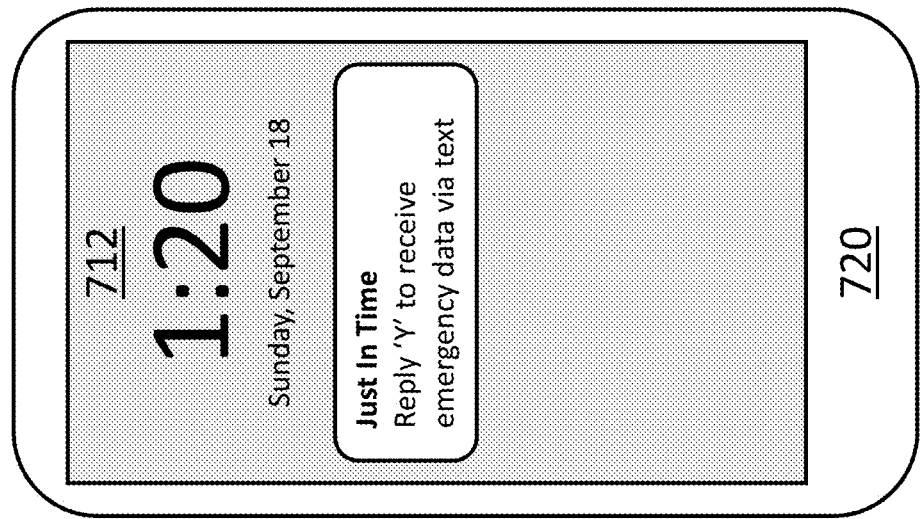
FIG. 7B

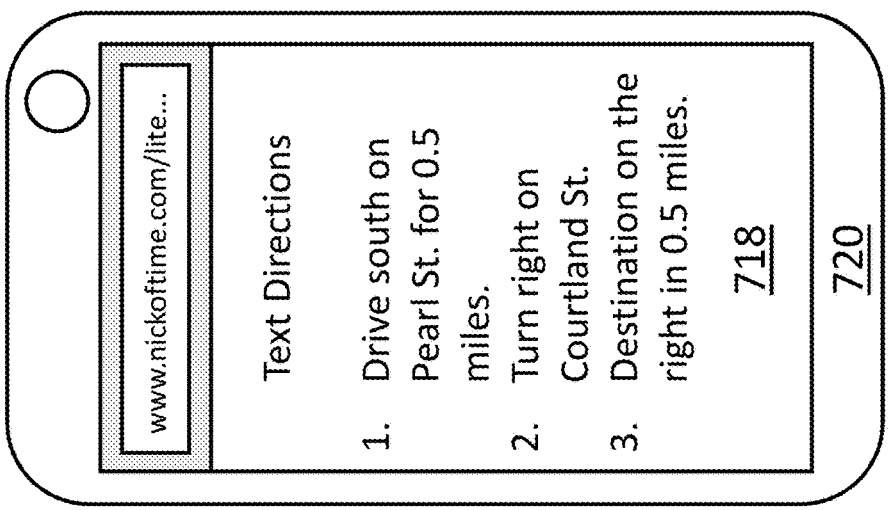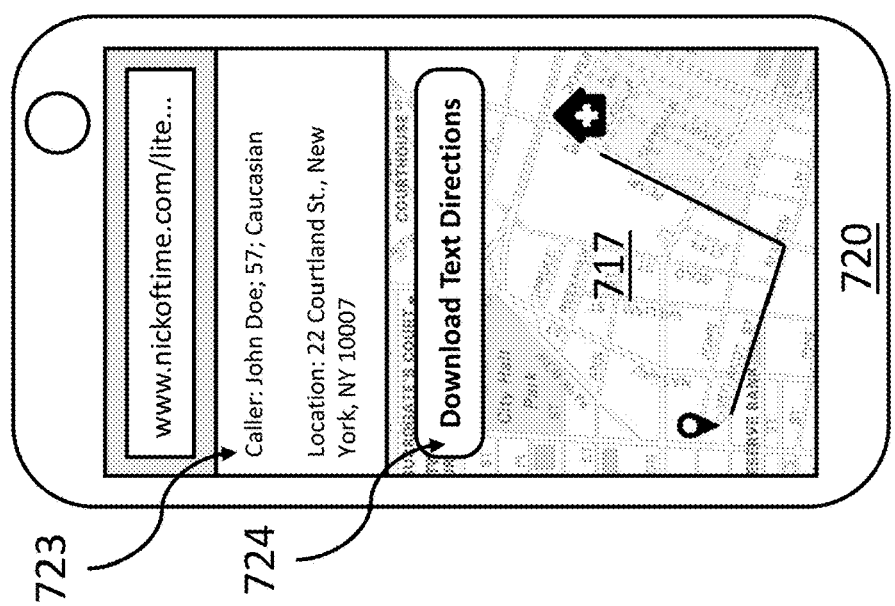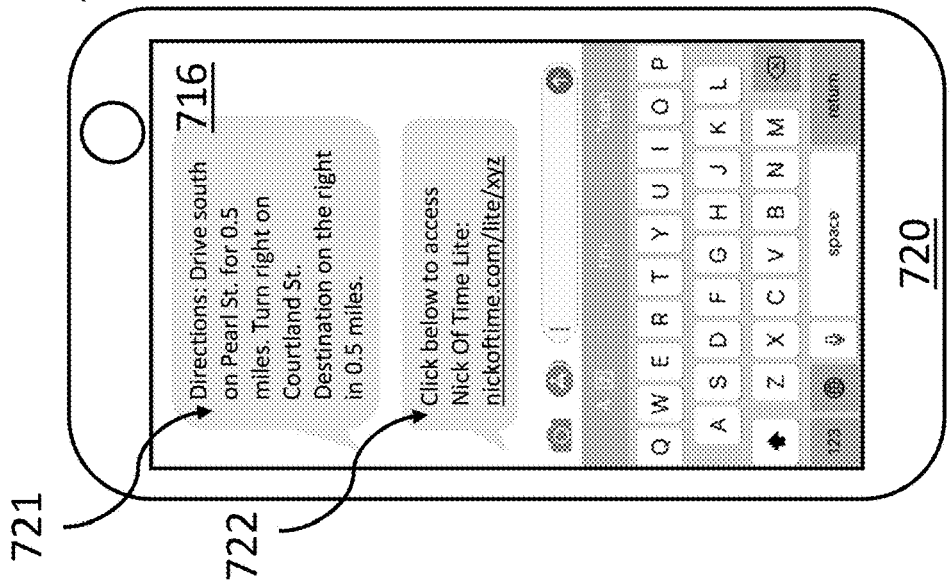
FIG. 7C

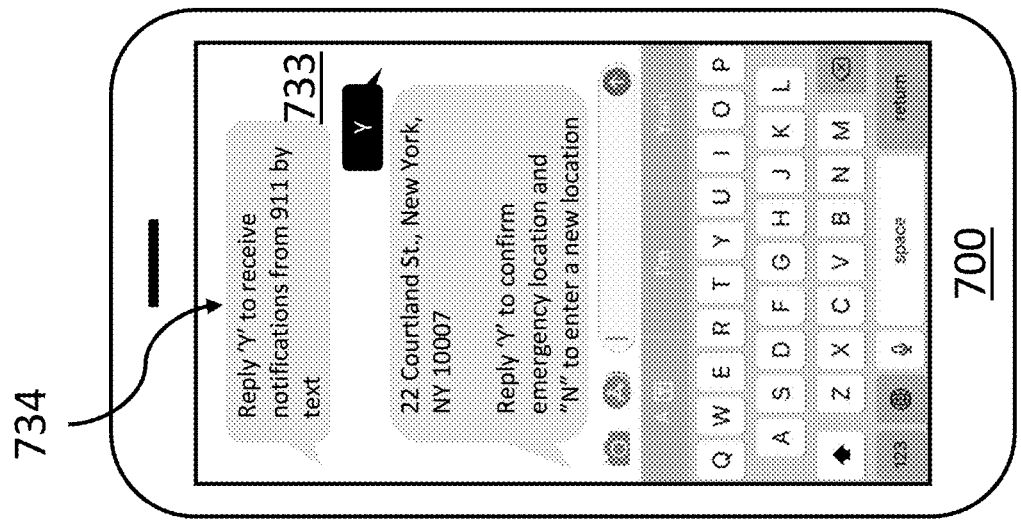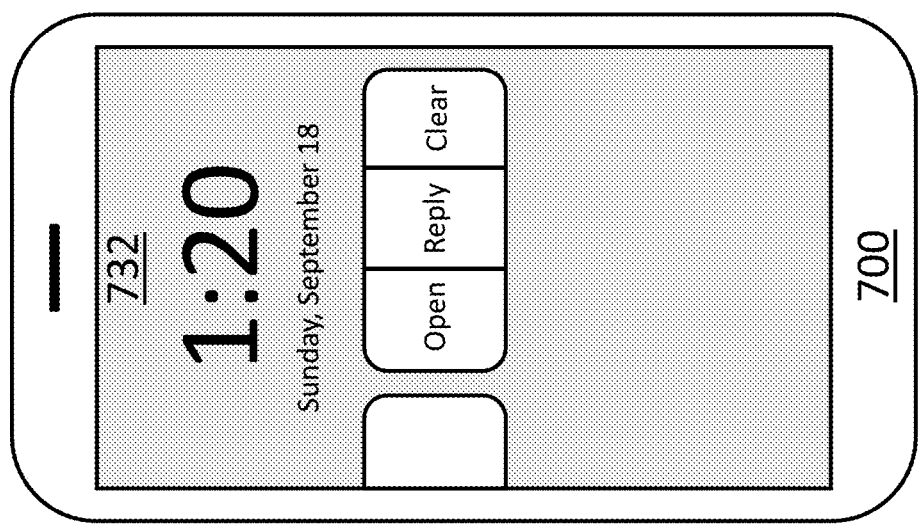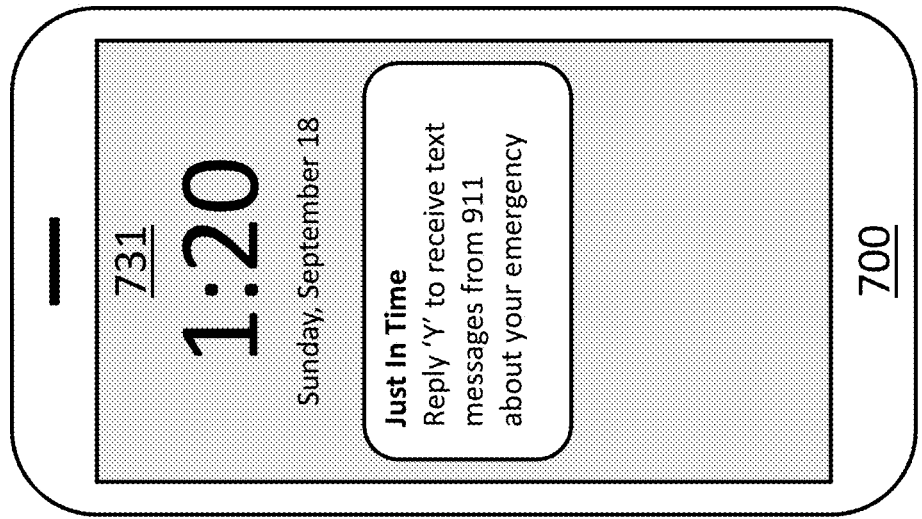
FIG. 7E

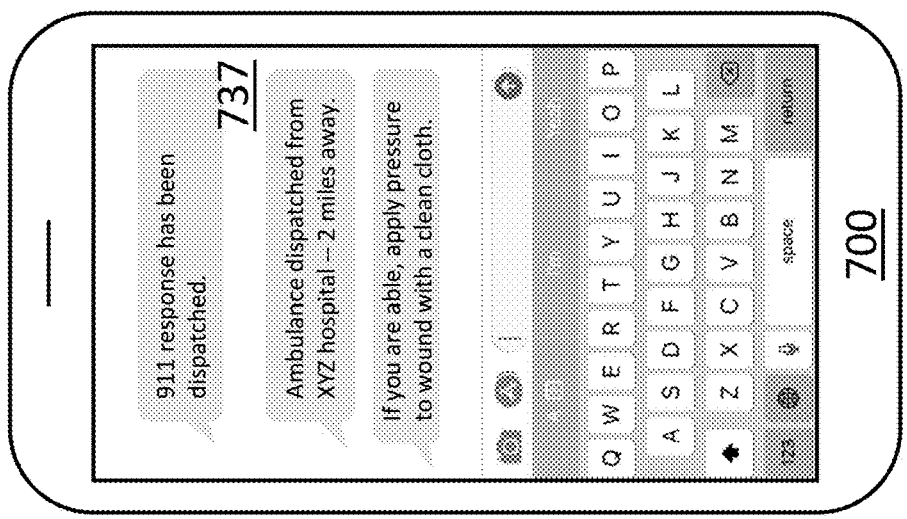
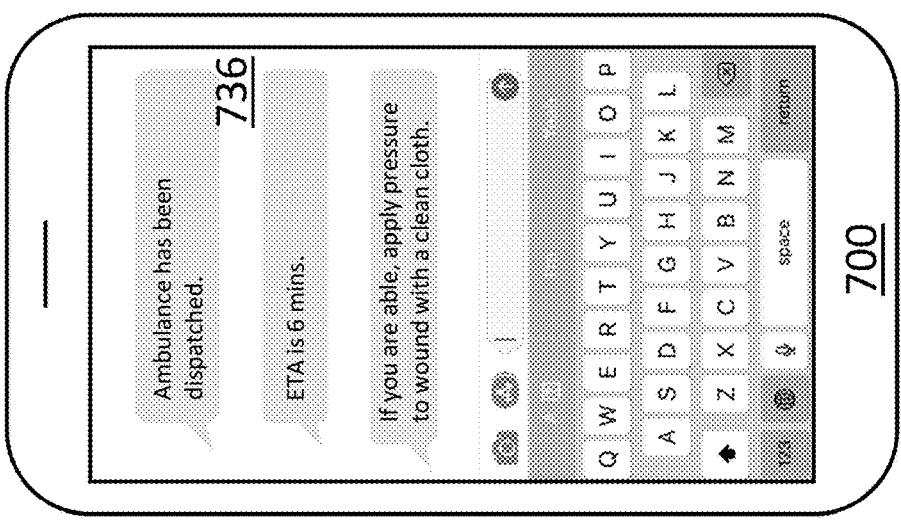
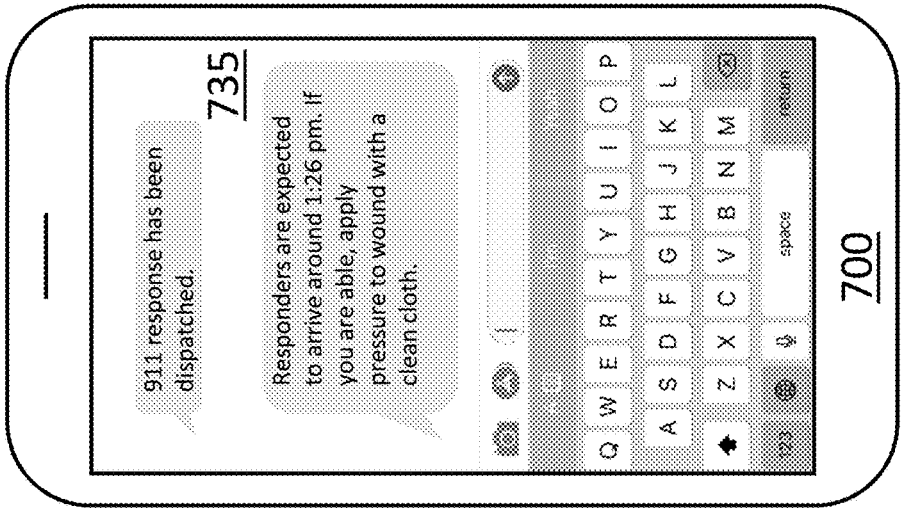
FIG. 7F

FACILITATING A RESPONSE TO AN EMERGENCY USING AN EMERGENCY RESPONSE DEVICE

CROSS-REFERENCE TO RELATED APPLICATION

This application claims the benefit of U.S. Provisional Patent Application No. 63/238,603 filed Aug. 30, 2021, which is incorporated by reference herein in its entirety for all purposes.

BACKGROUND

Field

The described aspects generally relate to mechanisms for providing emergency response services.

Related Art

In an emergency, a person may request help using a mobile communication device such as a cell phone to dial a designated emergency number like 9-1-1 or a direct access phone number for the local emergency service provider (e.g. an emergency dispatch center, a public safety answering point (PSAP), etc.). Traditionally, this call is assigned to one or more first responders by the emergency service provider, and the caller's estimated location (generally either the location of a nearby cell tower or a triangulation from the location of three or more nearby cell towers) is provided to the emergency service provider by the caller's wireless carrier (e.g., AT&T®, etc.). Alternatively, the caller may provide their location to the emergency service provider by verbally speaking their location over the phone. Unfortunately, many emergency callers are unaware of their precise location or otherwise unable to verbalize it.

However, modern technologies have enabled the development and implementation of previously unimaginable or unachievable emergency services. For example, modern communication devices are capable of generating highly accurate, real-time locations (e.g., device-based hybrid locations) during emergencies (e.g., in response to an emergency number being dialed) and transmitting the locations to emergency management systems and emergency service providers. Emergency service providers can then use these accurate locations to more quickly locate and dispatch emergency assistance to emergency callers. In another example, devices such as surveillance cameras can capture images, videos, or audio that can be shared in real-time with emergency management systems and emergency service providers to provide emergency service providers with situational awareness that they did not have access to in the past.

When a person in an emergency submits a call and/or request for help to, for example, an emergency service provider (e.g. an emergency dispatch center, etc.), the call and/or request may be assigned to one or more first responders by the emergency service provider. However, first responders assigned to respond to a call may not be within the closest proximity to the person experiencing the emergency compared to other first responders, and/or may not be the best-suited and/or capable first responders to assist the person experiencing the emergency. Further, first responders assigned to respond to a call may be unaware of pertinent information associated with the emergency, for example, an optimal route to the location of the emergency, situational data (e.g., dangerous environments, additional support and/or equipment requirements, medical conditions affecting one or more persons, etc.) associated with the emergency, and/or the like. These and other shortcomings are addressed by the methods and systems described herein.

SUMMARY

Systems, devices/apparatuses, media, and methods for facilitating a response to an emergency are described herein. An emergency response data platform (ERDP) may receive emergency information that indicates a type of an emergency and a location associated with the emergency. Based on the type of the emergency, the location associated with the emergency, and an indication of an emergency response service provided by a user of an emergency response device, the EDRP may cause a first user interface of an emergency management application to display a notification of the emergency. The first user interface may be displayed by the emergency response device. Based on an indication of a current location of the emergency response device, the EDRP may cause a second user interface of the emergency management application to display a notification indicating that the emergency response device is en route to the location associated with the emergency. The second user interface may be displayed by a user device.

An example computer-implemented method for facilitating a response to an emergency includes receiving emergency information that indicates a type of an emergency and a location associated with the emergency. The computer-implemented method further includes determining, based on the location associated with the emergency, a plurality of emergency response devices for responding to the emergency. The computer-implemented method further includes determining, based on the type of the emergency, at least one emergency response device of the plurality of emergency response devices for responding to the emergency. The computer-implemented method further includes sending, to the at least one emergency response device, a notification configured to cause a response to the emergency.

Another example computer-implemented method for facilitating a response to an emergency includes sending emergency information that indicates a type of an emergency and a location associated with the emergency. The computer-implemented method further includes receiving, based on the type of the emergency and the location associated with the emergency, a notification that at least one emergency response device of a plurality of emergency response devices configured to respond to the emergency is en route to the location associated with the emergency.

Another example computer-implemented method for facilitating a response to an emergency includes sending, by an emergency response device, an indication of an emergency response function associated with the emergency response device. The computer-implemented method further includes receiving, based on a type of an emergency corresponding to the emergency response function, a notification of the emergency. The computer-implemented method further includes sending, based on the notification, an indication of a current location associated with the emergency response device. The computer-implemented method further includes sending, based on a distance between the emergency response device and a location associated with the emergency being within a distance threshold, an indication of an update to the current location associated with the emergency response device.

According to some aspects of this disclosure, relevant emergency data from different sources are consolidated and displayed for rapid and efficient response. According to some aspects of this disclosure, locations and additional data are displayed through a graphical user interface (GUI) provided by an emergency management application separate from the preexisting emergency service provider (ESP) system (e.g., a public safety answering point (PSAP) system).

BRIEF DESCRIPTION OF THE DRAWINGS

The accompanying drawings are incorporated herein and form a part of the specification.

FIGS. 4A and 4B depict systems and processes for receiving and transmitting emergency data by an emergency response data platform, according to aspects of this disclosure of the present disclosure.

FIGS. 7B-7D illustrate exemplary graphical user interfaces (GUIs) provided by an emergency management application, according to aspects of this disclosure of the present disclosure.

FIGS. 7E-7H illustrate exemplary graphical user interfaces (GUIs) provided by a civilian application, according to aspects of this disclosure of the present disclosure.

In the drawings, like reference numbers generally indicate identical or similar elements. Additionally, generally, the left-most digit(s) of a reference number identifies the drawing in which the reference number first appears.

DETAILED DESCRIPTION

Figure 1:
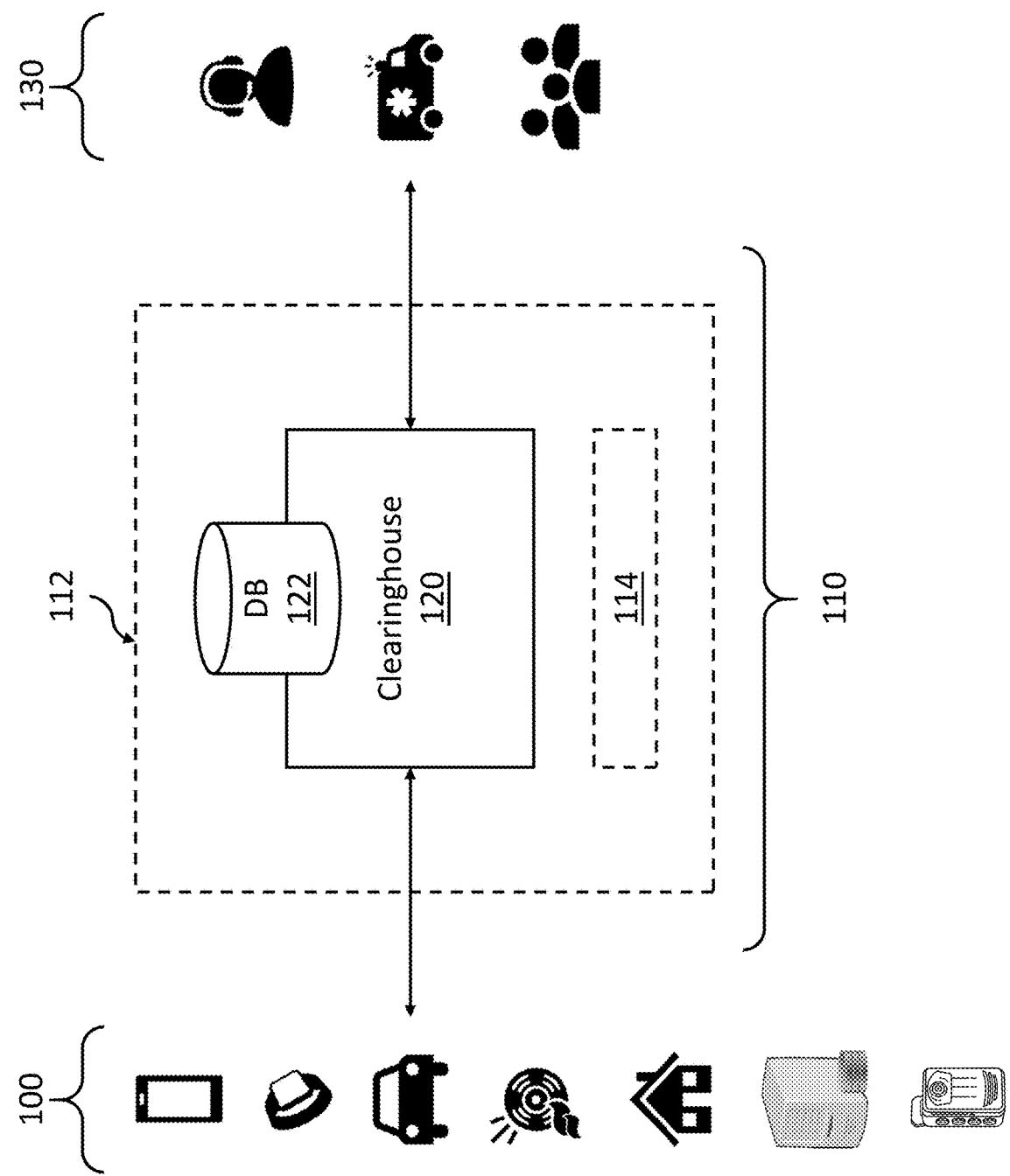
FIG. 1 depicts a diagram of an emergency response data platform, according to aspects of this disclosure of the present disclosure.

The systems, servers, devices, methods, and computer-readable media, as described herein, can determine an emergency response device and/or user of the emergency response device (e.g., a first responder, an emergency service provider (ESP), etc.) best suited to respond to an emergency and send the emergency response device pertinent information associated with the emergency. For example, an emergency management system (EMS) can receive emergency data/information from one or more sources, such as a user device, a mobile device, a smart device, a data-sensing device, an Internet-of-Things (IoT) device, and/or the like, and determine a type and/or location of an emergency. The EMS may, for example, determine one or more emergency response devices within proximity to the emergency and determine which of the one or more emergency response devices are best suited and/or the most capable emergency response device for responding to the emergency based on a capability and/or function associated with the emergency response device. The EMS can cause pertinent information associated with the emergency to be sent to the emergency response device, such as an optimal route to the location of the emergency, situational data (e.g., dangerous environments, support/equipment and/or safety asset requirements, medical conditions affecting one or more persons, etc.) associated with the emergency, and/or the like.

Disclosed herein are also systems, devices, media, and methods for providing enhanced emergency communications and functions. Embodiments of the present disclosure take advantage of technological advancements that have allowed mobile communication devices to generate accurate locations by incorporating multiple technologies embedded in the devices, such as GPS, Wi-Fi, and Bluetooth to create device-based hybrid locations. Device-based hybrid locations may be locations determined by an electronic and/or communication device, as opposed to locations determine using a network (e.g., a carrier network). Device-based hybrid locations can be generated using GPS, network-based technologies, Wi-Fi access points, Bluetooth beacons, barometric pressure sensors, dead reckoning using accelerometers and gyrometers, and a variety of crowdsourced and proprietary databases that device operating systems providers are running to enhance location technology. These device-based hybrid locations can be quickly generated during emergency calls.

Furthermore, electronic communication devices include various devices with communication capability to communicate with other devices via Wi-Fi, Bluetooth, etc. Many of these devices are Internet-abled and can communicate via the Internet by sending messages such as chat, email, HTTP post, etc. Some electronic communication devices have phone numbers and are enabled for cellular communication or VoIP, such as a SIM-enabled wearable device. Other devices may not have a phone number and be unable to make wireless calls or send SMS. In some cases, devices that do not have a phone number may be associated with the owner's account phone number or be assigned a number for the duration of the emergency session. Communication devices may include various devices such as computers, mobile phones, wearables, digital assistants, smart TVs, security systems, vehicular telematics systems, IoT sensors, etc. According to some aspects of this disclosure, mobile communication devices (e.g., mobile phones, wearables, IoT devices, smart home devices, vehicle computers, etc.) are often capable of generating or storing additional information that provides situational awareness about the emergency, such as health sensor data or medical histories. For example, during an emergency, a modern mobile communication device may have access to an implicated person's blood type, preexisting medical conditions, or even the implicated person's current heart rate. In another example, a sensor in the home can detect glass breakage indicating a possible burglary. According to some aspects of this disclosure, the mobile communication device has access to data from sensors (e.g., health or environmental sensors). For example, a video feed of the emergency via a connected surveillance camera can provide valuable situational awareness regarding the emergency.

Conventionally, the users in emergencies, emergency service providers, a public safety answering point (PSAP), and/or the like are unable to interactively communicate information directly to each other. Rather, emergency information is communicated through disparate communication mediums and/or forwarded through different systems by various parties. The lack of a central communication source and/or platform results in communication delays, miscommunication of pertinent emergency-related data, and ultimately delayed and/or inappropriate responses to emergencies. According to some aspects of this disclosure, the systems, servers, devices, methods, and computer-readable media, as described herein, provide an integrated emergency management and response platform that enables continuous and timely communication between users in emergencies, emergency service providers, PSAPs, and/or the like. Continuous and timely communication between users in emergencies, emergency service providers, PSAPs, and/or the like reduces and/or prevents communication delays, miscommunication of pertinent emergency-related data, and delayed and/or inappropriate responses to emergencies. These and other technological advantages are described herein.

Emergency Response Data Platform

In various embodiments, disclosed herein are devices, systems, and methods for managing emergency data and emergency communications for more effective and efficient emergency response. FIG. 1 depicts a diagram of an emergency response data platform in accordance with one embodiment of the present disclosure. In a simple example, according to some aspects of this disclosure, an emergency data source 100 transmits emergency to an emergency response data platform (ERDP) 110 before, during, or after an emergency, and the ERDP 110 shares the emergency data with an emergency service provider (ESP) 130. Exemplary ingress data sources includes mobile phones, wearables, vehicle telematics systems, smart security systems, and mobile applications. The ESP 130 can then use the emergency data to more efficiently and effectively respond to corresponding emergencies. According to some aspects of this disclosure, the emergency data source 100 is a third-party server system (hereinafter, "third-party server"). For example, according to some aspects of this disclosure, the emergency data source 100 is a third-party server (e.g., a backend server system) of a technology company that produces software for electronic devices, such as Apple or Google. According to some aspects of this disclosure, the emergency data source 100 is an electronic device, such as an electronic communication device, a data captring device (e.g., camera, microphone, etc.), and/or the like. For example, the emergency data source 100 may be a communication device (e.g., a walkie talkie or two-way radio, a mobile or cellular phone, a computer, a laptop, etc.), a wearable device (e.g., a body camera, a smartwatch), or an Internet of Things (IoT) device such as a home assistant (e.g., an Amazon Echo) or a connected smoke detector (e.g., a Nest Protect smoke and carbon monoxide alarm). According to some aspects of this disclosure, an electronic device includes a display, a processor, a memory (e.g., an EPROM memory, a RAM, or a solid-state memory), a network component (e.g., an antenna and associated components, Wi-Fi adapters, Bluetooth adapters, etc.), a data storage, a user interface, an emergency alert program, one or more location components, and one or more sensors. According to some aspects of this disclosure, the processor is implemented as one or more microprocessors, microcomputers, microcontrollers, digital signal processors, central processing units, state machines, logic circuitries, and/or devices that manipulate signals based on operational instructions. Among other capabilities, the processor can be configured to fetch and execute computer-readable instructions stored in the memory.

According to some aspects of this disclosure, the display is part of the user interface (e.g., a touchscreen is both a display and a user interface in that it provides an interface to receive user input or user interactions). According to some aspects of this disclosure, the user interface includes physical buttons such as an on/off button or volume buttons. According to some aspects of this disclosure, the display and/or the user interface comprises a touchscreen (e.g., a capacitive touchscreen), which is capable of displaying information and receiving user input. According to some aspects of this disclosure, the communication device includes various accessories that allow for additional functionality. According to some aspects of this disclosure, these accessories (not shown) include one or more of the following: a microphone, a camera, speaker, a fingerprint scanner, health or environmental sensors, a USB or micro-USB port, a headphone jack, a card reader, a SIM card slot, or any combination thereof. According to some aspects of this disclosure, the one or more sensors include, but are not limited to: a gyroscope, an accelerometer, a thermometer, a heart rate sensor, a barometer, or a hematology analyzer. According to some aspects of this disclosure, the data storage includes a location data cache and a user data cache. According to some aspects of this disclosure, the location data cache is configured to store locations generated by the one or more location components.

According to some aspects of this disclosure, the emergency alert program is a web application or mobile application. According to some aspects of this disclosure, the emergency alert program is configured to record user data, such as a name, address, or medical data of a user associated with the electronic device. According to some aspects of this disclosure, the emergency alert program is configured to detect when an emergency request is generated or sent by the electronic device (e.g., when a user uses the electronic device to make an emergency call). According to some aspects of this disclosure, in response to detecting an emergency request generated or sent by the electronic device, the emergency alert program is configured to deliver a notification to the ERDP 110. According to some aspects of this disclosure, the notification is an HTTP post containing information regarding the emergency request. According to some aspects of this disclosure, the notification includes a location (e.g., a device-based hybrid location) generated by or for the electronic device. According to some aspects of this disclosure, in response to detecting an emergency request generated or sent by the electronic device, the emergency alert program is configured to deliver user data to the ERDP 110.

According to some aspects of this disclosure, the ERDP 110 includes an ERDP operating system, an ERDP CPU, an ERDP memory unit, an EMS communication element, and one or more software modules. According to some aspects of this disclosure, the ERDP CPU is implemented as one or more microprocessors, microcomputers, microcontrollers, digital signal processors, central processing units, state machines, logic circuitries, and/or devices that manipulate signals based on operational instructions. Among other capabilities, the ERDP CPU is configured to fetch and execute computer-readable instructions stored in the ERDP memory unit. The ERDP memory unit optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The ERDP memory unit optionally includes modules, routines, programs, objects, components, data structures, etc., which perform particular tasks or implement particular abstract data types.

According to some aspects of this disclosure, the ERDP 110 includes one or more ERDP databases, one or more servers, and a clearinghouse 120. According to some aspects of this disclosure, the clearinghouse 120, as described in further detail below, is an input/output (I/O) interface configured to manage communications and data transfers to and from the ERDP 110 and external systems and devices. According to some aspects of this disclosure, the clearinghouse 120 includes a variety of software and hardware interfaces, for example, a web interface, a graphical user interface (GUI), and the like. The clearinghouse 120 optionally enables the ERDP 110 to communicate with other computing devices, such as web servers and external data servers. According to some aspects of this disclosure, the clearinghouse 120 facilitates multiple communications within a wide variety of networks and protocol types, including wired networks, for example, LAN, cable, etc., and wireless networks, such as WLAN, cellular, or satellite. According to some aspects of this disclosure, the clearinghouse 120 includes one or more ports for connecting a number of devices to one another or to another server. According to some aspects of this disclosure, the clearinghouse 120 includes one or more sub-clearinghouses, such as location clearinghouse and additional data clearinghouse, configured to manage the transfer of locations and additional data, respectively. According to some aspects of this disclosure, the ERDP 110 additionally includes a user information module that receives and stores user information (e.g., personal information, demographic information, medical information, location information, etc.) within the ERDP 110. According to some aspects of this disclosure, users can submit user information through a website, web application, or mobile application, such as during a registration process for an emergency management (and/or response) application. According to some aspects of this disclosure, when the ERDP 110 receives emergency data including user information, such as through an emergency alert received by the clearinghouse 120 (as described below), the ERDP 110 stores the user information in the user information module. According to some aspects of this disclosure, user information stored within the user information module is received by the ERDP 110 from a third-party server system, as described above. According to some aspects of this disclosure, user information stored within the user information module is associated with an identifier of a user or an electronic device associated with a user, such as a phone number or an email address.

According to some aspects of this disclosure, the location data is generated by the electronic device before the emergency call and can be made accessible by the ERDP to an ESP during an emergency. For example, a taxi company may have software that transmits the location of its cars or assets to the emergency clearinghouse preemptively. Thus, when an emergency call is made, the location of the affected taxi can be made accessible quicker to send help. In addition, the ERDP can transmit emergency alerts even when the emergency call does not go through or gets disconnected based on the emergency data from the electronic device.

Using the ERDP 110 two-sided platform, relevant emergency data about one or more emergencies can be shared with one or more egress recipients, such as a call center (e.g., PSAP), emergency responders, or emergency contacts in a secure and efficient manner. Using the platform, authorized recipients are given access to relevant information for quick and efficient emergency response. For example, a PSAP is enabled to verify the location of an emergency caller via technology, rather than relying on a distressed caller to generate the location data. Thus, a PSAP can initiate a response before the user provides any location information, saving seconds or minutes on emergency response time.

In some cases, a primary agency (e.g., PSAP-1) may select an appropriate secondary agency to respond to the emergency. According to some aspects of this disclosure, a federal agency such as the Center for Disease Control (CDC) is planning and overseeing various state and local ESP agencies for dealing with outbreak of infectious diseases.

In some implementations, the emergency service request, such as an emergency call, may be retained by the primary agency while the secondary agency dispatches emergency responders to the emergency location. In other implementations, the emergency service request, such as an emergency call is transferred to the appropriate secondary agency based on emergency location, type and priority of the emergency.

A primary agency may be responsible for handling emergency service requests (such as traditional emergency calls and digital requests) within an authoritative jurisdiction, which may be defined by one or more geofences. A buffer region may be defined around the boundary of the geofence and the locations falling within the buffer region can be treated as locations falling within the geofence. The buffer region may be 1 meter to 10 km, or between 200 meters to 5 km, preferably 2 km. A secondary agency may also have a geofence, which defines the area of operation, but the service request regarding an emergency has to be initiated by a primary agency.

In addition, other types of ESP agencies are also contemplated. For example, ESPs may be temporarily set up to address a particular threat or a natural disaster, such as a hurricane. The constituting ESP agencies for such a "temporary ESP agency" may be the area that might be impacted by the threat or natural disaster. It is also contemplated that ESP agencies may be both public and private entities such as corporate security, university police, call center, etc.

As mentioned above, according to some aspects of this disclosure, the ERDP 110 shares emergency data with an emergency service provider (ESP) 130. According to some aspects of this disclosure, an ESP 130 (e.g., a public safety answering point (PSAP)) is a system that includes one or more of a display, a user interface, at least one central processing unit or processor, a network component, an audio system, (e.g., microphone, speaker and/or a call-taking headset), and an ESP application (e.g., a computer program) such as a computer-aided dispatch (CAD) program or an emergency call taking program (also referred to as customer premise equipment or CPE). According to some aspects of this disclosure, the ESP application comprises a database of emergency responders, such as medical assets, police assets, fire response assets, rescue assets, safety assets, etc. According to some aspects of this disclosure, the ESP application is an emergency management application provided by the ERDP 110, as described below. According to some aspects of this disclosure, the ESP application is installed on a computing device at the ESP 130 and comprise one or more software modules, such as a call-taking module, an ESP display module, a supplemental or updated information module, or a combination thereof. According to some aspects of this disclosure, the ESP application displays the information on a map (e.g., on the display). According to some aspects of this disclosure, the ESP application is accessible or executable on mobile devices associated with ESP 130, such as first responder devices. According to some aspects of this disclosure, the ESP application is an emergency management application provided by the ERDP 110, as described below.

Emergency Clearinghouse

According to some aspects of this disclosure, as mentioned above with respect to FIG. 1, the emergency response data platform (ERDP) 110 includes a clearinghouse 120 (also referred to as an "Emergency Clearinghouse") for receiving, storing, retrieving, and transmitting emergency data. According to some aspects of this disclosure, as depicted by FIG. 1, through the clearinghouse 120, the ERDP 110 can receive emergency data from an emergency data source 100 (as described above) and transmit the emergency data to an emergency data recipient, such as an emergency service provider (ESP) 130 (as described above). In this way, the ERDP 110 acts as a data pipeline between emergency data sources 100 and ESPs 130. The emergency data that passes through the clearinghouse 120 may include (but is not limited to) location data (e.g., fixed addresses or device-based hybrid locations generated in real time) and additional data (e.g., medical history, personal information, or contact information, etc.). According to some aspects of this disclosure, through the clearinghouse 120, the ERDP 110 transmits emergency data to ESPs 130 to aid the ESPs 130 in responding to emergencies. For example, location data may allow emergency responders to arrive at the scene of an emergency faster, and additional data may allow emergency responders to be better prepared for the emergencies that they face.

The clearinghouse 120 may receive emergency data in various ways. For example, according to some aspects of this disclosure, an emergency data source 100 can unilaterally transmit emergency data to the clearinghouse 120. For example, in one embodiment, an emergency alert is triggered by an electronic device manually (e.g., in response to the selection of a soft or hard emergency button) or automatically based on sensor data received by the electronic device (e.g., smoke alarms). The electronic device can then transmit the emergency alert and any associated data to the ERDP 110, such as to an endpoint provided by the clearinghouse 120. Or, for example, in one embodiment, after an emergency alert is received by the ERDP 110 from a first emergency data source, the ERDP 110 can query a second emergency data source for emergency data (e.g., emergency data associated with the emergency alert received from the first emergency data source). For example, the emergency alert received from the first emergency data source may include a user identifier (e.g., a telephone number or an email address) for an owner or user of the first emergency data source. The ERDP 110 can then query the second emergency data source with the user identifier to retrieve additional emergency data associated with the owner or user of the first emergency data source. According to some aspects of this disclosure, emergency data received by the ERDP 110 is received in a format that is compatible with industry standards for storing and sharing emergency data. According to some aspects of this disclosure, the ERDP 110 formats emergency data that it receives into a format that is compatible with industry standards. For example, according to some aspects of this disclosure, the emergency data is formatted to be compatible with National Emergency Number Association (NENA) standards. According to some aspects of this disclosure, emergency data is formatted by the ERDP 110 to be compliant with the Presence Information Data Format Location Object (PIDF-LO) standard. According to some aspects of this disclosure, emergency data received by the ERDP 110 is stored within one or more databases 122. According to some aspects of this disclosure, emergency data received by the ERDP 110 is associated with one or more identifiers, such as a device or user identifier. According to some aspects of this disclosure, emergency data received by the ERDP 110 is shared with ESP 130 (e.g., PSAP) to provide a continuous update of information regarding any emergency event and/or allocation/assignment of any emergency service provider (e.g., emergency response device, etc.). For example, ERDP 110 may send the ESP 130 video content (e.g., body camera information, etc.) and/or the like from any emergency service provider selected and/or identified to respond to any emergency. According to some aspects of this disclosure, ERDP 110 may send the ESP 130 information describing any emergency service provider selected and/or identified to respond to any emergency and/or an indication of the direction from which any emergency service provider selected and/or identified to respond to any emergency will arrive at the location of the emergency and/or the like.

The clearinghouse 120 may share emergency data in various ways. For example, according to some aspects of this disclosure, an emergency data recipient, such as an ESP 130, can query the ERDP 110 for emergency data. For example, according to some aspects of this disclosure, an ESP 130 can query the ERDP 110 with a user identifier (e.g., a telephone number or an email address) to receive emergency data gathered or received by the ERDP 110 associated with the user identifier. Or for example, according to some aspects of this disclosure, an ESP 130 can query the ERDP 110 with a geospatial area to receive emergency data gathered or received by the ERDP 110 associated with the geospatial area. Alternatively, according to some aspects of this disclosure, the ERDP 110 can autonomously transmit emergency data to an emergency data recipient without first receiving a query from the emergency data recipient (also referred to as "pushing" emergency data, as opposed to emergency data being "pulled" with a query). According to some aspects of this disclosure, the ERDP 110 pushes emergency data to an emergency data recipient using an emergency data subscription system. Using the emergency data subscription system, an emergency data recipient can subscribe to the clearinghouse 120 for a particular device identifier, user identifier, ESP account, or geospatial area. After subscribing to a subscription, the emergency data recipient may automatically receive updates regarding the subscription without first sending a query for emergency data. For example, if an ESP 130 subscribes to a phone number, whenever the ERDP 110 receives updated emergency data associated with the phone number, the clearinghouse 120 can instantly and automatically transmit the updated emergency data associated with the phone number to the ESP 130.

As used herein, "emergency data" can include any data/information pertaining to an emergency, such as an on-going emergency, a historical emergency, and/or the like. For example, emergency data can be generated at the time of an emergency. Emergency data can be generated/determined, for example, before an emergency occurs and/or can be made accessible when the emergency occurs. Emergency data can include, for example, location data, such as a current location of an emergency (often based on the location of the user device). Because of privacy and security concerns, emergency data must be stored, accessed, transmitted using security and privacy measures.

As used herein, "sensor data" can include any information determined, obtained, and/or provided by one or more sensors. A sensor can be associated with a device. For example, (e.g., a communication device and/or the like can communicate via Bluetooth and/or any other wireless/wired communication technique with a wearable sensor, such as a heart rate monitor, a pedometer, and/or the like. Accordingly, according to some aspects of this disclosure, the device obtains sensor data from the sensor (e.g., heart rate from the heart rate monitor, distance traveled from the pedometer, etc.). Sensor data can be relevant to an emergency situation (e.g., heart rate during a cardiac emergency event, etc.). According to some aspects of this disclosure, a sensor and/or sensor device can include an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an airflow meter, an anemometer, a flow sensor, a gas meter, a water meter, a Geiger counter, an altimeter, an airspeed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, and/or any combination thereof, and sensor data can include any information obtained from any of the preceding sensors. According to some aspects of this disclosure, one or more sensors can be physically separate from a user device. The one or more sensors can authorize the user device to obtain sensor data. The one or more sensors can provide and/or send sensor data to the user device autonomously, and/or the like. According to some aspects of this disclosure, a user device and one or more sensors can belong to the same group of devices, wherein member devices are authorized to share data. According to some aspects of this disclosure, a user device can be configured with one or more sensors (e.g., a user device can be a wearable device with a sensor and/or sensing component, etc.).

Emergency Data Geofencing

According to some aspects of this disclosure, a geofence system 112 is applied to the clearinghouse 120 or the ERDP 110 to ensure that emergency data reaches authorized recipients and to protect sensitive emergency data from being shared with unintended recipients. As depicted in FIG. 1, according to some aspects of this disclosure, when emergency data (e.g., an emergency location or additional data) is received by the ERDP 110 from an emergency data source 100, the emergency data is first processed by the geofence system 112 before being ingested by the clearinghouse 120. Similarly, according to some aspects of this disclosure, when a data request for emergency data is received by the ERDP 110 from an emergency data recipient (e.g., an ESP 130), the query is processed by the geofence system 112 before emergency data is transmitted to the emergency data recipient.

Generally, a geofence is a virtual perimeter that represents a real-world geographic area. A geofence can be dynamically generated—as in a radius around a point location—or a geofence can be a predefined set of boundaries (such as school zones or neighborhood boundaries). For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP) or a public safety service (PSS; e.g., a police department, a fire department, a federal disaster management agency, national highway police, etc.), which have jurisdiction over a designated area (sometimes, overlapping areas). Geofences are used to define the jurisdictional authority by various methods and in various Geographic Information System (GIS) formats. According to some aspects of this disclosure, geofences only represent authoritative regions if the geofence has been assigned or verified by a local, state, or federal government. According to some aspects of this disclosure, geofences represent assigned jurisdictions that are not necessarily authoritative regions. For example, according to some aspects of this disclosure, a geofence is unilaterally created by its associated ESP without verification or assignment by a local, state, or federal government.

According to some aspects of this disclosure, the ERDP 110 maintains a geofence database including one or more geofences associated with each ESP 130 that is or has ever been communicatively coupled to the ERDP 110. According to some aspects of this disclosure, a geofence associated with an ESP 130 may be submitted to the ERDP 110 by an administrator of the ESP 130, such as through an emergency management application (as described below) or via email. According to some aspects of this disclosure, when emergency data is received by the ERDP 110 the ERDP 110 identifies a location associated with the emergency data (e.g., an emergency location included in an emergency alert) and determines if the location is within the combined authoritative jurisdiction (i.e., within any one of the geofences stored in the geofence database). According to some aspects of this disclosure, if the location is not within the combined authoritative jurisdiction, the ERDP 110 rejects or drops the emergency data (also referred to as "ingress filtering"). According to some aspects of this disclosure, when the ERDP 110 receives a query for emergency data from an ESP 130, the ERDP 110 identifies a geofence associated with the ESP 130 and returns only emergency data associated with locations that are within the geofence associated with the ESP 130 (also referred to as "egress filtering). According to some aspects of this disclosure, geofences are used in routing emergency data that is pushed to an emergency data recipient. According to some aspects of this disclosure, for example, as mentioned above, an emergency data recipient may subscribe to an ESP jurisdiction, or specifically to a geofence associated with the ESP (oftentimes the authoritative jurisdiction of the ESP). Then, when the ERDP 110 receives emergency data associated with a location that is within the geofence to which the emergency data recipient has subscribed, the ERDP 110 can instantly and automatically push the emergency data to the emergency data recipient.

Emergency Flow Management System

According to some aspects of this disclosure, as depicted in FIG. 1, the emergency response data platform (ERDP) 110 includes an emergency flow management system (EFMS) 114. Generally, the EFMS functions to provide digital connectivity to emergency services to devices and applications otherwise unable to access them. Using the EFMS, an administrator of a device or application can access an emergency flow editor (also referred to as an "emergency console"), select a default emergency flow or define their own custom emergency flow, and receive an emergency flow trigger script including an emergency flow identifier (also referred to as an "emergency flow ID") unique to their chosen emergency flow. The emergency flow trigger script can then be quickly and easily integrated into the administrator's device or application. When the emergency flow trigger script is executed by the administrator's device or application, an electronic notification including the emergency flow ID is transmitted to an endpoint provided by the EFMS, which prompts the EFMS to execute the associated emergency flow chosen by the administrator.

An emergency flow may prompt the EFMS to perform a variety of functions, including (but not limited to) transmitting a notification to an emergency contact, transmitting a request for emergency service to an emergency service provider (ESP), establishing an emergency communication bridge to facilitate a Voice over Internet Protocol (VoIP) call between two or more participants, transmitting emergency data to one or more emergency data recipients, or any combination thereof, depending on the administrator's intended use case. According to some aspects of this disclosure, the emergency console provides a set of default emergency flows to choose from. According to some aspects of this disclosure, the emergency console provides a GUI that a user (e.g., an administrator of a device or application) can user to create a custom emergency flow. According to some aspects of this disclosure, the GUI of the emergency console allows a user to create a custom emergency flow by dragging and dropping (or otherwise manipulating) graphical representations of emergency flow building blocks into various arrangements, which prompts the EFMS to automatically generate an emergency flow according to the arrangement of the emergency flow building blocks. According to some aspects of this disclosure, an emergency flow building block is defined by a short script (e.g., a compilation or block of written programming commands), written in a programming language, that contains instructions for executing one or more functions. According to some aspects of this disclosure, when a user arranges one or more emergency flow building blocks within the GUI of the emergency console, the EFMS generates an emergency flow according to the arrangement of the one or more emergency flow building blocks by compiling the short scripts defining each of the one or more emergency flow building blocks into a single emergency flow script. According to some aspects of this disclosure, the emergency console allows a user to edit or create an emergency flow script directly (e.g., without the use of graphical representations of emergency flow building blocks, such as by inputting written program commands directly into a programming language input field).

Figure 2:
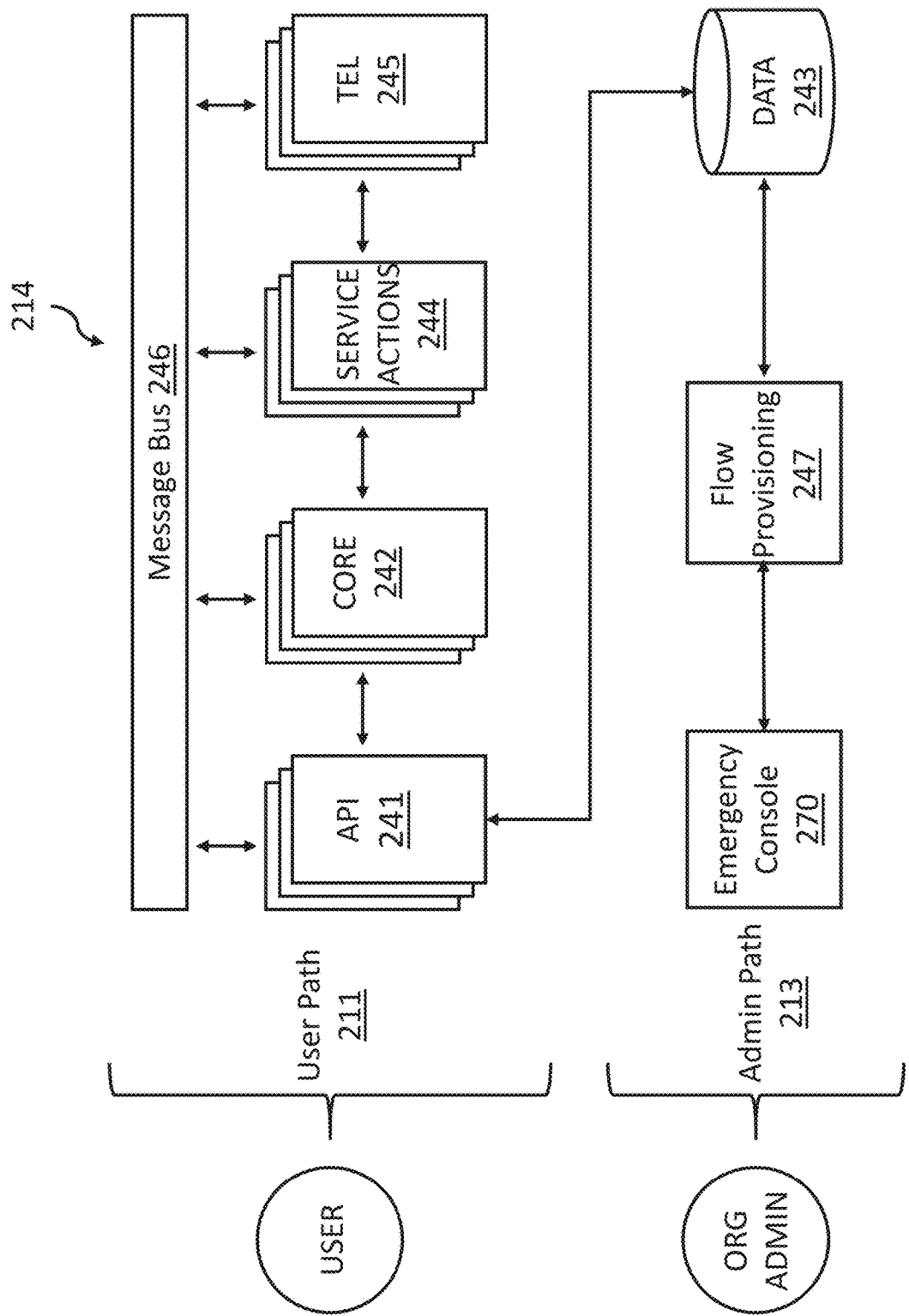
FIG. 2 depicts an exemplary emergency flow management system (EFMS), according to aspects of this disclosure of the present disclosure.

FIG. 2 depicts an exemplary embodiment of an emergency flow management system (EFMS). As depicted in FIG. 2, according to some aspects of this disclosure, the EFMS 214 contains two pathways: an administrator pathway 213 (admin path) and a user pathway 211 (user path). The administrator pathway 213 is initiated by an administrator of a device or application, as described above. In the admin path, the administrator accesses an emergency flow editor 270 to configure an emergency flow to fit the needs of the administrator's product or service. According to some aspects of this disclosure, in the admin path, an emergency flow provisioning module 247 compiles the emergency flow into an emergency flow script, assigns an emergency flow ID to the emergency flow script, and stores the emergency flow script within a data module 243. Finally, the EFMS provides the administrator with an emergency flow trigger script including the emergency flow ID, which the administrator can integrate into their device or application. The user pathway 211 is initiated by a user, or a device associated with a user, of the product or service provided by the administrator. According to some aspects of this disclosure, in the user path, the API module 241 receives an electronic notification including the emergency flow ID from a device or application that the administrator has integrated the emergency flow trigger script into. According to some aspects of this disclosure, the API module 241 then references the data module 243 with the emergency flow ID to identify the emergency flow script corresponding to the emergency flow ID and delivers the emergency flow script to the core module 242 for execution. According to some aspects of this disclosure, the core module 242 then employs the service actions module 244 and the telephony module 245 to execute the various functions included in the emergency flow script. According to some aspects of this disclosure, the API module 241, the core module 242, the service actions module 244, and the telephony module 245 are separately and simultaneously in communication with the message bus 246, which facilitates and coordinates synchronous and asynchronous communication functions (e.g., a communication bridge, text messages, etc.) between the modules and various users and accounts (e.g., a user, emergency contacts, emergency responders, etc.). According to some aspects of this disclosure, the electronic notification including the emergency flow ID also contains emergency data, such as user data, location data, or any other additional data, according to the administrator's use case. According to some aspects of this disclosure, emergency data ingested by the EFMS 214 is received and shared by the emergency clearinghouse, as described above.

Emergency Management Application

As mentioned above, according to some aspects of this disclosure, data and information is shared between the emergency response data platform (ERDP) and an emergency service provider (ESP) through an emergency management application. According to some aspects of this disclosure, as described in further detail below, the emergency management application may additionally be provided to an ESP to: a) facilitate communications between the ESP and an emergency caller (e.g., a person requesting emergency assistance) or b) facilitate communications between the ESP and one or more other ESPs. According to some aspects of this disclosure, the emergency management application is a software application either installed on a computing device at the ESP or accessed via the internet through a web browser on the computing device (e.g., the emergency management application is hosted on a cloud computing system by the ERDP). According to some aspects of this disclosure, the emergency management application functions to both facilitate a two-way communication link between the ERDP and the ESP and visualize data (e.g., emergency data) received by the ESP from the ERDP. The emergency management application optionally includes various components, such as a frontend application (hereinafter "graphical user interface" or "GUI"), a backend application, an authorization module, and a user database. According to some aspects of this disclosure, the emergency management application additionally or alternatively includes a credential management system or a geofence system (which may include or be otherwise communicatively coupled to a credentials database or a geofence database). According to some aspects of this disclosure, the credential management system and the geofence system are external to the emergency management application and communicatively coupled to the emergency management application (e.g., the credential management system or geofence system can be housed or hosted on a cloud computing system by the ERDP). Any or all of the components of the emergency management application may be hosted on a cloud computing system by the ERDP, a computing device at an ESP, or some combination thereof.

According to some aspects of this disclosure, the emergency management application is a webpage or web application that can be accessed through an internet or web browser. In such embodiments, the emergency management application can be quickly and easily integrated into the systems used by emergency service providers (ESPs), such as public safety answering points (PSAPs), because accessing and using emergency management application requires no additional software or hardware outside of standard computing devices and networks. As previously discussed, one of the greatest hindrances that PSAPs face in providing emergency assistance to people experiencing emergencies is in acquiring accurate locations of the emergencies and the people involved, because PSAPs are currently typically limited to verbally asking for and verbally receiving locations from callers. According to some aspects of this disclosure, the clearinghouse is capable of receiving accurate locations (as well as additional emergency data, as described above) from electronic devices such as smartphones and delivering the accurate locations to the appropriate PSAPs during emergencies. Therefore, it is advantageous to provide the emergency management application to PSAPs in the form of a webpage accessible through a standard web browser, to provide the potentially life-saving information stored within the clearinghouse to those capable of providing emergency assistance as quickly and easily as possible. However, according to some aspects of this disclosure, the emergency management application is a software application installed on a computing device at an ESP. The emergency management application may be provided by the ERDP or by a third party.

The ERDP (and/or the emergency management application) may facilitate responses to emergencies by connecting users (e.g., individuals in emergencies), PSAPs, and emergency service providers (e.g., first responders, emergency response devices, etc.) via a platform that enables data/information to be communicated/shared (e.g., in real-time, etc.) between to order to keep all parties informed of an emergency. For example, according to some aspects of this disclosure, an initial ingest of emergency information may be performed by a PSAP who may then use the emergency management application to identify and select appropriate emergency service providers to respond to the emergency (e.g., based on their location, functionality, etc.). According to some aspects of this disclosure, selected emergency service providers may receive (e.g., via an emergency response device instance and/or version of the emergency management application, etc.) a notification of the emergency and/or information relating to the emergency including, but not limited to, pertinent medical history of a user involved in the emergency and/or the location of the emergency.). According to some aspects of this disclosure, selected emergency service providers may also receive directions to the location of the emergency and/or an optimal route for traveling to the emergency. According to some aspects of this disclosure, the user involved in the emergency may receive (e.g., via a user device instance and/or version of the emergency management application, etc.) information indicating the status of the selected emergency service providers including, but not limited to an estimated time of arrival, an indication and/or approximation of the location of the selected emergency service providers, a description (e.g., badge number, hospital affiliation, agent identifier, etc.) of the selected emergency service providers, an indication of a direction and/or orientation relative to the location of the emergency that the selected emergency service providers will be arriving at the location of the emergency from. According to some aspects of this disclosure, information regarding the locations of the selected emergency service providers may also be shared with the PSAP (e.g., via a PSAP instance and/or version of the emergency management application, etc.).

Figure 3:
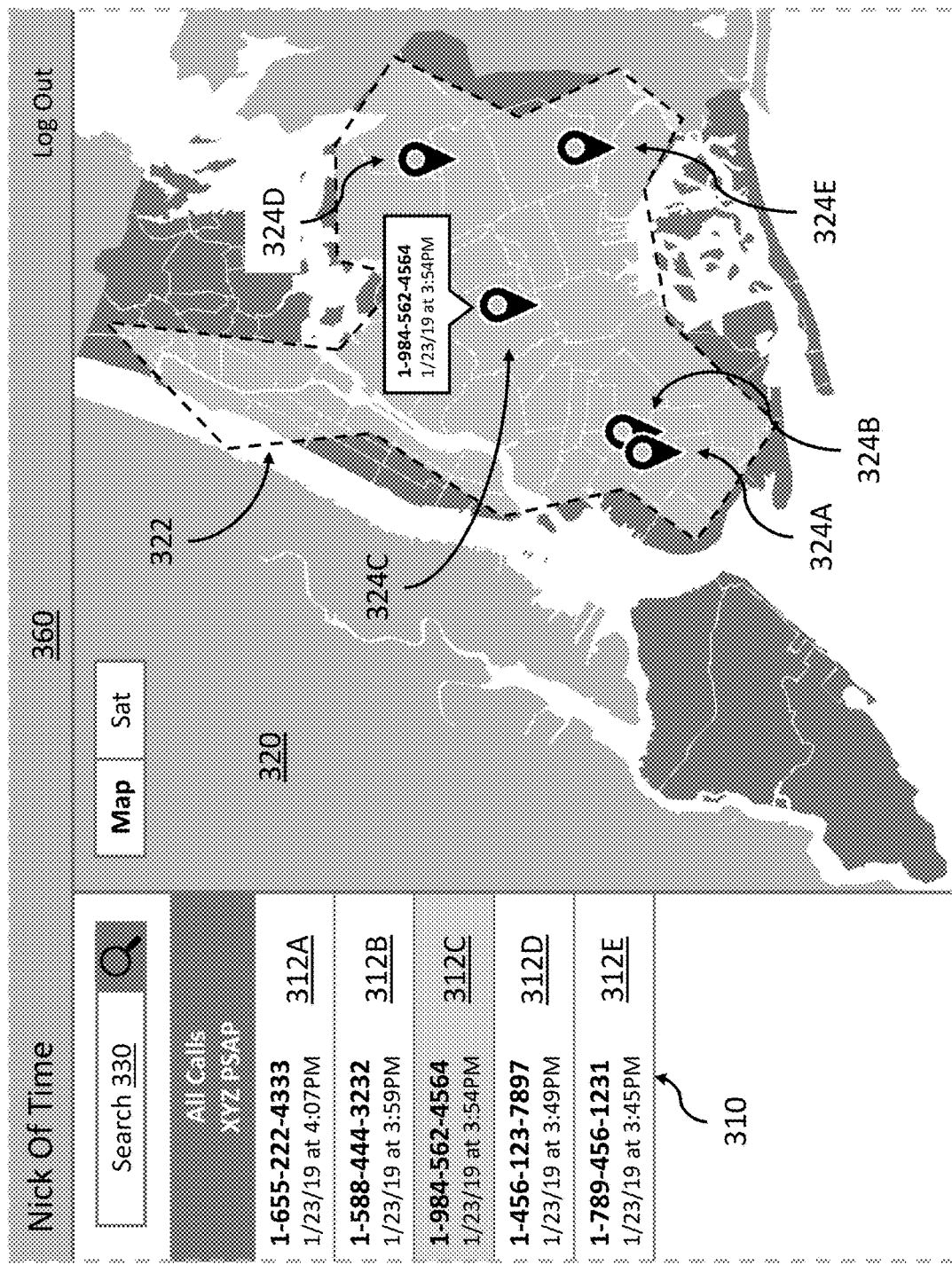
FIG. 3 illustrates an exemplary graphical user interface (GUI) provided by an emergency management application, according to aspects of this disclosure of the present disclosure.

FIG. 3 illustrates an embodiment of a GUI provided by an emergency management application 360. According to some aspects of this disclosure, the GUI provides interactive elements that allow a user at an ESP to receive data from the ERDP, visualize data received from the ERDP, and transmit data to the ERDP. For example, according to some aspects of this disclosure, the GUI includes an entry field 330 through which a user can submit a device identifier, such as by typing or pasting the device identifier into the entry field 330. According to some aspects of this disclosure, after submitting a device identifier through the entry field 330, the user can prompt the emergency management application to generate and send an emergency data request by selecting a search button. The emergency management application 360 then generates an emergency data request including the device identifier and any other necessary information (e.g., a temporary access token), and transmits the emergency data request to the ERDP. The ERDP can then return any available emergency data associated with the device identifier to the emergency management application 360, as described above and below. In another example, according to some aspects of this disclosure, the emergency management application 360 can automatically receive emergency data from the ERDP for emergencies relevant to an ESP (e.g., emergencies located within the jurisdiction of the ESP) without requiring a user to generate an emergency data request, as described above and below. After receiving emergency data from the ERDP, the emergency management application 360 can then visualize the emergency data within the GUI of the emergency management application 360. For example, according to some aspects of this disclosure, the emergency management application 360 includes a list of incidents 310 and an interactive map 320, as illustrated by FIG. 3. As shown, according to some aspects of this disclosure, when the emergency management application 360 receives a location (e.g., an emergency location) and a device identifier associated with an emergency occurring within the jurisdiction 322 of the receiving ESP, the emergency management application 360 displays the location associated with the emergency within the interactive map 320 as an incident location 324 (e.g., a location marker, etc.) and displays the device identifier associated with the emergency within the list of incidents 310 as an incident 312.

In addition to emergency locations, the emergency management application 360 can receive and visualize numerous types of emergency data from the ERDP. For example, the emergency management application 360 can receive additional data regarding an emergency, such as demographic or medical data associated with a person involved in the emergency (e.g., an emergency caller). In another example, the emergency management application 360 can receive data from sensors associated with the emergency, such as heart rate data collected by a sensor on an emergency caller's smartwatch. Or, for example, the emergency management application 360 can receive data regarding emergency response assets available for an emergency, as described below. According to some aspects of this disclosure, the emergency management application receives and visualizes messages received from emergency callers or other ESPs, as described below. The emergency management application 360 can visualize any emergency data received from the ERDP within the GUI of the emergency management application.

Emergency Data Transmission

FIGS. 4A and 4B depict systems and processes for receiving and transmitting emergency data by an emergency response data platform in accordance with some embodiments of the present disclosure. As described above, according to some aspects of this disclosure, an emergency response data platform (ERDP) maintains a clearinghouse that obtains and shares emergency data to aid emergency service providers (ESPs) in responding to emergencies. For example, as depicted in FIG. 4A, during an emergency, an ESP 430A can send a query for emergency data (also referred to as an "emergency data request") to the ERDP 410 (e.g., through an emergency management application 460A, as described above) for a particular emergency, and, in response, the ERDP 410 can send any available emergency data associated with the emergency back to the ESP 430A (such as through emergency management application 460A). According to some aspects of this disclosure, as described above, the emergency management application 460A includes an identifier associated with an emergency alert in the emergency data request. The ERDP 410 can then use the identifier associated with the emergency alert to retrieve emergency data associated with the emergency alert from the clearinghouse 420. For example, as described above, an ESP 430A (e.g., a public safety answering point (PSAP)) can receive an emergency alert in the form of a 9-1-1 phone call 432 (representative of an emergency or potential emergency) from a mobile phone 400A associated with a phone number (e.g., (555) 555-5555). The ESP 430A can then send an emergency data request including the phone number (i.e., the identifier associated with the emergency alert) to the ERDP 410, which can then retrieve any emergency data within the clearinghouse 420 associated with the phone number and return the available emergency data to the requesting ESP 430A. This process of returning emergency data to an ESP in response to an emergency data request is referred to as "pulling" emergency data from the clearinghouse.

As described above, according to some aspects of this disclosure, the emergency response data platform (ERDP) can "push" emergency data from the Emergency Clearinghouse to emergency service providers (ESPs), such as by using an emergency data subscription system (hereinafter, "subscription system"). FIG. 4B depicts a flow diagram of a process for pushing emergency data from the Emergency Clearinghouse to one or more ESPs. According to some aspects of this disclosure, a member of an ESP (e.g., a PSAP staff member) logs into the emergency management application 460B at an ESP system 430B (e.g., a computing device associated with the ESP) by accessing the emergency management application 460B (e.g., by navigating to the emergency management application 460B through a web browser) and submitting their login information through the GUI of the emergency management application 460B. According to some aspects of this disclosure, when the ESP member logs into the emergency management application 460B by submitting their login information, the emergency management application 460B or ERDP 410 then determines an ESP account ID associated with the ESP member's account and establishes a persistent or active communication link (e.g., a websocket connection) with the ESP system 430B, thereby automatically subscribing the ESP console to the ESP account ID for the duration of their login session. Then, as described above, when the ERDP 410 receives an emergency alert including a location (e.g., when an emergency call is made from an electronic device 400B and sends an emergency alert to the ERDP 410 including a location generated by the electronic device 400B), the ERDP 410 retrieves a geofence associated with every ESP registered with the ERDP 410 and determines if the location falls within any of the geofences. In response to determining that the location falls within a geofence associated with the ESP account ID, the ERDP 410 then associates the location with the ESP account ID, determines if there are any active or persistent communication links between the ERDP 410 and any computing devices subscribed to the ESP account ID. In this instance, because the ESP system 430B is subscribed to the ESP account ID and actively linked to the ERDP 410 through the persistent or active communication link, the ERDP 410 automatically pushes (e.g., from the clearinghouse) the emergency alert or emergency data associated with the emergency alert (e.g., the location, a phone number, etc.) to the ESP system 430B for display within the emergency management application 460B. According to some aspects of this disclosure, emergency alerts or emergency data associated with emergency alerts that have been pushed to an ESP are displayed within a jurisdictional awareness view, as described below.

For example, ESP system 430B and ESP system 430C are two different ESP consoles associated with the same ESP (e.g., two computing devices at the same public safety answering point (PSAP)), PSAP A. ESP system 430D is associated with a second ESP, PSAP B. One day, PSAP call-takers access and successfully log into the emergency management application 460 (emergency management application 460D-460D) at each of the three ESP system (ESP systems 430B-430D), thereby establishing three separate active communication links, one active communication link between the ERDP 410 and each of the three ESP consoles. The ESP consoles are automatically subscribed by the ERDP 410 to the ESP account IDs associated with their respective ESPs (ESP ID A for PSAP A and ESP ID B for PSAP B). Both PSAP A and PSAP B are associated with only one geofence, geofence A and geofence B, respectively. Geofences A and B do not overlap, especially for primary agencies which have authoritative jurisdiction. The geofences have previously been tagged within the ERDP 410 with their respective ESP account IDs (e.g., during a registration process for the emergency management application). It is contemplated that an ESP (e.g., a PSAP) may be associated with one or more geofences or sub-geofences. For example, the area where emergency calls may be made versus another area where text messages to 911 may be made. In another example, an ESP agency may have a specific geofence for responding to specific type of emergency, e.g., medical emergency geofence.

Later that day, an emergency call is made from communication device 400B, which causes communication device 400B to generate a first emergency alert including a first location of the communication device 400B and transmit the first emergency alert to the ERDP 410. When the ERDP 410 receives the first emergency alert, the ERDP 410 retrieves some or all of the geofences stored within the ERDP 410 and determines if the first location falls within any of the geofences stored within the ERDP 410. In this example, the ERDP 410 determines that the first location falls within geofence A, associated with PSAP A. In response, the ERDP 410 tags the first location with the ESP account ID associated with geofence A, ESP ID A. The ERDP 410 then determines if there are any active communication links between the ERDP and any ESP consoles subscribed to ESP ID A and automatically pushes (e.g., from the clearinghouse) the first emergency alert to those ESP consoles. In this example, both ESP system 430B and ESP system 430C are subscribed to ESP ID A, so the ERDP 410 automatically pushes the first emergency alert to both ESP system 430B and ESP system 430C for display within emergency management applications 460B and 460C, respectively, such as through a jurisdictional awareness view (as described below). The first location does not fall within geofence B, because geofence A and geofence B do not overlap, so the first emergency alert is not pushed to ESP system 430D, even though an active communication link has been established between the ERDP 410 and ESP system 430D.

Three minutes later, the ERDP 410 receives an emergency alert from electronic device 400D (e.g., a home security system) including a second location of the electronic device 400D. When the ERDP 410 receives the second emergency alert, the ERDP again retrieves some or all of the geofences stored within the ERDP 410 and determines if the second location falls within any of the geofences stored within the ERDP 410. In this example, the ERDP 410 determines that the second location falls within geofence B, associated with PSAP B. In response, the ERDP 410 tags the second location within the ESP account associated with geofence B, ESP ID B and automatically pushes the second emergency alert to ESP system 430D for display within emergency management application 460D, because ESP system 430D has an active communication link established with the ERDP 410 and ESP system 430D is subscribed to ESP ID B. The ERDP 410 does not push the second emergency alert to ESP system 430B or ESP system 430C. Although ESP system 430B and ESP system 430C have active communication links established with the ERDP 410, they are not subscribed to ESP ID B, and geofence A and geofence B do not overlap, meaning the second location does not fall within geofence A. Two minutes after that, the ERDP 410 receives an emergency alert from electronic device 400C (e.g., an intelligent vehicle system) including a third location of the electronic device 400C. The ERDP 410 determines that the third locations falls within geofence A (like the first location included in the first emergency alert) and thus automatically pushes the third emergency alert to both ESP system 430B and ESP system 430C for display within emergency management application 460B and 460C. According to some aspects of this disclosure, emergency management application 460B and emergency management application 460C display the first emergency alert and the third emergency alert simultaneously, such as through a jurisdictional awareness view, as described below.

Jurisdictional Awareness View

According to some aspects of this disclosure, the systems, applications, servers, devices, methods, and media of the instant application provide a jurisdictional awareness view within the emergency management application. According to some aspects of this disclosure, the jurisdictional awareness view enables an ESP to view one or more ongoing or recently received emergency alerts (e.g., emergency calls) within one or more geofenced jurisdictions. Although not shown, electronic emergency alerts based on alarms or sensors, activation of a panic button, etc. may be displayed in a similar fashion wherein the emergency alerts are not emergency calls. FIG. 3 illustrates the jurisdictional awareness view displayed within the emergency management application, in accordance with one embodiment of the present disclosure. According to some aspects of this disclosure, the jurisdictional awareness view includes a list of incidents 310 that displays one or more incidents 312 associated with one or more device identifiers (e.g. phone numbers, IP addresses). According to some aspects of this disclosure, the jurisdictional awareness view additionally or alternatively includes an interactive map 320 that displays one or more incident locations 324 associated with the one or more incidents 312 associated with the one or more device identifiers, as described below. According to some aspects of this disclosure, the jurisdictional awareness view displays incidents and incident locations only for emergencies occurring within the jurisdiction 322 of the ESP at which the emergency management application 360 is being accessed.

For example, in the example illustrated in FIG. 3, an ESP has accessed an emergency management application 360 provided by the ERDP. In this example, the ERDP has pushed emergency data associated with five different emergency alerts to the ESP (as described above) through the emergency management application 360. Accordingly, the emergency management application 360 displays five different incidents 312 (e.g., incidents 312A-312E) within the list of incidents 310 and five corresponding incident locations 324 (e.g., incident locations 324A-324E) within the interactive map 320. As illustrated by FIG. 3, according to some aspects of this disclosure, incidents 312 and incident locations 324 may be selected or hovered over to highlight a particular incident 312. In this example, incident 312C and its corresponding incident location 324C have been selected and highlighted. According to some aspects of this disclosure, selecting a particular incident 312 or corresponding incident location 324 prompts the emergency management application 360 to display additional information associated with the particular incident 312 (e.g., additional emergency data or information associated with the emergency alert for which the particular incident 312 was created). Because the jurisdictional awareness view can show an ESP numerous incidents 312 occurring within the jurisdiction 322 of the ESP simultaneously, the jurisdictional awareness view can provide the ESP with situational awareness that the ESP otherwise would not have. For example, with the knowledge that incidents 312A and 312B originated in close proximity and at approximately the same time, an ESP personnel (e.g., a call taker at a public safety answering point) can determine that the two incidents may be related.

Facilitating an Emergency Response Via an Emergency Response Device

Figure 5:
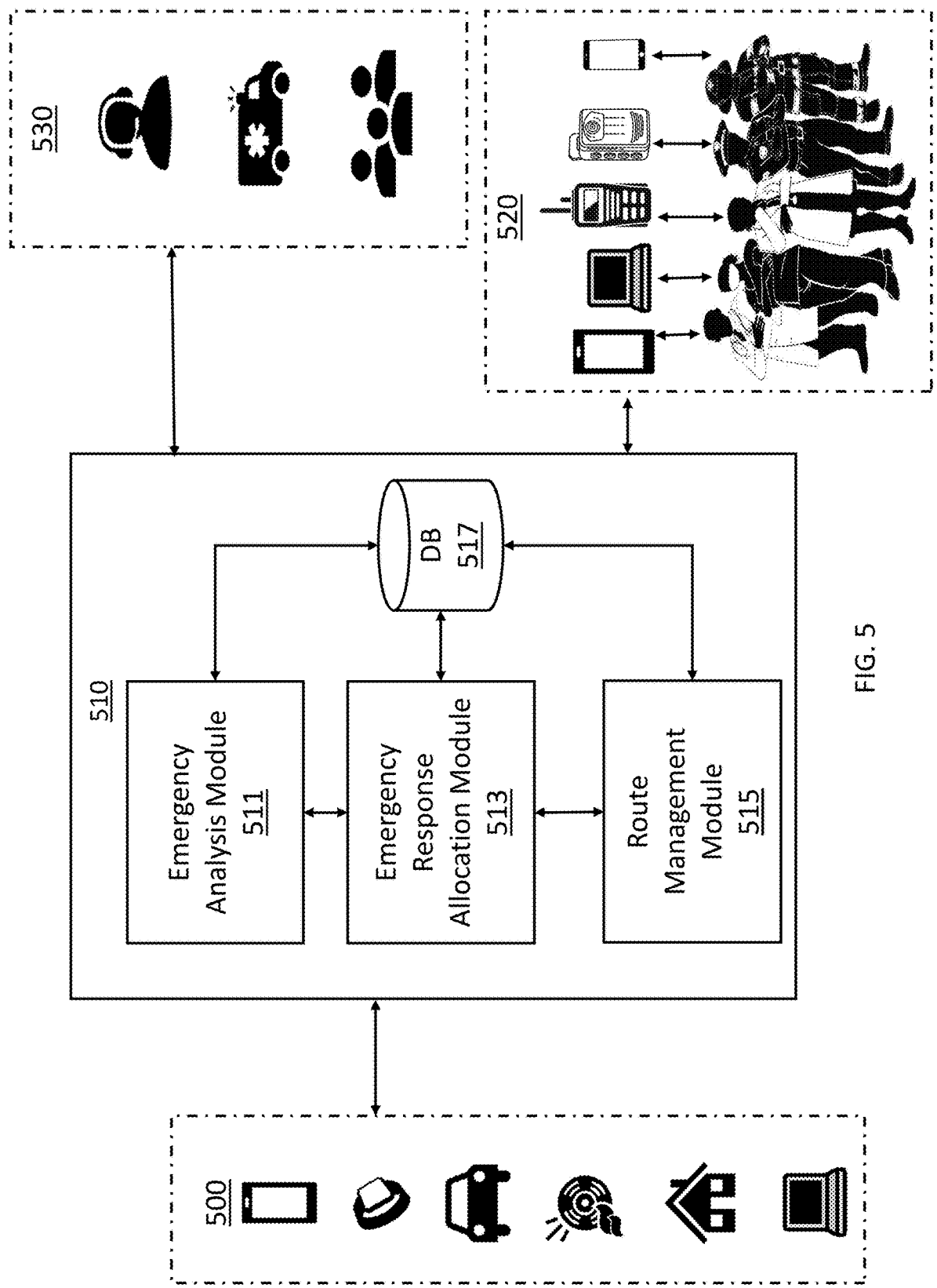
FIG. 5 depicts a diagram of an emergency response data platform for facilitating an emergency response, in accordance with some embodiments of this disclosure.

FIG. 5 shows an example system for facilitating an emergency response, according to aspects of this disclosure. An emergency response data platform (ERDP) can receive emergency data/information from one or more sources, such as a user device, a mobile device, a smart device, a data-sensing device, an Internet-of-Things (IoT) device, and/or the like, and determine a type and/or location of an emergency. The system for facilitating an emergency response enables the ERDP to determine one or more emergency response devices within proximity to the emergency and determine which of the one or more emergency response devices are best suited and/or the most capable emergency response device for responding to the emergency based on a capability and/or function associated with the emergency response device.

The ERDP can cause pertinent information associated with the emergency to be sent to the emergency response device, such as an optimal route to the location of the emergency, situational data (e.g., dangerous environments, support/equipment and/or safety asset requirements, medical conditions affecting one or more persons, etc.) associated with the emergency, and/or the like.

The example system for facilitating an emergency response, as described herein, can determine an emergency response device (and/or user of the emergency response device such as first responder, an emergency service provider (ESP), etc.) of a plurality of emergency response device best suited to respond to an emergency and send the emergency response device pertinent information associated with the emergency. Determining an emergency response device best suited to respond to an emergency, as described herein, provides practical improvement to at least emergency medical system (EMS) technology and/or the technical field of emergency response management—a field where even modest delays in emergency response times can be life-threatening for individuals with emergent conditions (eg, cardiopulmonary arrest, severe bleeding, airway occlusion, etc.). Determining an emergency response device best suited to respond to an emergency considers the relative distance of multiple emergency response devices to an emergency, and enables the emergency response device and/or responder associated with the emergency response device to arrive on the scene of the emergency minutes earlier than enabled by traditional responder allocation systems. The system for facilitating an emergency response can determine, for example, an emergency response device best suited to respond to an emergency to enable a first responder to be equipped with the most necessary equipment/support devices for addressing an emergency and/or be aware of information that could prove life-critical given the situation. Determining an emergency response device best suited to respond to an emergency enables emergency response devices (and/or users of the emergency response devices) that are not best suited to respond to an emergency to avoid attending/responding to the emergency due to an emergency call. For example, emergency response devices (and/or users of the emergency response devices) that are not best suited to respond to an emergency can remain available to quickly respond to a different emergency (e.g., such as a life-threatening situation, a public/private dangerous situation, etc.) for which they can be better suited. During an emergency, when time is of the essence, determining an emergency response device best suited to respond to the emergency saves time and/or expedites an emergency response by preventing the need to reassign an emergency call from an initially assigned emergency response device to a different emergency response device because the initially assigned emergency response device is associated with an ongoing/previous emergency and unable to promptly respond to the current emergency.

According to aspects of this disclosure, an emergency data source 500 can include and/or be similar to the emergency data source 100 of FIG. 1, the ESP 530 can include and/or be similar to ESP 130 of FIG. 1, and an emergency response data platform (ERDP) 510 can include and/or be similar to the ERDP 110 of FIG. 1. In an aspect, the ERDP 510 can include additional systems, components, and/or capabilities to facilitate a response to an emergency, for example, via an emergency response device of a plurality of emergency response devices 520. As shown, each emergency response device of the plurality of emergency response devices 520 can be associated with a first responder (e.g., a law enforcement officer, a paramedic, an emergency medical technician, a firefighter, etc).

As illustrated in FIG. 5, an emergency data source 500 can communicate with an emergency response data platform (ERDP) 510. For example, the emergency data source 500 can communicate data/information (e.g., audio content, video content, textual content, sensor data/information, etc.) indicative of and/or associated with an emergency to the ERDP 510 that may be analyzed by the ERDP 510 to determine/facilitate a response action and/or communicated to an emergency service provider (ESP) 530. According to aspects of this disclosure, the emergency data source 500 can include and/or be similar to the emergency data source 100 (FIG. 1), the ESP 530 can include and/or be similar to ESP 130 (FIG. 1), and the ERDP 510 can include and/or be similar to the ERDP 110 (FIG. 1).

The ERDP 510 can include an emergency analysis module 511, an emergency response allocation module 513, a route management module 515, and a database 517. The emergency analysis module 511, the emergency response allocation module 513, the route management module 515, and/or the database 517 may include additional components (not shown) and/or communicate with additional components and/or systems of the ERDP 510 to facilitate and/or support an emergency response. Further, the ERDP 510 can include additional components and/or systems, for example, as described according to FIG. 1. In an aspect, the ERDP 510 can include fewer components and/or systems and/or a combination of different components and/or systems.

According to aspects of this disclosure, the emergency analysis module 511 can be configured to receive communications, such as emergency communications, from the emergency data source 500. An emergency communication can include, for example, a telephonic communication (e.g., audio content, a landline call, a cellular line call, a Voice over Internet Protocol (VoIP) call, etc.), a short message service (SMS) message, an internet-based messaging, multimedia content (e.g, a recorded audio/video feed, a live audio/video feed, etc.), output from one or more devices/sensors, and/or the like. For example, the emergency analysis module 511 may include one or more speakers, microphones, and/or the like for outputting, sending, and/or receiving audio content from the emergency data source 500 to one or more users (e.g., telecommunicators, call-center operators, etc.) that may analyze the audio content and determine emergency data/information. In an aspect, the emergency analysis module 511 may be configured for natural language processing, keyword determination/identification, and/or the like. The emergency analysis module 511 may use natural language processing, keyword determination/identification, a trained machine learning model, and/or the like to determine emergency data/information from audio content and/or the like received, for example, from the emergency data source 500. In an aspect, the emergency analysis module 511 may be configured for image classification, object recognition, motion detection, and/or the like. The emergency analysis module 511 may use image classification, object recognition, motion detection, a trained machine learning model, and/or the like to determine emergency data/information from video content and/or the like received, for example, from the emergency data source 500. In an aspect, the emergency analysis module 511 may be configured for textual analysis, content analysis, and/or the like. The emergency analysis module 511 may use textual analysis, content analysis, and/or the like to determine emergency data/information (e.g., one or more terms indicative of an emergency, etc.) from textual content and/or the like received, for example, from the emergency data source 500. The emergency analysis module 511 may determine emergency data/information from any data/information received from the emergency data source 500.

Emergency data/information may include any data/information indicative of an emergency and/or associated with an emergency. For example, emergency data/information may include an oral/audio request for help/assistance and/or an indication of a condition (e.g., a physical condition, a mental condition, a medical/health condition, etc.), a visual and/or visually determined request for help/assistance and/or an indication of a condition (e.g., a physical condition, a mental condition, a medical/health condition, etc.), a textual request for help/assistance and/or an indication of a condition (e.g., a physical condition, a mental condition, a medical/health condition, etc.), a data signal (e.g., a signal from an emergency monitoring device and/or a data-sensing device, etc.) indicative of an emergency event and/or a condition (e.g., a physical condition, a mental condition, a medical/health condition, etc.). In some instances, emergency data/information may indicate a type of emergency and a location associated with the emergency. For example, a person associated with and/or involved in an emergency may make an emergency call (e.g., a telephonic communication, etc.) and indicate the type of emergency and a location where the emergency occurs.

According to aspects of this disclosure, emergency data/information may be automatically determined from data/information received from the emergency data source 500. For example, a camera and/or video surveillance device, based on one or more security/user settings, may capture and send video indicative of an emergency (e.g., motion occurring within a secure area/region, an act of violence, etc.) to the emergency analysis module 511. The video indicative of the emergency and location information associated with the camera and/or video surveillance device may be received by the emergency analysis module 511. The emergency analysis module 511 may be configured, for example, via a trained machined learning model and/or the like, to determine a type of emergency indicated by the video. For example, the trained machined learning model may determine that objects identified in video content such as blood, guns, knives, and/or the like indicate a type of emergency (e.g., homicide, an altercation, etc.). The trained machined learning model may classify any objects and/or actions depicted in video content, and predict/determine any type of emergency based on the classified objects and/or actions.

According to aspects of this disclosure, the emergency analysis module 511 can determine emergency data/information, such as a type of emergency and/or the like, based on a type of device and/or component of the emergency data source 500 providing data/information to the ERDP 510 (e.g., the emergency analysis module 511, etc.). For example, the ERDP 510 may access a look-up table and/or the like, stored in a database 517, that associates device types with types of emergencies. For example, data/information received from a heart monitoring device associated with the emergency data source 500 may correspond to a medical emergency, data/information received from a motion-sensing device associated with the emergency data source 500 may correspond to an intruder-based emergency, and data/information received from a smoke detection device associated with the emergency data source 500 may correspond to a fire emergency. The emergency analysis module 511 can determine any type of emergency based on data/information received from any type of device, system, and/or component.

As similarly described for the ERDP 110 of FIG. 1, the ERDP 510 (e.g., the emergency analysis module 511, etc.) may utilize various methods/techniques to determine location information associated with an emergency. For example, location information associated with an emergency may be determined based on verbally receiving locations from callers, and/or receiving accurate locations (as well as additional emergency data, etc.) from electronic devices. Emergency data/information, such as location information and emergency types may be used to determine one or more emergency response devices of a plurality of emergency response devices 520 to respond to an emergency.

An emergency response device may send functionality/capability information to the ERDP 510 (e.g., the emergency response allocation module 513, etc.). For example, an emergency response device of the plurality of emergency response devices 520 can send data/information, such as location information and/or functionality/capability information, to the ERDP 510 via an application, webpage, direct communication, and/or the like. Data/information from the plurality of emergency response devices 520 may be stored, for example, at the database 517 and retrieved/accessed by the emergency response allocation module 513.

According to aspects of this disclosure, the emergency response allocation module 513 can use emergency data/information, such as a type of emergency, location information associated with the emergency, and/or the like to determine one or more emergency response devices of the plurality of emergency response devices 520 to facilitate a response to the emergency. For example, the emergency response allocation module 513 can receive data/information associated with the plurality of emergency response devices 520 from the emergency response devices. For example, an emergency response device may send location information to the ERDP 510 (e.g., the emergency response allocation module 513, etc.). Location information associated with an emergency response device may be periodically updated. For example, an emergency response device may periodically send updates to location information associated with the emergency response device to the ERDP 510 (e.g., the emergency response allocation module 513, etc.), and/or the ERDP 510 (e.g., the emergency response allocation module 513, etc.) may periodically request updates to the location information from the emergency response device. For example, location information may be updated whenever an emergency response device changes locations (e.g., moves from a current location, area, and/or region).

An emergency response device, for example, of the plurality of emergency response devices 520, may send functionality/capability information to the ERDP 510 (e.g., the emergency response allocation module 513, etc.). For example, the emergency response device may send an indication to the ERDP 510 (e.g., the emergency response allocation module 513, etc.) that the emergency response device is associated with a type of first responder (e.g., a law enforcement officer, a paramedic, an emergency medical technician, a firefighter, etc.) and/or the like, and/or an indication that the emergency response device is equipped and/or configured for one or more functionalities (e.g., audio/video recording, language translation, health monitoring, defibrillation, vital signal transmission, autonomous fight/control, thermal imaging, distance/depth measurement, etc.). Functionality/capability information associated with emergency response devices of the plurality of emergency response devices 520 may be stored, for example, at the database 517 and retrieved/accessed by the emergency response allocation module 513.

When the ERDP 510 receives data/information indicative of an emergency from the emergency data source 500, the ERDP 510 can determine one or more emergency response devices, for example, of the plurality of emergency response devices 520, within proximity to the emergency. The ERDP 510 can determine which of the one or more emergency response devices are best suited and/or the most capable emergency response device for responding to the emergency, for example, based on a capability and/or function associated with the emergency response device. For example, as described, each emergency response device of the plurality of emergency response devices is associated with a respective location. To determine emergency response devices that are best suited and/or the most capable emergency response device for responding to the emergency, the ERDP 510 may determine one or more emergency response devices within proximity to the location of the emergency, such as one or more emergency response devices that are within a distance threshold associated with the location of the emergency. For example, a distance threshold can be set at three miles, and the ERDP 510 can determine one or more emergency response devices located within three miles of the location of an emergency. In an aspect, a distance threshold may be determined based on a type of emergency, a type of device determining/detecting an emergency, a user preference/setting, and/or any other criterion. In an aspect, a distance threshold can be set at any value, and/or a distance threshold may be satisfied by emergency response devices at any distance from the location of an emergency.

According to aspects of this disclosure, the emergency response allocation module 513 can determine a plurality of emergency response devices that are within proximity (e.g., satisfy a distance threshold, etc.) to an emergency, and cause a representation of the plurality of emergency response devices to be displayed on a GUI of an emergency management application associated with the ERDP 510. For example, a GUI may display an interactive element indicative of the location associated with the emergency and display a plurality of interactive elements indicative of the plurality of emergency response devices. The ERDP 510 (e.g., the emergency response allocation module 513, etc.) may receive a selection (e.g., via a touchscreen, a mouse, an audio instruction, a stylus, a haptic interaction, etc.) of an interactive element indicative of n emergency response device, for example, based on the type of the emergency corresponding to an emergency response function associated with the emergency response device. An emergency response device best suited to respond to an emergency may be determined, for example, by a user selecting the emergency response device as the emergency response device best suited to respond to the emergency.

Figure 6A:
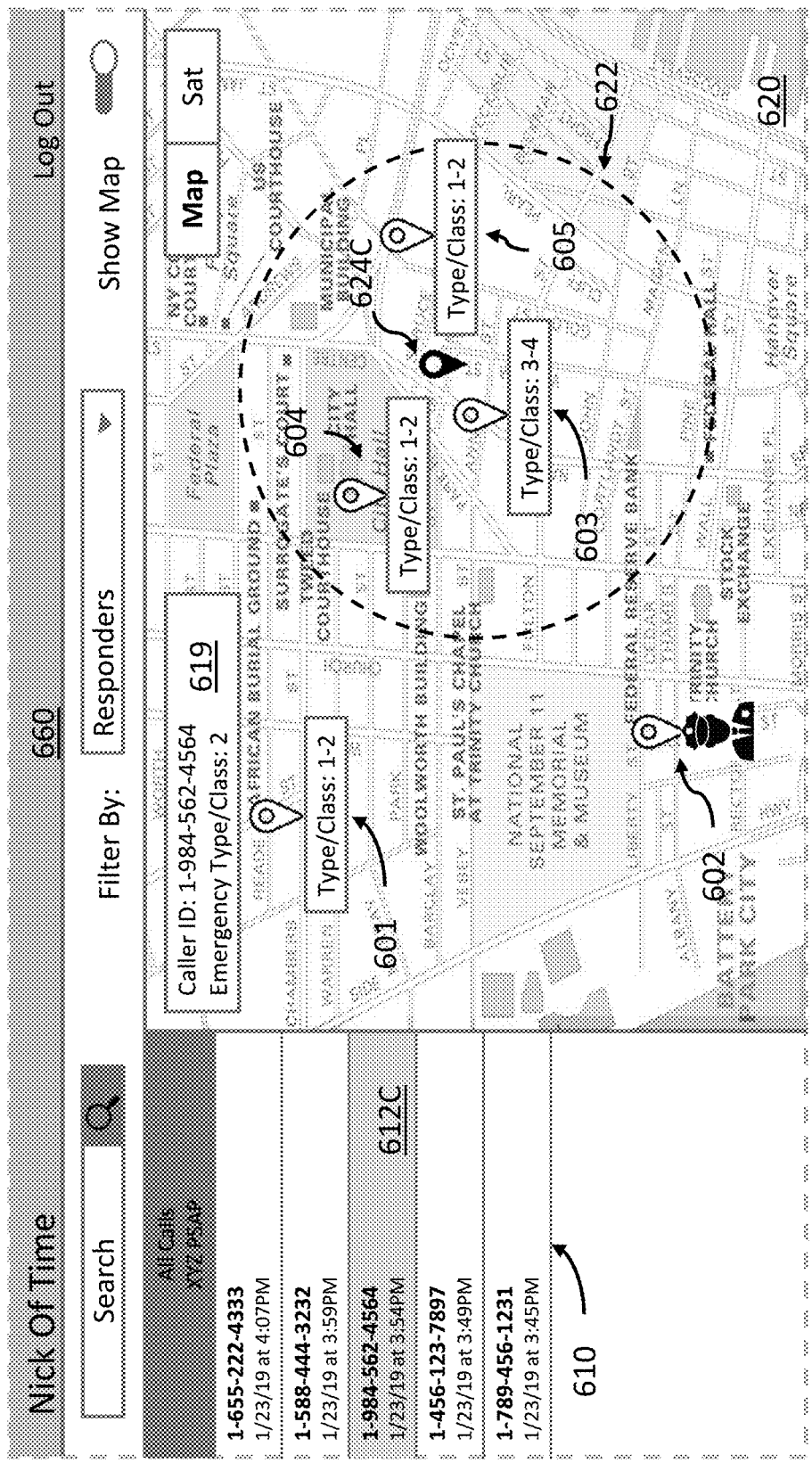
FIG. 6A illustrates an exemplary graphical user interface (GUI) provided by an emergency management application for facilitating an emergency response, in accordance with some embodiments of this disclosure.

FIG. 6A shows an example GUI provided by an emergency management application 660 for facilitating a response to an emergency, according to aspects of this disclosure of the present disclosure. The emergency management application 660 can be generated and/or provided by the ERDP 510 and configured with similar functionality as the emergency management application 360 of FIG. 3. The emergency management application 660 may include an interactive map 620. In some examples, information window 619 is associated with incident 612C of a list of incidents 610. A corresponding incident location 624C (that has been selected and highlighted) within a jurisdiction 622 of the ESP can correspond to the incident 612C.

The emergency management application 660 may display interactive elements 601-605 indicative of a plurality of emergency response devices. A type/class (e.g., functionality, capability, etc.) of each emergency response device may be displayed with the respective interactive elements 601-605. As shown for interactive elements 601, 603, 604, and 605, a type/class value of the respective emergency response device may also be displayed. A type/class value may correspond to a functionality/capability of an emergency response device and/or a type of user (e.g, a first responder, etc.) the emergency response device is associated with. An emergency response device may be associated with one or multiple type/class values. According to some aspects of this disclosure, as shown in FIG. 6A at the interactive element 602, a type/class of an emergency response device may be represented by an icon, picture, design, and/or the like. For example, the interactive element 602 includes a police officer icon to indicate that the respective emergency response device is associated with a police officer.

To determine an emergency response device best suited to respond to the incident 612C, the emergency response allocation module 513 (via the emergency management application 660) may receive a selection (e.g., via a touchscreen, a mouse, an audio instruction, a stylus, a haptic interaction, etc.) of at least one of the interactive elements 601-605. For example, a user (e.g., a telecommunicator, etc.) may select the interactive element 605 as an emergency response device best suited to respond to the incident 612C. The selection of the interactive element 605 may be, for example, based on the incident 612C corresponding to an emergency response function associated with the emergency response device represented by the interactive element 605, and/or the indicated location of the emergency response device associated with the interactive element 605 being within proximity to the incident 612C.

Returning to FIG. 5, as described, the emergency response allocation module 513 can determine which of the plurality of emergency response devices 520 are within proximity (e.g., satisfy a distance threshold, etc.) to an emergency. According to aspects of this disclosure, the emergency response allocation module 513 can determine (e.g., automatically determine, etc.) an emergency response device best suited to respond to an emergency. For example, the emergency response allocation module 513 can determine that an emergency response function associated with at least one emergency response device of the plurality of emergency response devices 520 corresponds to the type of emergency. For example, database 517 may store a look-up table and/or the like that associates emergency types with device emergency response functions. The emergency response allocation module 513 can access and use the look-up table and/or the like that associates emergency types with device emergency response functions to determine that an emergency response function associated with at least one emergency response device of the plurality of emergency response devices 520 corresponds to the type of the emergency.

In some instances, the emergency response allocation module 513 may determine that two or more emergency response devices, for example, of the plurality of emergency response device 520, include the same functionality/capability and are equidistant to an emergency. In such instances, the emergency response allocation module 513 can determine that each of the emergency response devices is best suited to respond to the emergency. Alternatively, in such instances, the emergency response allocation module 513 may use a selection (e.g. round-robin selection, first-in-first-out based selection, last-in-first-out based selection, random selection, etc.) algorithm to select the emergency response device best suited to respond to the emergency. The emergency response allocation module 513 can any other method to determine an emergency response device best suited to respond to an emergency.

According to aspects of this disclosure, the ERDP 510 may cause an emergency response device determined to be the best suited to respond to an emergency to receive directions and/or routing information to a location of the emergency. For example, route management module 515 can send the emergency response device directions and/or routing information to the location of the emergency. The route management module 515 can be configured to determine an optimal route from a starting location (e.g., a location of an emergency response device, etc.) to a destination location (e.g., a location of an emergency event, etc.), for example, based on the map data stored in and/or accessible via the database 517, map data stored locally on the emergency response device, map data accessible via a remote data source (e.g., a geographic information system (GIS), etc.), a third-party mapping service (e.g., a web mapping platform, etc.), and/or the like. The route may include a plurality of route segments connecting a plurality of geographical locations along the route from the starting location to the destination location. Each route segment may correspond to a physical connection or part of a physical connection, for example, such as a street, a road, a highway, and/or the like. An optimal route may be the shortest path from the starting location to the destination location.

According to aspects of this disclosure, to ensure that the emergency response device can communicate with the ERDP 510, the ERDP 510 may determine an optimal route that includes the shortest path from the starting location to the destination location, and also includes acceptable network conditions. For example, the route management module 515 may be configured to periodically determine network conditions (e.g., errors, bandwidth, latency, etc.) within a designated region and/or area, such as a jurisdiction (e.g., the jurisdiction 622 of FIG. 6, etc.) of an emergency service provider (ESP). The route management module 515 can also determine the operational status of one or more network devices (e.g., access points, gateways, communication towers, etc.) within the designated region and/or area of the ESP. The route management module 515 can determine an optimal route, for example, by adjusting road cost information based on the determined network conditions and applying a graph search algorithm to determine the shortest path.

According to aspects of this disclosure, the route management module 515 may send an emergency response device determined to be best suited to respond to an emergency an indication of an optimal route to a location of the emergency. The optimal route may be accessible, for example, via a hyperlink included with a notification sent to the emergency response device and/or displayed via a GUI and/or the like.

Figure 6B:
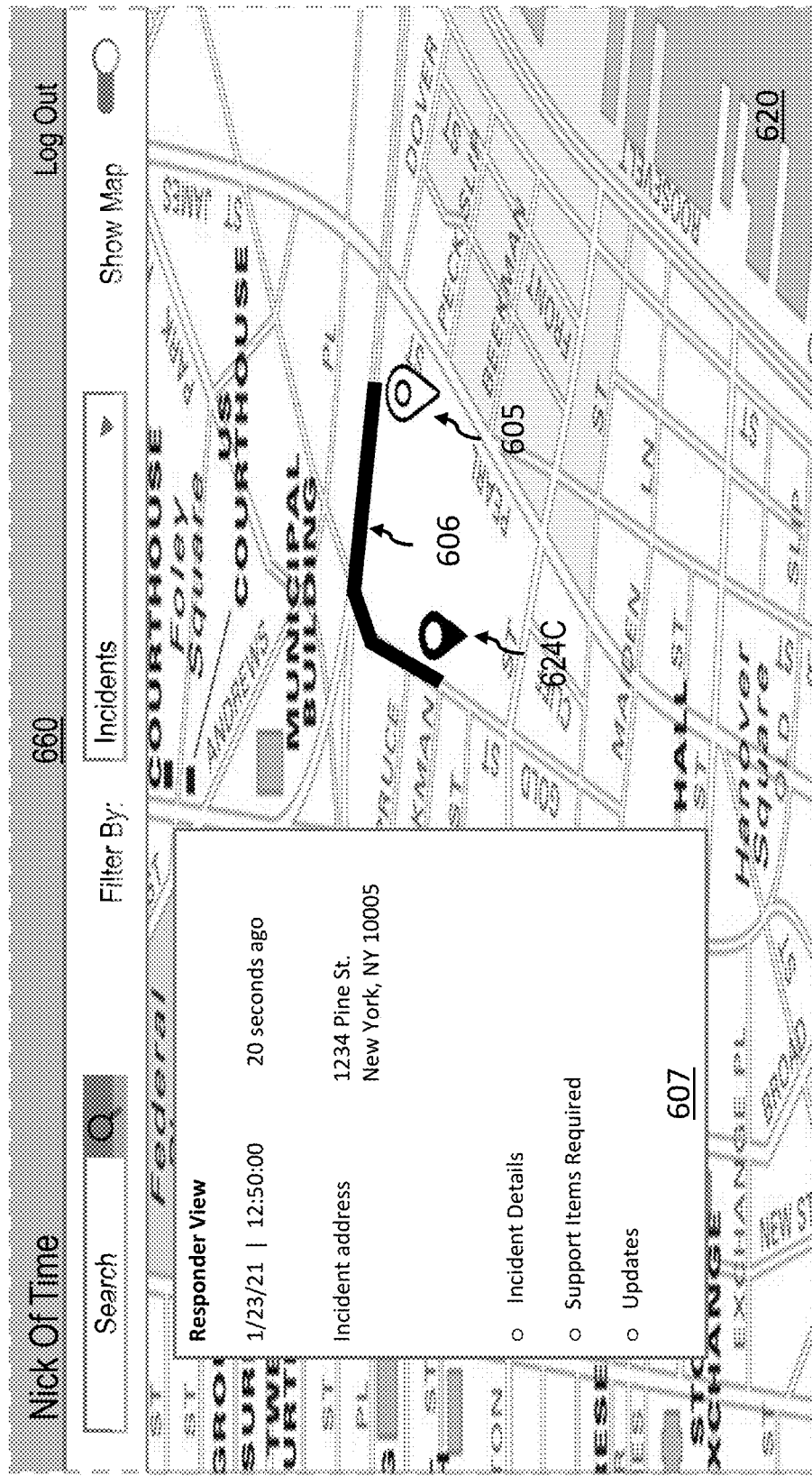
FIG. 6B illustrates another exemplary GUI provided by the emergency management application for facilitating an emergency response, in accordance with some embodiments of this disclosure.

FIG. 6B shows an example GUI provided by an emergency management application 660 for facilitating a response to an emergency, according to aspects of this disclosure of the present disclosure. The emergency management application 660 can be generated and/or provided by the ERDP 510 and configured with similar functionality as the emergency management application 360 of FIG. 3. The emergency management application 660 may display, obscure, and/or filter features, options, and/or designs based on the type of user accessing the emergency management application 660. For example, FIG. 6B can represent a "responder view" of the emergency management application 660 that is accessible by a user associated with an emergency response device. The interactive map 620 may display/include the corresponding incident location 624C (that has been selected and highlighted) and the interactive element 605 representing the emergency response device determined to be the best suited to respond to the incident 612C (FIG. 6A) occurring at the incident location 624C. An interactive element 606 represents the optimal route determined by the route management module 515. According to aspects of this disclosure, interaction with the interactive element 606 can cause information associated with the optimal route to be displayed, such as traffic conditions, weather conditions, network conditions, and/or any other information associated with the optimal route. In some examples, an emergency response device responding to an emergency and/or traveling to an emergency location can receive pertinent information associated with the emergency, for example, such as situational data (e.g., an indication of dangerous environments, additional support/equipment requirements, medical conditions affecting one or more persons, etc.) associated with the emergency, emergency status updates, and/or the like. For example window 607 may display information associated with the incident 612C (FIG. 6A) occurring at the incident location 624C.

According to aspects of this disclosure, pertinent information associated with an emergency, such as pertinent information associated with the incident 612C (FIG. 6A) occurring at the incident location 624C, can be encrypted and/or secured. Pertinent information associated with an emergency may be sent to an emergency response device via a secured path and/or may be accessible based on validation and/or verification of the emergency response device (and/or a user of the emergency response device) via one or more security protocols (e.g., a password/login process, a key/token exchange, a push notification process, a third-party identity verification process, etc.).

Returning to FIG. 5, according to aspects of this disclosure, the route management module 515 can determine/predict the arrival of an emergency response to an emergency location. For example, the route management module 515 may include a trained machine learning model configured to determine/predict the arrival of an emergency response to an emergency location. The route management module 515 may use any method to determine/predict the arrival of an emergency response to an emergency location. An indication of the arrival of an emergency response to an emergency location provides reassurance to a person who is experiencing the emergency and they can plan for the wait. For example, a user who has a bleeding wound may apply pressure to the wound until first responders associated with the emergency response device arrive at the location of the emergency.

According to aspects of this disclosure, the route management module 515 can determine if it has current and/or real-time location data/information associated with an emergency response device responding to an emergency. If the current location data of the emergency response device is known, then, for example, commercial driving navigation APIs can be used to estimate distance and time of arrival. If there is more than one emergency response device responding to the emergency, the location of each emergency response device may be averaged. Based on the estimate for distance and time of arrival, the route management module 515, for example, via the emergency management application, may cause display of the emergency response device and/or responder location based on user authorization. For example, according to aspects of this disclosure, certain users such as a first responder (e.g., a law enforcement officer, a paramedic, an emergency medical technician, a firefighter, etc.) an ESP telecommunicator, and/or the like may be determined to be a "privileged" user authorized to view the location of emergency response devices of the plurality of emergency response device 520 (and/or responders associated with emergency response devices) responding to an emergency. If the user has authorization, the location of emergency response devices (and/or responders associated with emergency response devices) can be shared with the user.

According to aspects of this disclosure, when a user is authorized to view the location of emergency response devices of the plurality of emergency response device 520 (and/or responders associated with emergency response devices) responding to an emergency, time estimates (e.g. estimated time of arrival. ETA) can be shared with the user. According to aspects of this disclosure, the ETA can be determined by the route management module 515, According to aspects of this disclosure, the ETA can be determined using commercially available navigation software. According to aspects of this disclosure, if time estimates are available and the user is authorized to view them, then distance estimates are not calculated.

According to aspects of this disclosure, when a user is not authorized to view time estimates, a travel distance associated with the emergency response devices of the plurality of emergency response device 520 (and/or responders associated with emergency response devices) responding to an emergency can be shared with the user. According to aspects of this disclosure, users with lower privilege (e.g. general users) can be authorized to view a travel distance associated with the emergency response devices (and/or responders associated with emergency response devices) responding to an emergency instead of the real-time location of the emergency response devices (and/or responders associated with emergency response devices). According to aspects of this disclosure, a user may not be authorized to view any type of responder forecast.

According to aspects of this disclosure, the location, time estimate, and distance associated with the emergency response devices of the plurality of emergency response device 520 (and/or responders associated with emergency response devices) responding to an emergency can be determined periodically based on updated location data/information associated with the emergency response devices. According to aspects of this disclosure, estimates for the responder forecasts (ETAS of emergency response devices responding to an emergency, etc.) can be adjusted, for example, by the route management module 515, taking into account factors such as ongoing emergencies, current driving conditions, inclement weather, and/or the like.

Facilitating Synchronized Emergency Communications

Figure 7A:
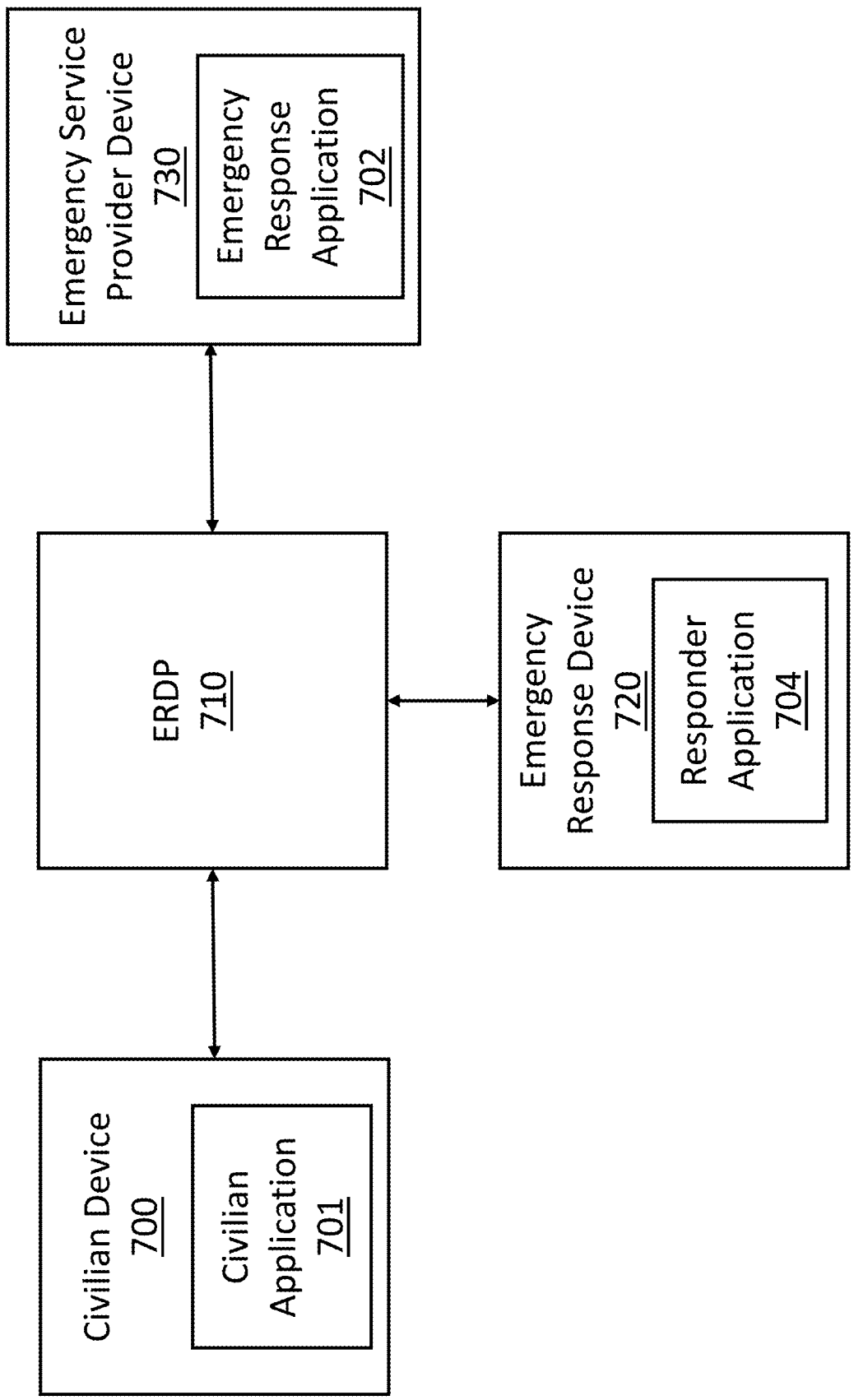
FIG. 7A illustrates an example system for managing emergency communications, in accordance with some embodiments of this disclosure.

FIG. 7A shows an example system for facilitating synchronized emergency communications, according to aspects of this disclosure. An emergency response data platform (ERDP) can receive an indication, such as an emergency alert, regarding an ongoing emergency, based on emergency data/information received from a civilian device (e.g., a user device, a mobile device, a smart device, a data-sensing device, an Internet-of-Things (IoT) device, etc.). The ERDP can determine and/or gather/collect emergency data/information associated with the emergency alert. For example, emergency data/information associated with the emergency alert can include a type and/or location of the emergency, one or more emergency response devices within proximity to the emergency best suited and/or the most capable to respond to the emergency, an optimal route to the location of the emergency, an estimated time of arrival for the one or more emergency response devices, situational data (e.g., dangerous environments, support/equipment and/or safety asset requirements, medical conditions affecting one or more persons, etc.) associated with the emergency, and/or the like.

The ERDP can send an emergency service provider device the emergency data/information associated with the emergency alert. The ERDP can send at least a portion and/or subset of the emergency data/information associated with the emergency alert to the civilian device, the one or more emergency response devices, and/or the emergency service provider device. For example, the ERDP can send the at least a portion and/or subset of the emergency data/information associated with the emergency alert via one or more applications, APIs, and/or the like configured with the civilian device, the one or more emergency response devices, and/or the emergency service provider device. The ERDP can synchronize communications associated with the emergency alert, for example, by sending the emergency data/information associated with the emergency alert to the emergency service provider device and at least a portion and/or subset of the emergency data/information associated with the emergency alert to the civilian device and/or the one or more emergency response devices simultaneously, in real-time, and/or the like.

According to aspects of this disclosure, the emergency response data platform (ERDP) 110 (FIG. 1), the emergency flow management system (EFMS) depicted in FIG. 2, the (ERDP) 510 (FIG. 5), and/or any other device/component described herein can facilitate synchronized emergency communications. For example, as shown in FIG. 7A, according to aspects of this disclosure, a civilian device 700 (e.g., a mobile device, a user device, a communication device, a computing device, a smart device, a wearable device, an Internet of Things (IoT) device, etc.) can be configured as, can include, and/or be similar to the emergency data source 100 of FIG. 1 and/or the emergency data source 500 of FIG. 5. The civilian device 700 can be, for example, operated by a civilian (e.g., a layman, a user, etc.), such as a person experiencing an emergency. An emergency service provider (ESP) device 730 can be configured as, can include, and/or be similar to the ESP 130 of FIG. 1 and/or the ESP 530 of FIG. 5. The ESP device 730 can be, for example, operated by personnel (e.g., an operator, a telecommunicator, an emergency communication coordinator, etc.) of an emergency service provider. An emergency response data platform (ERDP) 710 can include and/or be similar to the ERDP 110 of FIG. 1 and/or the ERDP 510 of FIG. 5. In an aspect, the ERDP 710 can include additional systems, components, and/or capabilities to facilitate synchronized emergency communications between the civilian device 700, the ESP device 730, and an emergency response device 720. The emergency response device 720 can be configured as, can include, and/or be similar to any of the plurality of emergency response devices 520 of FIG. 5. The emergency response device 720 can be, for example, operated by a first responder (e.g., a law enforcement officer, a paramedic, an emergency medical technician, a firefighter, etc.).

The civilian device 700 can be configured with a civilian application 701. The civilian application 701 can be communicatively coupled to the ERDP 710 (e.g., an emergency management system (EMS), etc.). The civilian application 701 can be configured to receive and/or generate emergency information that can be sent to the ERDP 710. For example, a civilian (e.g., a layman, a user, etc.), such as a person experiencing an emergency, can use the civilian device 700 to call in, email, text, and/or otherwise communicate information associated with the emergency to the ERDP 710. In some instances, the civilian can log into the civilian application 701 and the civilian application 701 can capture/receive information associated with the emergency, for example via audio content, video content, textual content, and/or the like. In some instances, the civilian application 701 can be configured to automatically capture/receive information associated with the emergency based on one or more triggers, such as detecting that an emergency number (e.g., 911, etc.) has been dialed, information received from one or more sensors, interaction with an interactive element (e.g., a panic button, etc.), and/or the like. Information associated with an emergency can be sent to the ERDP 710 (e.g., an emergency management system (EMS), etc.), for example via the civilian device 700 and/or the civilian application 701, and the ERDP 710 can generate and/or output an emergency alert and/or emergency data associated with the emergency alert.

The ESP device 730 can be configured with an emergency management application 702. The emergency management application 702 can be communicatively coupled to the ERDP 710. The emergency management application 702 can be configured with similar functionality as the emergency management application 360 of FIG. 3 and/or the emergency management application 660 of FIG. 6. The emergency management application 702 can receive emergency information, such as an emergency alert and/or emergency data associated with the emergency alert from the ERDP 710. The emergency management application 702 can cause a display of the emergency alert and/or the emergency data associated with the emergency alert, for example, within a GUI of the emergency management application 702. For example, FIG. 3 and FIG. 6 both show example GUIs that can be generated and/or output by the emergency management application 702 to display an emergency alert (e.g., incidents 312A-E, incident 612C, etc.) and/or emergency data associated with the emergency alert (e.g., incident location 324C, information window 619, etc.). The emergency management application 702 can be configured to cause and/or prompt the ERDP 710 to send the emergency alert and the emergency data associated with the emergency alert to the emergency response device 720.

The emergency response device 720 can be configured with a responder application 704. The responder application 704 can be communicatively coupled to the ERDP 710. The responder application 704 can be configured with similar functionality as the response application 660 of FIG. 6B.

The responder application 704 can receive an emergency alert and/or emergency data associated with the emergency alert from the ERDP 710. The responder application 704 can cause a display of the emergency alert and/or the emergency data associated with the emergency alert, for example, within a GUI and/or the like of the responder application 704. For example, FIG. 6B shows an example GUI that can be generated and/or output by the responder application 704 to display an emergency alert (e.g., an alert for incident 612C (FIG. 6A) occurring at the incident location 624C, etc.) and/or emergency data associated with the emergency alert (e.g., window 607 displaying information associated with the incident 612C (FIG. 6A) occurring at the incident location 624C, etc.).

FIG. 7B shows example screens/displays of the responder application 704, according to aspects of this disclosure. Display 712 shows an example of a notification (e.g., a push notification, application generated notification, etc.) sent to the emergency response device 720, for example, by the ERDP 710. As shown by display 712, interaction with the notification sent to the emergency response device 720 can cause the emergency response device 720 (the responder application 704) to receive additional emergency data via a selected communication medium (e.g., text, email, etc.). As shown in display 714, a user (e.g., a responder, etc.) of the emergency response device 720 can select open, reply, and/or clear/delete emergency alerts and/or messages from the ERDP 710.

According to aspects of this disclosure, the ERDP 710 and/or the emergency response device 720 can periodically determine the status of the connection and/or communications between the ERDP 710 the emergency response device 720, for example via telemetry data and/or the like. For example, during an ongoing emergency, if the ERDP 710 and/or the emergency response device 720 determines that the connection and/or communications between the ERDP 710 the emergency response device 720 is experiencing latency, errors, and/or any other service degradation, the responder application 704 can update, modify, and/or change how emergency data is communicated to the emergency response device 720. Alternatively, if the ERDP 710 and/or the emergency response device 720 determines that the connection and/or communications between the ERDP 710 the emergency response device 720 is optimal and/or not experiencing latency, errors, and/or any other service degradation, the responder application 704 can receive emergency data from the ERDP 710 in real-time via a live-feed API, open-communication connection/channel, and/or the like. If the ERDP 710 and/or the emergency response device 720 determines that the connection and/or communications between the ERDP 710 the emergency response device 720 is experiencing latency, errors, and/or any other service degradation, the responder application 704, as shown by display 716, can provide an option for the emergency response device 720 to receive emergency response data via a short message system (SMS) text message, and/or the like. The responder application 704 can provide selectable options for the emergency response device 720 to receive emergency data, such as, for example, via SMS/text messages including emergency data, a download of emergency data, a webpage including one or more links to emergency data, a message board post including emergency data, or any other communication method/technique.

Figure 7D:
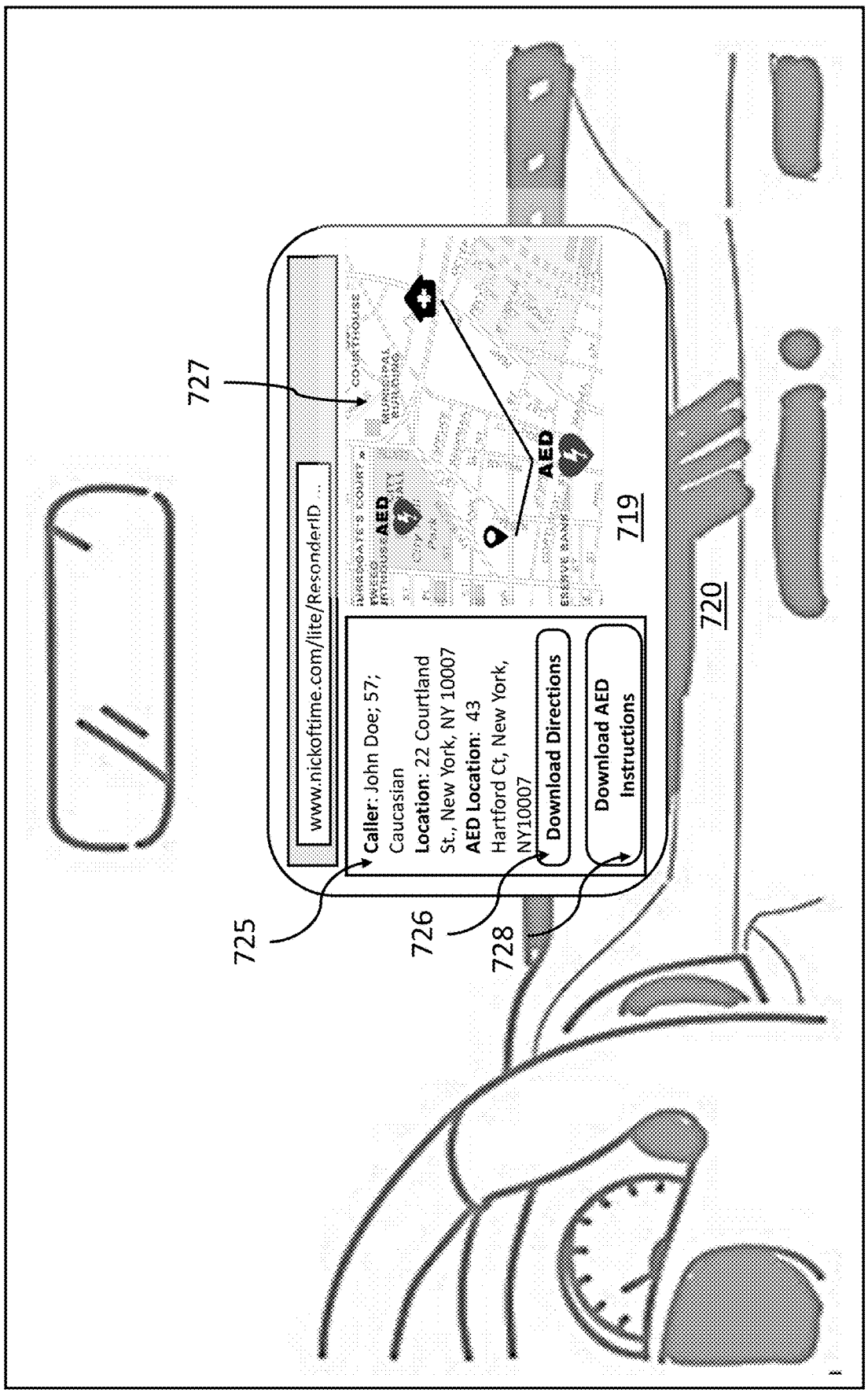

For example, FIGS. 7C and 7D show example screens/displays of the responder application 704, according to aspects of this disclosure. Referring to FIG. 7C, display 716 shows an example of an SMS/text message 721 sent to the emergency response device 720, for example, by the ERDP 710, that includes emergency data (e.g., directions to a location of the emergency, etc.) and an SMS/text message 722 that includes a hyperlink that can be interacted with to obtain (e.g., be directed to, etc.) additional emergency data and/or the responder application 704. Display 717 shows an example webpage, interface, and/or the like of the responder application 704. Display 717 includes emergency data 723 with details associated with a person experiencing an emergency (e.g., name, age, race, location, etc.) and an interactive element 724 that can be interacted with to obtain (e.g., download, etc.) additional emergency data (e.g., directions to an emergency location, etc.). Display 718 shows an example push notification of the responder application 704 that includes emergency data (e.g., directions to an emergency location, etc.).

Referring to FIG. 7D, according to aspects of this disclosure, the responder application 704 can be configured within a vehicle of an emergency responder. For example, the emergency response device 720 can be and/or be configured with an emergency response vehicle. The responder application 704 can be, for example, configured with a vehicle console and/or on-board system of an emergency response vehicle. Display 719 shows an example webpage, browser interface, and/or the like configured with the emergency response device 720 (e.g., an emergency response vehicle, etc.). Display 719 includes emergency data 725 with information (e.g., essential information, etc.) associated with a person experiencing an emergency (e.g., name, age, race, location, etc.), and/or an interactive element 726 that can be interacted with to obtain (e.g., download, etc.) additional emergency data (e.g., directions to an emergency location, etc.). The display 719 can include a map 727 that indicates, for example, in real-time, a location of an emergency, a location of the emergency response device 720, and/or locations of emergency support equipment and/or supplies, such as an automated external defibrillator (AED) and/or the like. The display 719 can include an interactive element 728 that can be interacted with to obtain (e.g., download, etc.) additional emergency data, such as instructions for operating emergency support equipment and/or supplies (e.g., an AED, etc.).

Returning to FIG. 7A, according to aspects of this disclosure, the civilian application 701 can be configured to receive at least a subset of emergency data associated with an emergency alert from the ERDP 710. For example, during an ongoing emergency, the civilian application 701 can receive information acknowledging and/or confirming location information (e.g., an address, etc.) associated with the emergency, responder status information (e.g., assignment details, dispatch details, etc.), information regarding an estimated time of arrival of an emergency responder, health/medical and/or treatment advice, directions to a medical facility within proximity, and/or any other information. The subset of emergency data can exclude and/or obscure emergency data, for example, such as the current location of an emergency response device (e.g., the emergency response device 720, etc.) responding to an emergency, and/or any other type of emergency data from original emergency data determined by the ERDP 710. A type and/or portion of emergency data that can be available to the civilian application 701 can be determined, for example, by the ERDP 710 based on one or more settings and/or user preferences, and/or in accordance with any local, state, and/or federal laws, codes, regulations, ordinances, and/or the like.

FIG. 7E shows example screens/displays of the civilian application 701, according to aspects of this disclosure. Display 731 shows an example of a notification (e.g., a push notification, application generated notification, etc.) sent to the civilian device 700, for example, by the ERDP 710. As shown by display 731, interaction with the notification sent to the civilian device 700 can cause the civilian device 700 (the civilian application 701) to receive at least a subset of emergency data via a selected communication medium (e.g., text, email, etc.). As shown in display 732, a user, such as a civilian, a layman, an emergency response monitoring center (e.g., ADT® home monitoring center, etc.) of the civilian device 700 can select open, reply, and/or clear/delete emergency alerts and/or messages from the ERDP 710.

According to aspects of this disclosure, an alarm monitoring center (also referred to as central stations) may provide services after an alarm has been triggered from security systems, fire systems, panic health buttons (such as on PERS), and/or other devices. Historically, the monitoring centers were not able to provide feedback to the user about the emergency response, responder ETAs etc. The monitoring center may have a monitoring center application, which may be standalone or integrated into automation software. When an alarm is verified to be an emergency requiring emergency response, the monitoring center may initiate an emergency call or emergency service request to the agency serving the jurisdiction where the emergency is located. According to aspects of this disclosure, the monitoring center application may be updated with information regarding the responders who have been dispatched, responder ETA, and other information. In particular, the monitoring center application may synchronize with the emergency management application in the ESP and the responder application on the responder device to provide status updates about the emergency.

According to aspects of this disclosure, the ERDP can periodically determine the status of the connection and/or communications between the ERDP 710 the civilian device 700, for example via telemetry data and/or the like. For example, during an ongoing emergency, if the ERDP 710 and/or the civilian device 700 determines that the connection and/or communications between the ERDP 710 the civilian device 700 is experiencing latency, errors, and/or any other service degradation, the civilian application 701 can update, modify, and/or change how emergency data is communicated to the civilian device 700. Alternatively, if the ERDP 710 and/or the civilian device 700 determines that the connection and/or communications between the ERDP 710 the civilian device 700 is optimal and/or not experiencing latency, errors, and/or any other service degradation, the civilian application 701 can receive emergency data from the ERDP 710 in real-time via a live-feed API, open-communication connection/channel, and/or the like. If the ERDP 710 and/or the civilian device 700 determine that the connection and/or communications between the ERDP 710 the civilian device 700 are experiencing latency, errors, and/or any other service degradation, the civilian application 701, as shown by display 733, can provide an option 734 for the civilian device 700 to receive emergency response data via a short message system (SMS) text message, and/or the like. The civilian application 701 can provide selectable options for the civilian device 700 to receive emergency data, such as, for example, via SMS/text messages including emergency data, a download of emergency data, a webpage including one or more links to emergency data, a message board post including emergency data, and/or any other communication method/technique. Display 733 can include interactive elements and/or messages, such as element 735, that when interacted with and/or accessed facilitate the submission of emergency data (e.g., emergency location information, etc.) and/or the like, to the ERDP 710 via the civilian application 701.

According to aspects of this disclosure, a subset of emergency data/information associated with an emergency can include an estimated time of arrival (ETA) for an emergency responder device (and/or a direction from which the emergency responder device will arrive at the location of an emergency) that has been validated by the ERDP 710. During an ongoing emergency, for example, an emergency reported/submitted to the ERDP 710 by a civilian device (e.g., the civilian device 700, etc.), the ERDP 710 can receive an indication of the current location of the civilian device that has been determined by the civilian device (e.g., via GPS positioning, Wi-Fi positioning, Bluetooth beacon positioning, cellular base station triangulation, telemetry data, sensor monitoring, direct reporting, etc.) and the current location of an emergency response device (e.g., the emergency response device 720, etc.) assigned to respond to the emergency that has been determined by the emergency response device (e.g., via GPS positioning, Wi-Fi positioning, Bluetooth beacon positioning, cellular base station triangulation, multilateration, etc.). The ERDP 710 can determine, for example, via machine learning and/or the like, an estimated time of arrival (ETA) of the emergency response device to arrive at the location of the emergency. In some instances, the ERDP 710 can receive an ETA of the emergency response device from the emergency response device and determine/validate whether the received ETA corresponds to an ETA of the emergency response device determined by the ERDP 710. If the ETA received from the emergency response device does not match or correspond (e.g., satisfy a time window threshold, etc.) to the ETA determined by the ERDP 710, the ERDP 710 can request updated ETA information from the emergency response device until the updated ETA information matches/corresponds to a determined ETA. If the ETA received from the emergency response device matches and/or corresponds (e.g., satisfies a time window threshold, etc.) to the ETA determined by the ERDP 710, the ERDP 710 can send an indication of the ETA to the civilian application 701 as a subset of emergency data determined and/or received by the ERDP 710.

FIG. 7F shows example screens/displays of the civilian application 701, according to aspects of this disclosure. Displays 735-737 show examples of emergency data/information (e.g., emergency response status information, validated emergency response device ETAs, care/treatment instructions, etc.) that can be sent (e.g., via SMS/text message, push notification, etc.) to the civilian application 701 as a subset of emergency data determined and/or received by the ERDP 710. For example, a subset and/or portion of emergency data may include emergency status information (e.g., "911 has been dispatched," etc.), ETA information (e.g., "Ambulance has been dispatched, ETA is 6 minutes," etc.) for an emergency response device, treatment information and/or instructions (e.g., "If you are able, apply pressure to wound with a clean cloth," etc.), and/or the like.

According to some aspects of this disclosure, the civilian application 701 may include one or more interactive elements. For example, a user in an emergency may be able to share their location via an interactive element such as a "share my location" button and/or the like. In addition, a user may be able to share audiovisual data about the emergency via an interactive element such as a "share content" button and/or the like. For example, a user may be able to share a picture from their device (700) with an emergency response device (e.g., a first responder, etc.) to provide the emergency response device and/or a user of the emergency response device situational awareness about the emergency to facilitate efficient emergency response. According to some aspects of this disclosure, user input (including text data, audio data, video/image data, etc.) from a user device may be transmitted to the ERDP and/or (after screening and/or preprocessing) may be transmitted to an appropriate emergency response device. According to some aspects of this disclosure, the ERDP may cause a display of communications from a user of the emergency management application to an emergency response device and/or the like via a public agency workstation or a private monitoring center device operating a version and/or instance of the emergency management application.

According to some aspects of this disclosure, the ERDP may verify/screen data before sharing and displaying the data with emergency response devices. For example, a user (e.g., in an emergency) may inadvertently send messages and/or audio/visual data (e.g, butt dials) and the content of the file may be checked to verify that the content is relevant to the emergency. In many cases, inadvertently sent messages and/or audio/visual data may be duplicative or not helpful for resolving an emergency, screen such data before sharing with emergency response devices and/or the like reduces the amount of computational resource expended by the ERDP and/or connected devices/components.

Figure 7G:
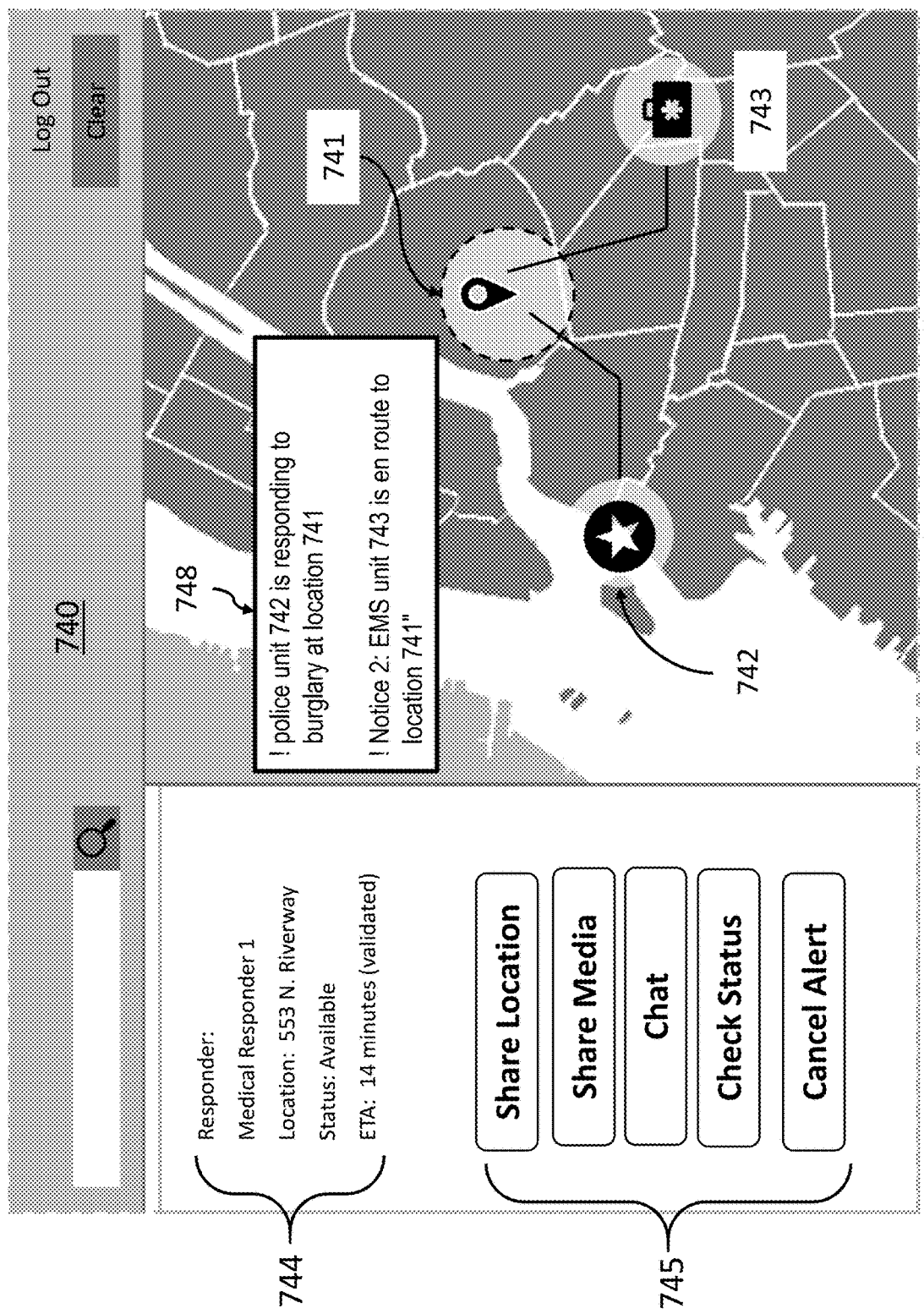

FIG. 7G shows an example screen/display of the civilian application 701 configured on the civilian device 700, according to aspects of this disclosure. According to some aspects of this disclosure, ERDP 710 may display a secondary user interface on a PSAP device or a device within and/or associated with a public emergency dispatch center or a private monitoring center that reflects the example screen/display shown in FIG. 7G.

According to some aspects of this disclosure, if the civilian device 700 is operated by an emergency response monitoring center (e.g., ADT® home monitoring center, PSAP, etc.), a display 740 can be generated/output by the civilian application 701 (e.g., via a GUI of the civilian application 701, etc.). The display 740 can include an interactive map and/or the like that displays a location 741 of an emergency and/or one or more emergency response devices 742 and 743. The display 740 can include emergency data 744 that has been provided to the civilian application 701 based on the operational status of the civilian device 700. For example, the ERDP 710 can determine that the civilian device 700 is operated by an emergency response monitoring center (e.g., ADT® home monitoring center, etc.) and modify/adjust a level of emergency data provided to the civilian application 701. For example, the emergency data 744 can include a current location of an emergency response device and an ETA, rather than just the ETA. If the civilian application 701 is operated by a civilian entity that does not include an emergency response monitoring center, then the emergency data 744 may only include the ETA. The display 740 can include one or more interactive elements 745, that when interacted with, facilitate sharing of additional emergency data/information with the ERDP 710, such as updated location information, multimedia information associated with an emergency, communications, status information, and/or the like. According to some aspects of this disclosure, the display 740 may include a notification 748. The notification 748 may provide data/information regarding the status of an emergency and/or status of a response to an emergency. For example, notification 748 may indicate that an emergency response device (e.g., emergency response devices 742 and 743, etc.) is en route to a location (741) associated with an emergency.

Figure 7H:
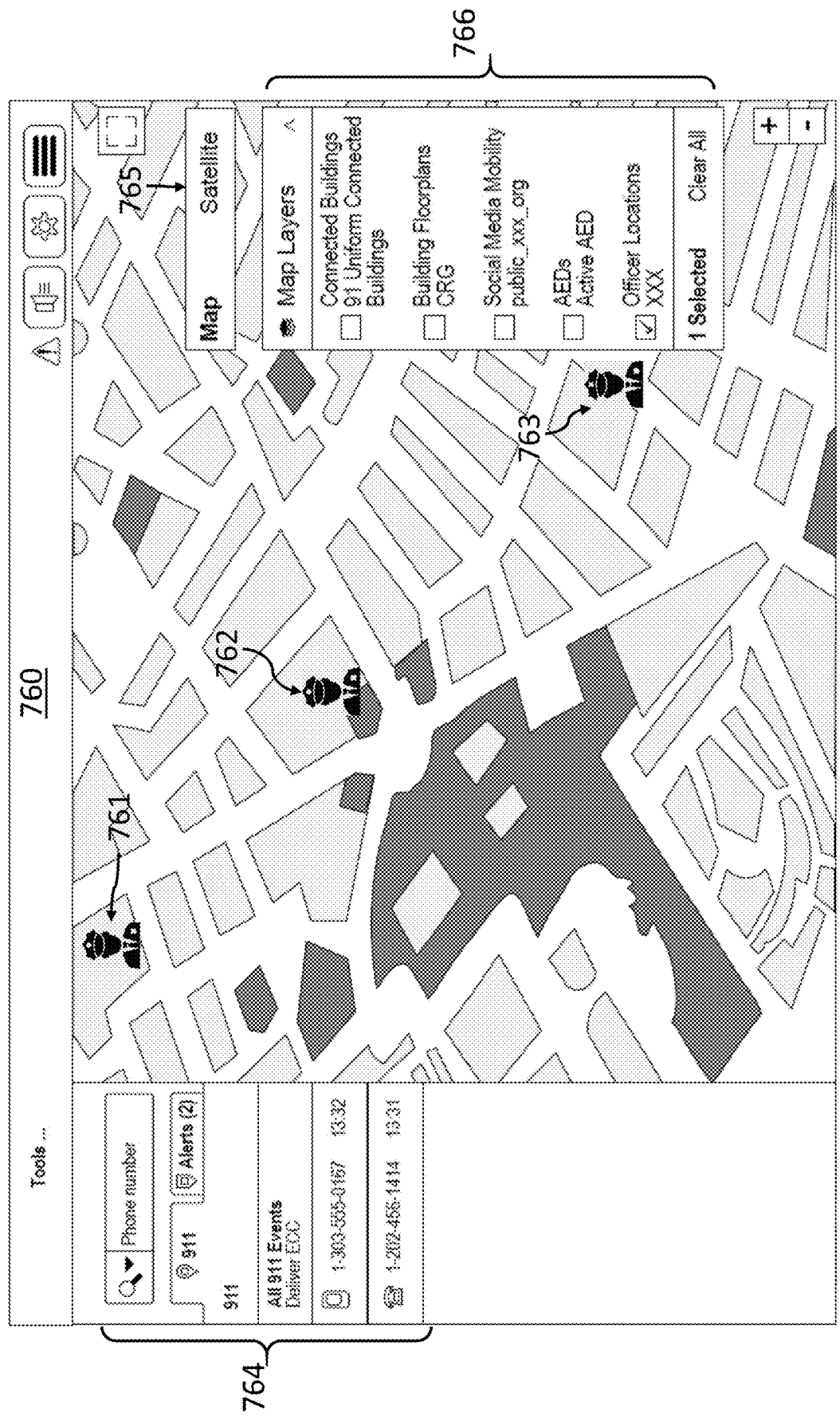

FIG. 7H shows an example screen/display of the civilian application 701 configured on the civilian device 700, according to aspects of this disclosure. According to some aspects of this disclosure, ERDP 710 may display a secondary user interface on a PSAP device or a device within and/or associated with a public emergency dispatch center or a private monitoring center that reflects the example screen/display shown in FIG. 7H.

According to some aspects of this disclosure, if the civilian device 700 is operated by an emergency response monitoring center (e.g., ADT® home monitoring center, PSAP, etc.), a display 760 can be generated/output by the civilian application 701 (e.g., via a GUI of the civilian application 701, etc.). According to aspects of this disclosure, the display 760 can include an interactive map and/or the like that displays emergency response icons 761, 762, and 763 indicative of emergency response devices based on including, but not limited to, proximity to an emergency, an emergency response service provided by users of the emergency response devices, and/or the like.

According to aspects of this disclosure, the display 760 can include emergency information display tool 764 that may be manipulated by a user of the civilian application 701 to display different emergency events. For example, a user of the civilian application 701 may use the emergency information display tool 764 to search for emergency events based on phone numbers and/or the like associated with the emergency events. According to aspects of this disclosure, the display 760 can include a view toggle tool 765 that may be manipulated by a user of the civilian application 701 to display different views (e.g., a map view, satellite view, etc.) of the interactive map. According to aspects of this disclosure, the display 760 can include display layer tool 765 that may be manipulated by a user of the civilian application 701 to cause various elements to be displayed on the interactive map. For example, if an "office location" option is selected within the display layer tool 765, the interactive map displays the emergency response icons 761, 762, and 763.

Estimating Times of Arrival for Emergency Response Devices

According to aspects of this disclosure, an emergency response data platform (ERDP) (e.g., the ERDP 110 of FIG. 1, the ERDP 510 of FIG. 5, the ERDP 710 of FIG. 7A, etc.) can determine and/or validate an estimated time of arrival for one or more emergency response devices (e.g., the plurality of emergency response devices 520 of FIG. 5, the emergency response device 720, etc.) to arrive a location of an emergency, such as an emergency submitted/indicated to the ERDP by a civilian device (e.g., a user device, a mobile device, a smart device, a data-sensing device, an Internet-of-Things (IoT) device, etc, the emergency data source 100 of FIG. 1, the emergency data source 500 of FIG. 5, the civilian device 700 of FIG. 7A, etc).

Figure 8:
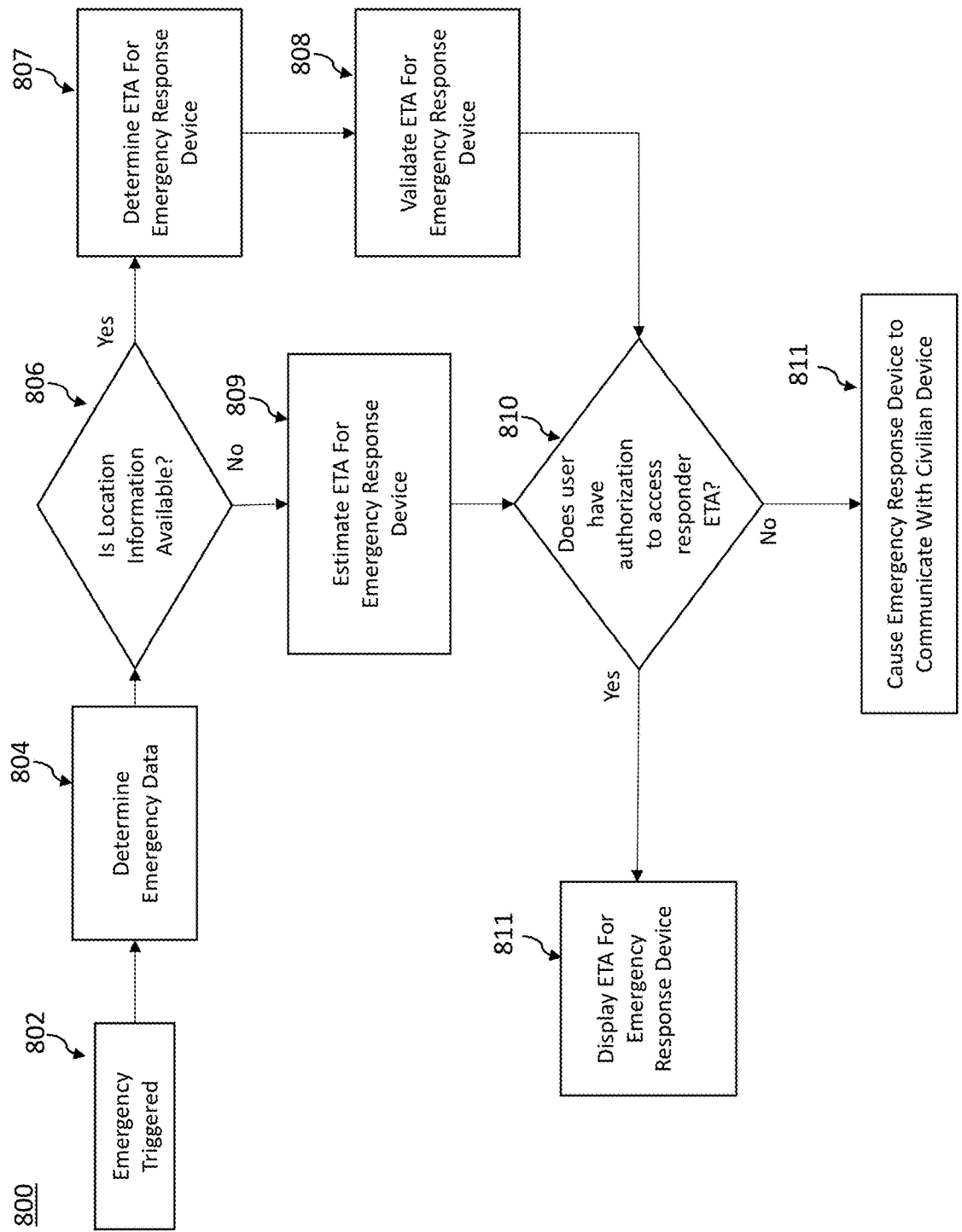
FIG. 8 illustrates an example method for communicating location information used to determine or validate an estimated time of arrival for one or more emergency response devices, in accordance with some embodiments of this disclosure.

FIG. 8 illustrates an example computer-implemented method 800 for communicating location information used to determine and/or validate an estimated time of arrival for one or more emergency response devices, according to aspects of this disclosure, Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 8, as will be understood by a person of ordinary skill in the art. Method 800 shall be described with reference to elements of FIGS. 1-3, 4A, 4B, 5, 6A-6B, and 7A-7H and can be performed by ERDP 110 of FIG. 1, ERDP 510 of FIG. 5, ERDP 710 of FIG. 7A and/or computer system 1200 of FIG. 12. But method 800 is not limited to the specific aspects depicted in those figures and other systems can be used to perform the method as will be understood by those skilled in the art.

In 802, an emergency is triggered. For example, a person may experience a medical/health emergency, be the victim of a crime, and/or any other emergency.

In 804, ERDP 710 (and/or ERDP 110, ERDP 510, etc.) determines emergency data/information associated with the emergency. For example, the person experiencing the emergency and/or an entity monitoring for emergencies may submit (e.g., via telephone, email, SMS/text message, sensor detection, etc.) an indication of the emergency to ERDP 710. The emergency data/information may include an indication of the type of emergency, the location of the emergency, information associated with the person experiencing the emergency (e.g., age, race, health status, etc.), and/or any/other emergency data/information.

In 806, ERDP 710 determines whether the location of an emergency response device is available. For example, if ERDP 710 is in communication with an emergency response device and/or the emergency response device has sent/provided location information to ERDP 710, then ERDP 710 may determine that the location information is available and the process may progress to 807. If ERDP 710 is not in communication with an emergency response device and/or the emergency response device has not sent/provided location information to ERDP 710, then ERDP 710 may determine that the location information is unavailable and method 800 continues to 809.

In 807, ERDP 710 determines an ETA for the emergency response device to arrive at the location of the emergency. For example, ERDP 710 may determine the ETA for the emergency response device based on the location of the emergency and the location information sent to ERDP 710 by the emergency response device. For example, ERDP 710 may provide the location of the emergency and the location information sent to ERDP 710 to one or more navigation systems (e.g., third-party navigation applications, etc.) to determine the ETA for the emergency response device. In some instances, ERDP 710 may receive an indication of the ETA from the emergency response device.

In 808, ERDP 710 validates the ETA for the emergency response device. According to aspects of this disclosure, to validate the ETA for the emergency response device, ERDP 710 can detect/determine, periodically and/or based on a setting/user preference, a time to update location information associated with the emergency response device. According to aspects of this disclosure, the location information associated with the emergency response device can be determined using GPS positioning, Wi-Fi positioning, Bluetooth beacon positioning, cellular base station triangulation, and/or the like. ERDP 710 can determine the latest location information received from and/or determined for the emergency response device and compare the latest location information to location information stored by ERDP 710. If the latest location information is not significantly different from the stored location information, then ERDP 710 may determine a time-stamp of previous location information received from and/or determined for the emergency response device, and determine a time difference between a current time and the time-stamp of the location information. If the time difference is not greater than a pre-defined value for updating ERDP 710, ERDP 710 can determine identification information for one or more cellular base station routers and/or Wi-Fi routers that have been in communication with the emergency response device, and attempt to determine/derive location information from the identity of the one or more cellular base station routers and/or Wi-Fi routers. If there is no significant difference in the location data determined/derived from the information about the one or more cellular base station routers and/or Wi-Fi routers and the stored location information, ERDP 710 can compare the indication of the ETA received from the emergency response device with an ETA determined by ERDP 710, for example, via a trained machine learning that considers historical ETAs, current traffic and/or weather conditions, and/or any other data/information. ERDP 710 may verify/validate the indication of the ETA received from the emergency response device may determine that the indicated ETA matches and/or corresponds to the ETA determined by ERDP 710.

According to aspects of this disclosure, to validate the ETA for the emergency response device, ERDP 710 can determine, based on the current location of the emergency response device and the location of the emergency, an estimated travel path for the emergency response device. ERDP 710 can determine a plurality of network devices (e.g., access points, cellular base station routers, Wi-Fi routers, etc.) along the estimated travel path. ERDP 710 can request and/or receive a time-stamped indication of a first location of the emergency response device from a first network device of the plurality of network devices. For example, the first network device may include a cellular tower that detects (e.g., via multilateration, etc.) communication with the emergency response device. The first location of the emergency response device may be estimated based on the location of the first network device. As another example, the first network device may be a traffic camera and/or sensor (e.g., a license plate reader, etc.) that detects/determines, as a time-stamped indication of the first location of the emergency response device, a location of a vehicle associated with the emergency response device. Similarly, ERDP 710 may request and/or receive an indication of a second location of the emergency response device from a second network device of the plurality of network devices. ERDP 710 may determine/estimate the velocity of the emergency response device based on the first and second locations of the emergency response device, and the times when the first and second locations are determined via the time-stamped indications of location. ERDP 710 can determine, based on the velocity and the location of the emergency, another ETA for the emergency response device to arrive at the location of the emergency. ERDP 710 can validate the ETA for the emergency response device based on a match between the ETA and the other determined ETA. ERDP 710 may use any method and/or technique to validate the ETA for the emergency response device. After 808, the method 800 continues to 810.

In 809, ERDP 710 determines an ETA for the emergency response device. ERDP 710 can determine an ETA for the emergency response device, for example, via a trained machine learning model that considers historical ETAs, current traffic and/or weather conditions, whether the emergency response device is associated with another emergency, and/or any other data/information.

In 810, ERDP 710 determines whether to send an indication of an ETA for the emergency response device that has been determined, validated, and/or estimated by ERDP 710 to the civilian device (and/or any other device). For example, ERDP 710 may determine whether the civilian device (and/or any other device) is authorized to receive an indication of the ETA for the emergency response device. Authorization may depend, for example, on the type of operator of the civilian device and/or any other device (e.g., another emergency response device, an emergency service provider device, etc.). For example, a civilian (e.g., a layman, a user, etc.) operating a device may not be authorized to receive an indication of the ETA for the emergency response device, and emergency response personnel operating a device may not be authorized to receive an indication of the ETA for the emergency response device. A determination of which operators of a device may be authorized to receive an indication of the ETA for the emergency response device can be based on one or more settings and/or user preferences, and/or in accordance with any local, state, and/or federal laws, codes, regulations, ordinances, and/or the like. If the civilian device (and/or any other device) is authorized to receive an indication of the ETA for the emergency response device, the method 800 continues to 811. If the civilian device (and/or any other device) is not authorized to receive an indication of the ETA for the emergency response device, the method 800 continues to 812.

In 811, the authorized civilian device (and/or any other device) displays the indication of the ETA for the emergency response device, for example, via a civilian application configured with the civilian device. The display of the indication of the ETA for the emergency response device may be modified/customized based on a type of interface associated with the civilian device. For example, the indication of the ETA for the emergency response device may be displayed via a GUI, SMS/text messages, a webpage, a push notification, and/or the like based on a configuration and/or capability of the civilian device.

In 812, if the civilian device (and/or any other device) is not authorized to receive an indication of the ETA for the emergency response device, ERDP 710 causes the emergency response device to establish communication (e.g., a 2-way communication, secured communication, etc.) with the civilian device (and/or any other device) to provide ETA information, emergency data/information, and/or the like. For example, ERDP 710 may send a signal, a request, and/or the like to the emergency response device that causes the emergency response device to establish a communication with the civilian device (and/or any other device).

Figure 9:
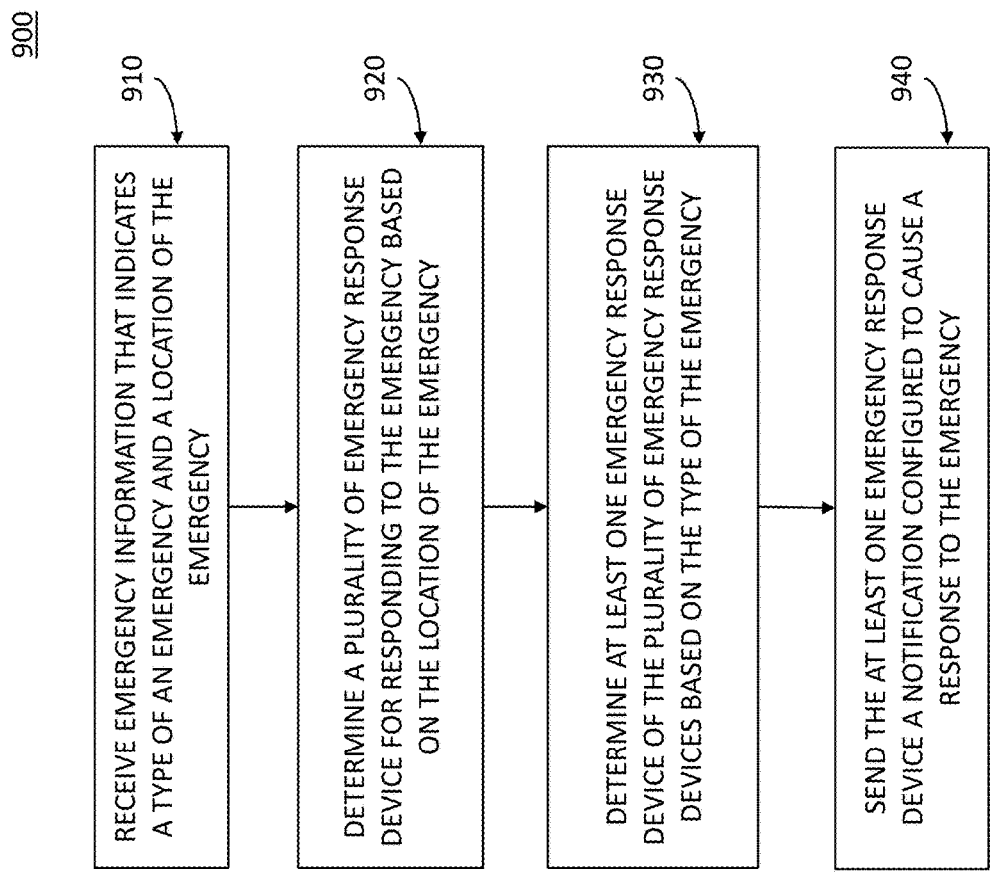
FIG. 9 illustrates an example method for facilitating an emergency response, in accordance with some embodiments of this disclosure.

FIG. 9 illustrates an example computer-implemented method 900 for facilitating an emergency response using an emergency response device, according to aspects of this disclosure. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 9, as will be understood by a person of ordinary skill in the art. Method 900 shall be described with reference to elements of FIGS. 1-3, 4A, 4B, 5, 6A-6B, and 7A-7H and can be performed by ERDP 110 of FIG. 1, ERDP 510 of FIG. 5, ERDP 710 of FIG. 7A and/or computer system 1200 of FIG. 12. But method 900 is not limited to the specific aspects depicted in those figures and other systems can be used to perform the method as will be understood by those skilled in the art.

In 910, ERDP 510 (and/or ERDP 110, ERDP 710, etc.) receives emergency information. The emergency information can indicate a type of an emergency and a location associated with the emergency. Receiving the emergency information can include receiving the emergency information from at least one of a user device, a mobile device, a smart device, a data-sensing device, or an Internet-of-Things (IoT) device. Receiving the emergency information can include receiving, from a user device, at least one of: audio content comprising the emergency information, video content comprising the emergency information, or textual content comprising the emergency information.

In 920, ERDP 510 determines, based on the location associated with the emergency, a plurality of emergency response devices for responding to the emergency. Each emergency response device of the plurality of emergency response devices can be associated with a respective location. Determining the plurality of emergency response devices can include determining, for each emergency response device of the plurality of emergency response devices, that a distance between the respective location and the location associated with the emergency is within a distance threshold. Determining the plurality of emergency response devices can include: receiving, from each emergency response device of the plurality of emergency response devices, an indication of the respective location; and determining, for each emergency response device of the plurality of emergency response devices, that a distance between the respective location and the location associated with the emergency is within a distance threshold.

In 930, ERDP 510 determines, based on the type of the emergency, at least one emergency response device of the plurality of emergency response devices for responding to the emergency. Determining the at least one emergency response device for responding to the emergency can include: causing, via a user interface, display of an interactive element indicative of the location associated with the emergency based on the location associated with the emergency; causing, based on the location associated with the emergency, display of a plurality of interactive elements indicative of the plurality of emergency response devices, wherein each emergency response device of the plurality of emergency response devices is associated with a respective location that is within a distance threshold for the location associated with the emergency; and receiving, based on the type of the emergency corresponding to an emergency response function associated with the at least one emergency response device, a selection of an interactive element indicative of the at least one emergency response device.

Determining the at least one emergency response device of the plurality of emergency response devices can include: determining, based on the location associated with the emergency, the plurality of emergency response devices, wherein each emergency response device of the plurality of emergency response devices is associated with a respective location that is within a distance threshold of the location associated with the emergency; determining that an emergency response function associated with the at least one emergency response device corresponds to the type of the emergency; and determining, based on the emergency response function, the at least one emergency response device.

In 940, ERDP 510 sends, to the at least one emergency response device, a notification configured to cause a response to the emergency. The method 900 can also include sending, to the at least one emergency response device, information associated with the emergency. The information associated with the emergency can include at least one of: an indication of an optimal route to the location associated with the emergency, medical information for a user associated with the emergency, or situational information associated with the emergency. Sending the information associated with the emergency can include sending the information associated with the emergency via a secured communication pathway.

Figure 10:
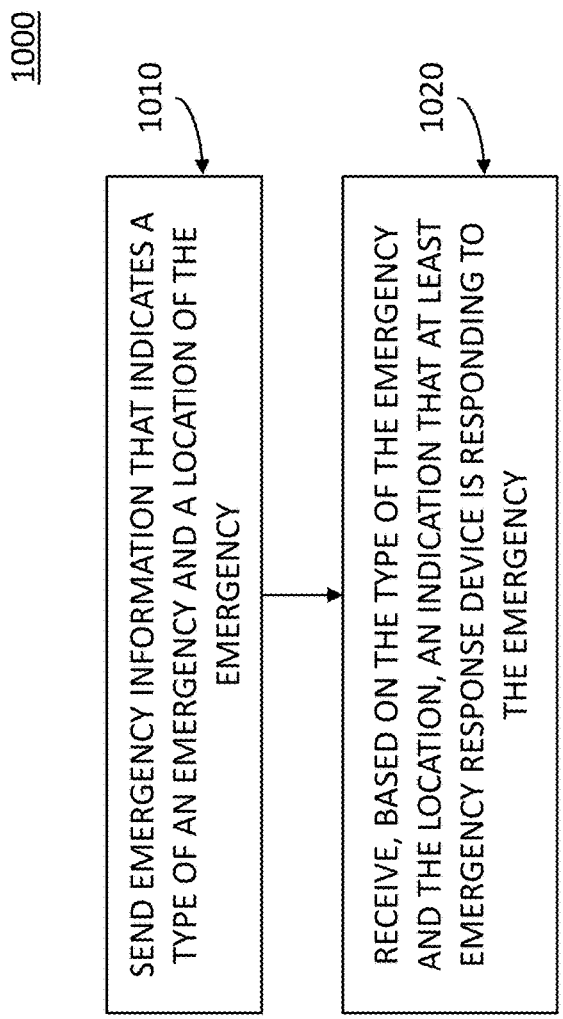
FIG. 10 illustrates an example method for facilitating an emergency response, in accordance with some embodiments of this disclosure.

FIG. 10 illustrates an example computer-implemented method 1000 for facilitating an emergency response using an emergency response device, according to aspects of this disclosure. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 10, as will be understood by a person of ordinary skill in the art. Method 1000 shall be described with regard to elements of FIGS. 1-3, 4A, 4B, 5, 6A-6B, and 7A-7H and can be performed by ERDP 110 of FIG. 1, ERDP 510 of FIG. 5, ERDP 710 of FIG. 7A and/or computer system 1300 of FIG. 13. But method 1000 is not limited to the specific aspects depicted in those figures and other systems can be used to perform the method as will be understood by those skilled in the art.

In 1010, ERDP 510 (and/or ERDP 110, ERDP 710, etc.) sends emergency information. The emergency information can indicate a type of an emergency and a location associated with the emergency. Sending the emergency information can include sending the emergency information to a computing device configured with a predictive model, and the computer-implemented method further comprising: receiving, based on an output of the predictive model, an indication of an estimated time that the at least one emergency response device will arrive at the location associated with the emergency.

In 1020, ERDP 510 receives, based on the type of the emergency and the location associated with the emergency, a notification that at least one emergency response device of a plurality of emergency response devices configured to respond to the emergency is en route to the location associated with the emergency.

Figure 11:
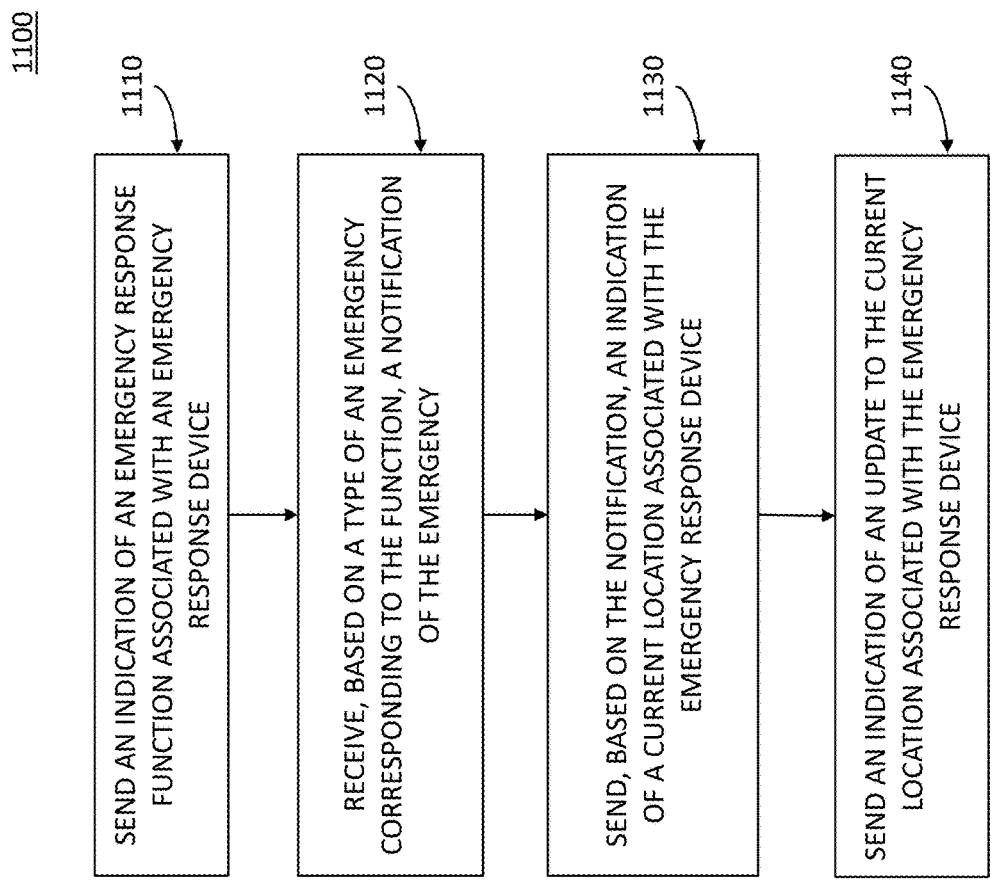
FIG. 11 illustrates an example method for facilitating an emergency response, in accordance with some embodiments of this disclosure.

FIG. 11 illustrates an example computer-implemented method 1100 for facilitating an emergency response using an emergency response device, according to aspects of this disclosure. Method 1100 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 11, as will be understood by a person of ordinary skill in the art. Method 900 shall be described with regard to elements of FIGS. 1-3, 4A, 4B, 5, 6A-6B, and 7A-7H and can be performed by ERDP 110 of FIG. 1, ERDP 510 of FIG. 5, ERDP 710 of FIG. 7A and/or computer system 1300 of FIG. 13. But method 1100 is not limited to the specific aspects depicted in those figures and other systems can be used to perform the method as will be understood by those skilled in the art.

In 1110, ERDP 510 (and/or ERDP 110, ERDP 710, etc.) sends, an indication of an emergency response function associated with an emergency response device.

In 1120, ERDP 510 receives, based on a type of an emergency corresponding to the emergency response function, a notification of the emergency.

In 1130, ERDP 510 sends, based on the notification, an indication of a current location associated with the emergency response device.

In 1140, ERDP 510 sends, based on a distance between the emergency response device and a location associated with the emergency being within a distance threshold, an indication of an update to the current location associated with the emergency response device.

Figure 12:
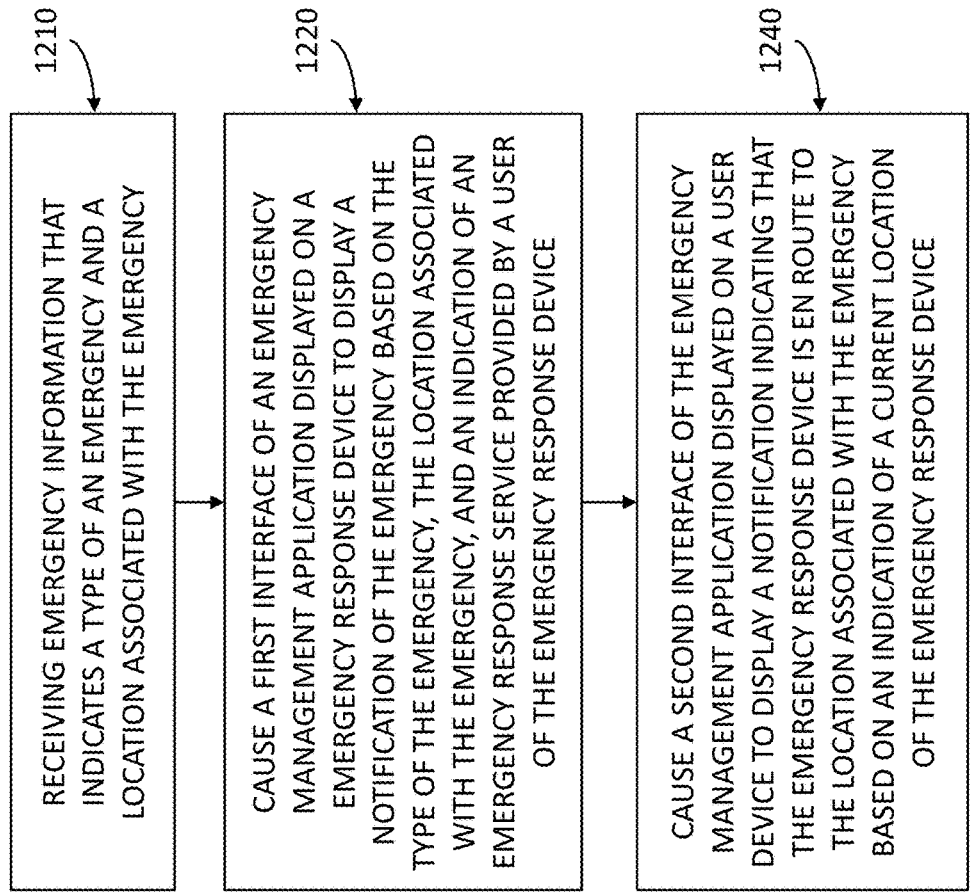
FIG. 12 illustrates an example method for facilitating an emergency response, in accordance with some embodiments of this disclosure.

FIG. 12 illustrates an example computer-implemented method 1200 for facilitating an emergency response, according to aspects of this disclosure. Method 1200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously, or in a different order than shown in FIG. 12, as will be understood by a person of ordinary skill in the art. Method 1200 shall be described with regard to elements of FIGS. 1-3, 4A, 4B, 5, 6A-6B, and 7A-7H and can be performed by ERDP 110 of FIG. 1, ERDP 510 of FIG. 5, ERDP 710 of FIG. 7A and/or computer system 1300 of FIG. 13. But method 1200 is not limited to the specific aspects depicted in those figures and other systems can be used to perform the method as will be understood by those skilled in the art.

In 1210, ERDP 510 (and/or ERDP 110, ERDP 710, etc.) receives emergency information that indicates a type of an emergency and a location associated with the emergency. According to some aspects of this disclosure, ERDP 510 may receive emergency information from a user device, an emergency reporting service (e.g., PSAP, etc.), and/or the like. For example, ERDP 510 may receive audio content comprising the emergency information, video content comprising the emergency information, textual content comprising the emergency information, and/or the like from the user device, the emergency reporting service (e.g., PSAP, etc.), and/or the like.

In 1220, ERDP 510 causes a first user interface of an emergency management application to display a notification of the emergency. According to some aspects of this disclosure, ERDP 510 may cause the first user interface of the emergency management application to display the notification of the emergency based on the type of the emergency, the location associated with the emergency, and an indication of an emergency response service provided by a user of an emergency response device. According to some aspects of this disclosure, the emergency response service provided by the user of the emergency response device may be firefighter service, police service, emergency medical service, vehicle roadside assistance service, and/or the like. According to some aspects of this disclosure, the first user interface may be displayed by the emergency response device.

In 1240, ERDP 510 causes a second user interface of the emergency management application to display a notification indicating that the emergency response device is en route to the location associated with the emergency. According to some aspects of this disclosure, ERDP 510 causes the second user interface of the emergency management application to display the notification indicating that the emergency response device is en route to the location associated with the emergency based on an indication of a current location of the emergency response device. According to some aspects of this disclosure, the second user interface may be displayed by the user device, a public safety agency device, or a private monitoring center device.

According to some aspects of this disclosure, ERDP 510 causes the second user interface of the emergency management application to display the notification indicating that the emergency response device is en route to the location associated with the emergency further based on the location associated with the emergency and the current location of the emergency response device being within a threshold distance.

According to some aspects of this disclosure, method 1200 further includes ERDP 510 causing the first interface to display an optimal route to the location associated with the emergency, medical information for a user associated with the emergency, situational information associated with the emergency, and/or the like.

According to some aspects of this disclosure, method 1200 further includes ERDP 510 causing the first interface to display at least one of the emergency information that indicates the type of the emergency or the location associated with the emergency.

According to some aspects of this disclosure, method 1200 further includes ERDP 510 receiving different emergency information that indicates a type of a different emergency and a location associated with the different emergency. According to some aspects of this disclosure, ERDP 510 receives a respective indication of an emergency response service provided by a respective user of each emergency response device of a plurality of emergency response devices and a respective indication of a location for each emergency response device of a plurality of emergency response devices. According to some aspects of this disclosure, ERDP 510 selects at least one emergency response device of the plurality of emergency response devices based on the respective indication of the emergency response service provided by the respective user of the at least one emergency response device matching the different emergency and the respective indication of the location for the at least one emergency response device being within a distance threshold of the location associated with the different emergency. According to some aspects of this disclosure, ERDP 510 causes a third user interface of the emergency management application to display a notification of the different emergency and an indication of the location associated with the different emergency. ERDP 510 causes the third user interface of the emergency management application to display the notification of the different emergency and the indication of the location associated with the different emergency based on the selecting the at least one emergency response device. According to some aspects of this disclosure, the third user interface is displayed by the at least one emergency response device.

According to some aspects of this disclosure, method 1200 further includes ERDP 510 causing the first user interface of the emergency management application to display a request for video content from the emergency response device. According to some aspects of this disclosure, ERDP 510 causes the first user interface of the emergency management application to display the request for video content from the emergency response device based on the indication that the emergency response device is at the location associated with the emergency.

According to some aspects of this disclosure, method 1200 further includes ERDP 510 establishing a communication session between the emergency response device and one or more of the user device, the public safety agency device, the private monitoring center device, and/or the like. According to some aspects of this disclosure, ERDP 510 establishes the communication session between the emergency response device and one or more of the user device, the public safety agency device, the private monitoring center device, and/or the like via the emergency management application and/or based on an interaction with at least one of the first user interface or the second user interface (and/or based on a request from at least one of emergency response device or one or more of the user device, the public safety agency device, the private monitoring center device, and/or the like).

According to some aspects of this disclosure, method 1200 further includes ERDP 510 causing a third user interface of the emergency management application to display at least one of the emergency information or an indication of the current location of the emergency response device. According to some aspects of this disclosure, the third user interface may be displayed by a Public Safety Answering Point (PSAP) device.

Figure 13:
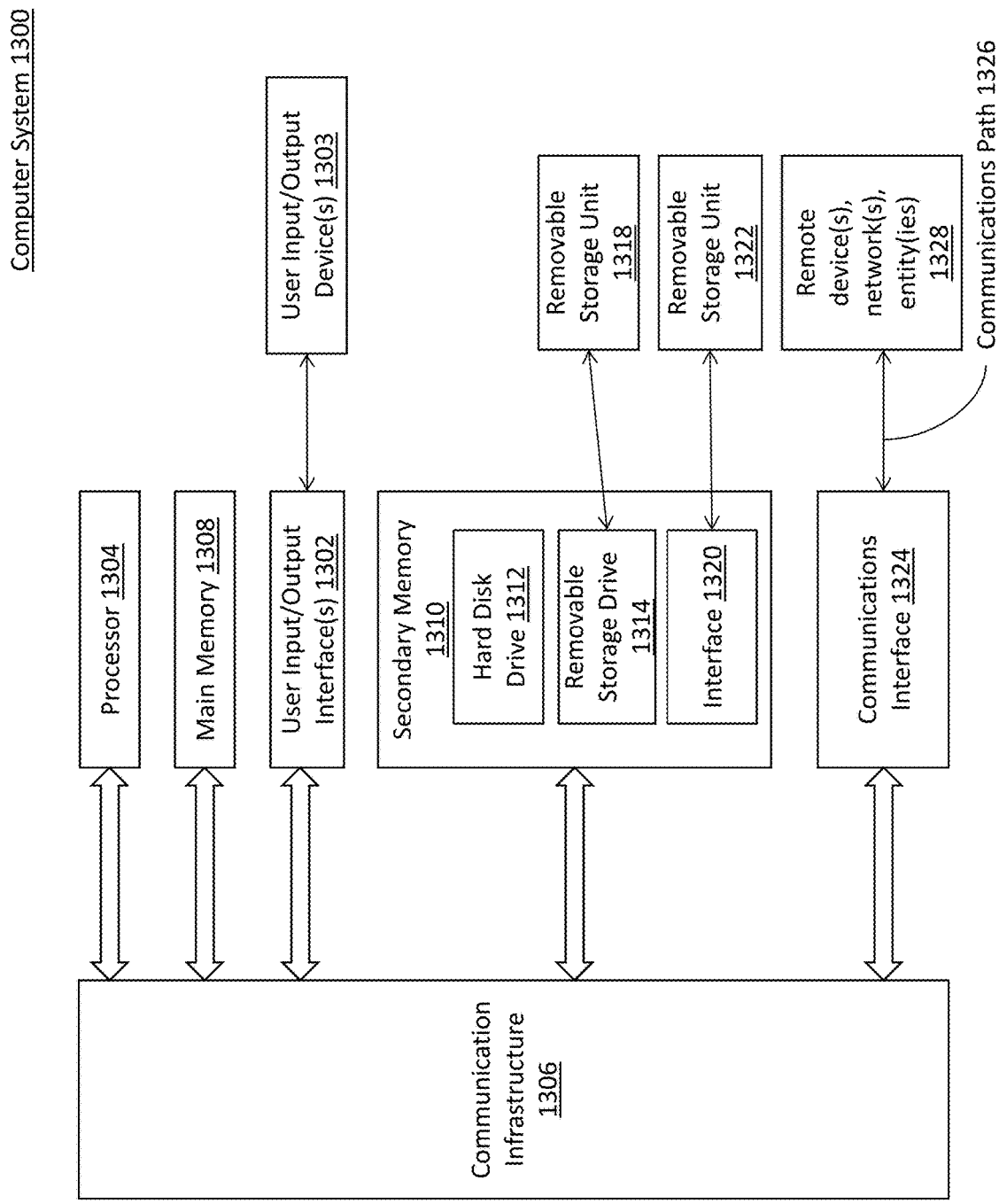
FIG. 13 is an example computer system useful for implementing various embodiments.

Various embodiments can be implemented, for example, using one or more computer systems, such as computer system 1300 shown in FIG. 13. Computer system 1300 can be used, for example, to implement any method (e.g., the methods 800-1100, etc.) described herein. Computer system 1300 can be any computer capable of performing the functions described herein.

Computer system 1300 can be any well-known computer capable of performing the functions described herein.

Computer system 1300 includes one or more processors (also called central processing units, or CPUs), such as a processor 1304. Processor 1304 is connected to a communication infrastructure 1306 (a bus, etc.).

One or more processors 1304 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1300 also includes user input/output device(s) 1303, such as monitors, keyboards, pointing devices, etc., that communicate with communication infrastructure 1306 through user input/output interface(s) 1302.

Computer system 1300 also includes a main or primary memory 1308, such as random access memory (RAM). Main memory 1308 can include one or more levels of cache. Main memory 1308 has stored therein control logic (e.g., computer software) and/or data.

Computer system 1300 can also include one or more secondary storage devices or memory 1310. Secondary memory 1310 can include, for example, a hard disk drive 1312 and/or a removable storage device or drive 1314. Removable storage drive 1314 can be a floppy disk drive, a magnetic tape drive, a compact disk drive, an optical storage device, tape backup device, and/or any other storage device/drive.

Removable storage drive 1314 can interact with a removable storage unit 1318. Removable storage unit 1318 includes a computer usable or readable storage device having stored thereon computer software (control logic) and/or data. Removable storage unit 1318 can be a floppy disk, magnetic tape, compact disk, DVD, optical storage disk, and/any other computer data storage device. Removable storage drive 1314 reads from and/or writes to removable storage unit 1318 in a well-known manner.

According to an exemplary embodiment, secondary memory 1310 can include other means, instrumentalities or other approaches for allowing computer programs and/or other instructions and/or data to be accessed by computer system 1300. Such means, instrumentalities or other approaches can include, for example, a removable storage unit 1322 and an interface 1320. Examples of the removable storage unit 1322 and the interface 1320 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 can further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 can allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

In an embodiment, a tangible apparatus or article of manufacture comprising a tangible computer useable or readable medium having control logic (software) stored thereon is also referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300), causes such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 13. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

For one or more embodiments, at least one of the devices, systems, and/or components set forth in one or more of the preceding figures may be configured to perform one or more operations, techniques, processes, and/or methods as set forth in the examples below.

Example 1 may include a system for facilitating an emergency response comprising: one or more memories; at least one processor each coupled to at least one of the memories and configured to perform operations comprising: receiving, via an emergency management application, based on an interaction with a first user interface of the emergency management application, emergency information that indicates a type of an emergency and a location associated with the emergency, wherein the first user interface is associated with a user device; causing, based on the type of the emergency, the location associated with the emergency, and an indication of an emergency response service provided by a user of an emergency response device, a second user interface of the emergency management application to display a notification of the emergency, wherein the second user interface is associated with the emergency response device; and causing, based on an indication of a current location of the emergency response device, the first user interface of the emergency management application to display a notification indicating that the emergency response device is en route to the location associated with the emergency.

Example 2 may include the system of Example 1, wherein the user device is at least one of at the location associated with the emergency, or is associated with a user account that indicates another user device at the location associated with the emergency.

Example 3 may include the system of Examples 1-2, wherein the causing the second user interface of the emergency management application to display the notification of the emergency further comprises: receiving, from the emergency response device, an indication of a location of the emergency response device and the indication of the emergency response service provided by the user of the emergency response device; and sending to the emergency response service via the emergency management application, based on a distance between the location of the emergency response device and the location associated with the emergency being within a distance threshold and the emergency response service corresponding to the type of the emergency, a signal to the emergency response device that causes the second user interface of the emergency management application to display the notification of the emergency.

Example 4 may include the system of Examples 1-3, the operations further comprising: sending to the emergency response device, via the emergency management application, at least one of an indication of an optimal route to the location associated with the emergency, medical information for a user associated with the emergency, or situational information associated with the emergency.

Example 5 may include the system of Examples 1-4, the operations further comprising: causing, based on an indication that the emergency response device is at the location associated with the emergency, the second user interface of the emergency management application to display a request for video content from the emergency response device.

Example 6 may include the system of Examples 1-5, wherein the emergency information that indicates the type of the emergency and the location associated with the emergency is included with at least one of: audio content, video content, or textual content.

Example 7 may include a computer-implemented method for facilitating an emergency response comprising: receiving, via an emergency management application, emergency information that indicates a type of an emergency and a location associated with the emergency; determining, based on the location associated with the emergency, a plurality of emergency response devices for responding to the emergency; determining, based on the type of the emergency, at least one emergency response device of the plurality of emergency response devices for responding to the emergency; and sending, to the at least one emergency response device via the emergency management application, a notification that facilitates a response to the emergency.

Example 8 may include the computer-implemented method of Example 7, wherein receiving the emergency information further comprises receiving the emergency information from at least one of a user device, a mobile device, a smart device, a data-sensing device, or an Internet-of-Things (IoT) device.

Example 9 may include the computer-implemented method of Examples 7-8, wherein receiving the emergency information further comprises receiving, from a user device running a client version of the emergency management application, at least one of: audio content comprising the emergency information, video content comprising the emergency information, or textual content comprising the emergency information.

Example 10 may include the computer-implemented method of Examples 7-9, wherein each emergency response device of the plurality of emergency response devices is associated with a respective location, and the determining the plurality of emergency response devices further comprises determining, for each emergency response device of the plurality of emergency response devices, that a distance between the respective location and the location associated with the emergency is within a distance threshold.

Example 11 may include the computer-implemented method of Examples 7-10, wherein each emergency response device of the plurality of emergency response devices is associated with a respective location, and the determining the plurality of emergency response devices further comprises: receiving, from each emergency response device of the plurality of emergency response devices, an indication of the respective location; and determining, for each emergency response device of the plurality of emergency response devices, that a distance between the respective location and the location associated with the emergency is within a distance threshold.

Example 12 may include the computer-implemented method of Examples 7-11, wherein determining the at least one emergency response device for responding to the emergency further comprises: causing, via a user interface of the emergency management application, display of an interactive element indicative of the location associated with the emergency based on the location associated with the emergency; causing, based on the location associated with the emergency, display of a plurality of interactive elements indicative of the plurality of emergency response devices, wherein each emergency response device of the plurality of emergency response devices is associated with a respective location that is within a distance threshold for the location associated with the emergency; and receiving, based on the type of the emergency corresponding to an emergency response service provided by a user of the at least one emergency response device, a selection of an interactive element indicative of the at least one emergency response device.

Example 13 may include the computer-implemented method of Examples 7-12, wherein determining the at least one emergency response device of the plurality of emergency response devices further comprises: determining, based on the location associated with the emergency, the plurality of emergency response devices, wherein each emergency response device of the plurality of emergency response devices is associated with a respective location that is within a distance threshold of the location associated with the emergency; determining that an emergency response service provided by a user of the at least one emergency response device corresponds to the type of the emergency; and determining, based on the emergency response service, the at least one emergency response device.

Example 14 may include the computer-implemented method of Examples 7-13, further comprising: sending, to the at least one emergency response device via the emergency management application, at least one of: an indication of an optimal route to the location associated with the emergency, medical information for a user associated with the emergency, or situational information associated with the emergency.

Example 15 may include the computer-implemented method of Examples 7-14, further comprising: sending to the at least one emergency response device, via the emergency management application, based on an indication that the at least one emergency response device is at the location associated with the emergency, a request for video content.

Example 16 may include a computer-implemented method for facilitating an emergency response comprising: sending to an emergency management device, via an emergency management application, an indication of an emergency response service provided by a user of an emergency response device; receiving from the emergency management device, via the emergency management application, based on a type of an emergency corresponding to the emergency response service, a notification of the emergency; sending to the emergency management device, based on the notification, an indication of a current location associated with the emergency response device; and sending to the emergency management device, based on a distance between the emergency response device and a location associated with the emergency being within a distance threshold, an indication of an update to the current location associated with the emergency response device.

Example 17 may include the computer-implemented method of Example 16, further comprising: receiving, via the emergency management application, based at least in part on the sending the indication of the update to the current location associated with the emergency response device, additional information that indicates at least one of a status of the emergency, a description of a user associated with the emergency, an estimated time of arrival (ETA) of the emergency response device at the location associated with the emergency, or a request for a communication session between a user device at the location associated with the emergency and the emergency response device.

Example 18 may include the computer-implemented method of Examples 7-17, further comprising: receiving, via the emergency management application, at least one of audio content from a user device at the location associated with the emergency, video content from the user device, or textual content from the user device.

Example 19 may include the computer-implemented method of Examples 7-18, further comprising: receiving, via the emergency management application, at least one of an indication of an optimal route to the location associated with the emergency, medical information for a user associated with the emergency, or situational information associated with the emergency.

Example 20 may include the computer-implemented method of Examples 7-19, further comprising: causing, based on an indication that the emergency response device is at the location associated with the emergency, a user interface of the emergency management application to display a request for video content from the emergency response device.

Example 21 may include a computer-implemented method for facilitating an emergency response comprising: receiving emergency information that indicates a type of an emergency and a location associated with the emergency; determining, based on the location associated with the emergency, a plurality of emergency response devices for responding to the emergency; determining, based on the type of the emergency, at least one emergency response device of the plurality of emergency response devices for responding to the emergency; and sending, to the at least one emergency response device, a notification configured to cause a response to the emergency.

Example 22 may include the computer-implemented method of Example 21, wherein receiving the emergency information further comprises receiving the emergency information from at least one of a user device, a mobile device, a smart device, a data-sensing device, or an Internet-of-Things (IoT) device.

Example 23 may include the computer-implemented method of Examples 21-22, wherein receiving the emergency information further comprises receiving, from a user device, at least one of: audio content comprising the emergency information, video content comprising the emergency information, or textual content comprising the emergency information.

Example 24 may include the computer-implemented method of Examples 21-23, wherein each emergency response device of the plurality of emergency response devices is associated with a respective location, and the determining the plurality of emergency response devices further comprises determining, for each emergency response device of the plurality of emergency response devices, that a distance between the respective location and the location associated with the emergency is within a distance threshold.

Example 25 may include the computer-implemented method of Examples 21-24, wherein each emergency response device of the plurality of emergency response devices is associated with a respective location, and the determining the plurality of emergency response devices further comprises: receiving, from each emergency response device of the plurality of emergency response devices, an indication of the respective location; and determining, for each emergency response device of the plurality of emergency response devices, that a distance between the respective location and the location associated with the emergency is within a distance threshold.

Example 26 may include the computer-implemented method of Examples 21-25, wherein determining the at least one emergency response device for responding to the emergency further comprises: causing, via a user interface, display of an interactive element indicative of the location associated with the emergency based on the location associated with the emergency; causing, based on the location associated with the emergency, display of a plurality of interactive elements indicative of the plurality of emergency response devices, wherein each emergency response device of the plurality of emergency response devices is associated with a respective location that is within a distance threshold for the location associated with the emergency; and receiving, based on the type of the emergency corresponding to an emergency response function associated with the at least one emergency response device, a selection of an interactive element indicative of the at least one emergency response device.

Example 27 may include the computer-implemented method of Examples 21-26, wherein determining the at least one emergency response device of the plurality of emergency response devices further comprises: determining, based on the location associated with the emergency, the plurality of emergency response devices, wherein each emergency response device of the plurality of emergency response devices is associated with a respective location that is within a distance threshold of the location associated with the emergency; determining that an emergency response function associated with the at least one emergency response device corresponds to the type of the emergency; and determining, based on the emergency response function, the at least one emergency response device.

Example 28 may include the computer-implemented method of Examples 21-27, further comprising: sending, to the at least one emergency response device, information associated with the emergency.

Example 29 may include the computer-implemented method of Example 28, wherein the information associated with the emergency comprises at least one of: an indication of an optimal route to the location associated with the emergency, medical information for a user associated with the emergency, or situational information associated with the emergency.

Example 30 may include the computer-implemented method of Example 28, wherein sending the information associated with the emergency further comprises sending the information associated with the emergency via a secured communication pathway.

Example 31 may include a non-transitory computer-readable medium having instructions stored thereon that, when executed by at least one computing device, cause the at least one computing device to perform operations comprising: receiving emergency information that indicates a type of an emergency and a location associated with the emergency; determining, based on the location, a plurality of emergency response devices for responding to the emergency; determining, based on the type of the emergency, at least one emergency response device of the plurality of emergency response devices for responding to the emergency; and sending, to the at least one emergency response device, a notification configured to cause a response to the emergency.

Example 32 may include the non-transitory computer-readable medium of Example 31, the receiving the emergency information comprising receiving the emergency information from at least one of a user device, a mobile device, a smart device, a data-sensing device, or an Internet-of-Things (IoT) device.

Example 33 may include the non-transitory computer-readable medium of Examples 31-32, the receiving the emergency information comprising receiving, from a user device, at least one of: audio content comprising the emergency information, video content comprising the emergency information, or textual content comprising the emergency information.

Example 34 may include the non-transitory computer-readable medium of Examples 31-33, wherein each emergency response device of the plurality of emergency response devices is associated with a respective location, and the determining the plurality of emergency response devices comprises determining, for each emergency response device of the plurality of emergency response devices, that a distance between the respective location and the location associated with the emergency is within a distance threshold.

Example 35 may include the non-transitory computer-readable medium of Examples 31-34, wherein each emergency response device of the plurality of emergency response devices is associated with a respective location, and the determining the plurality of emergency response devices comprises: receiving, from each emergency response device of the plurality of emergency response devices, an indication of the respective location; and determining, for each emergency response device of the plurality of emergency response devices, that a distance between the respective location and the location associated with the emergency is within a distance threshold.

Example 36 may include the non-transitory computer-readable medium of Examples 31-35, the determining the at least one emergency response device for responding to the emergency comprising: causing, via a user interface, display of an interactive element indicative of the location associated with the emergency based on the location associated with the emergency; causing, based on the location associated with the emergency, display of a plurality of interactive elements indicative of the plurality of emergency response devices, wherein each emergency response device of the plurality of emergency response devices is associated with a respective location that is within a distance threshold for the location associated with the emergency; and receiving, based on the type of the emergency corresponding to an emergency response function associated with the at least one emergency response device, a selection of the interactive element indicative of the at least one emergency response device.

Example 37 may include the non-transitory computer-readable medium of Examples 31-35, the determining the at least one emergency response device of the plurality of emergency response devices comprising: determining, based on the location associated with the emergency, the plurality of emergency response devices, wherein each emergency response device of the plurality of emergency response devices is associated with a respective location that is within a distance threshold of the location associated with the emergency; determining that an emergency response function associated with the at least one emergency response device corresponds to the type of the emergency; and determining, based on the emergency response function, the at least one emergency response device.

Example 38 may include the non-transitory computer-readable medium of Examples 31-37, the operations further comprising: sending, to the at least one emergency response device, information associated with the emergency.

Example 39 may include the non-transitory computer-readable medium of Example 38, wherein the information associated with the emergency comprises at least one of: an indication of an optimal route to the location associated with the emergency, medical information for a user associated with the emergency, or situational information associated with the emergency.

Example 40 may include the non-transitory computer-readable medium of Example 38, the sending the information associated with the emergency comprising sending the information associated with the emergency via a secured communication pathway.

Example 41 may include a system for facilitating an emergency response, comprising: a memory; and at least one processor coupled to the memory and configured to: receive emergency information that indicates a type of an emergency and a location associated with the emergency; determine, based on the location, a plurality of emergency response devices for responding to the emergency; determine, based on the type of the emergency, at least one emergency response device of the plurality of emergency response devices for responding to the emergency; and send, to the at least one emergency response device, a notification configured to cause a response to the emergency.

Example 42 may include the system of Example 41, wherein to receive the emergency information, the at least one processor is further configured to receive the emergency information from at least one of a user device, a mobile device, a smart device, a data-sensing device, or an Internet-of-Things (IoT) device.

Example 43 may include the system of Examples 41-42, wherein to receive the emergency information, the at least one processor is further configured to receive, from a user device, at least one of: audio content comprising the emergency information, video content comprising the emergency information, or textual content comprising the emergency information.

Example 44 may include the system of Examples 41-43, wherein each emergency response device of the plurality of emergency response devices is associated with a respective location, and to determine the plurality of emergency response devices, the at least one processor is further configured to determine, for each emergency response device of the plurality of emergency response devices, that a distance between the respective location and the location associated with the emergency is within a distance threshold.

Example 45 may include the system of Examples 41-44, wherein each emergency response device of the plurality of emergency response devices is associated with a respective location, and to determine the plurality of emergency response devices, the at least one processor is further configured to: receive, from each emergency response device of the plurality of emergency response devices, an indication of the respective location; and determine, for each emergency response device of the plurality of emergency response devices, that a distance between the respective location and the location associated with the emergency is within a distance threshold.

Example 46 may include the system of Examples 41-45, wherein to determine the at least one emergency response device for responding to the emergency, the at least one processor is further configured to: cause, via a user interface, display of an interactive element indicative of the location associated with the emergency based on the location associated with the emergency; cause, based on the location associated with the emergency, display of a plurality of interactive elements indicative of the plurality of emergency response devices, wherein each emergency response device of the plurality of emergency response devices is associated with a respective location that is within a distance threshold for the location associated with the emergency; and receive, based on the type of the emergency corresponding to an emergency response function associated with the at least one emergency response device, a selection of the interactive element indicative of the at least one emergency response device.

Example 47 may include the system of Examples 41-46, wherein to determine the at least one emergency response device for responding to the emergency, the at least one processor is further configured to: determine, based on the location associated with the emergency, the plurality of emergency response devices, wherein each emergency response device of the plurality of emergency response devices is associated with a respective location that is within a distance threshold of the location associated with the emergency; determine that an emergency response function associated with the at least one emergency response device corresponds to the type of the emergency; and determine, based on the emergency response function, the at least one emergency response device.

Example 48 may include the system of Examples 41-46, the at least one processor further configured to: send, to the at least one emergency response device, information associated with the emergency.

Example 49 may include the system of Example 48, wherein the information associated with the emergency comprises at least one of: an indication of an optimal route to the location associated with the emergency, medical information for a user associated with the emergency, or situational information associated with the emergency.

Example 50 may include the system of Example 48, wherein to send the information associated with the emergency, the at least one processor is further configured to send the information associated with the emergency via a secured communication pathway.

Example 51 may include a computer-implemented method for facilitating an emergency response comprising: sending emergency information that indicates a type of an emergency and a location associated with the emergency; and receiving, based on the type of the emergency and the location associated with the emergency, a notification that at least one emergency response device of a plurality of emergency response devices configured to respond to the emergency is en route to the location associated with the emergency.

Example 52 may include the computer-implemented method of Example 51, wherein sending the emergency information further comprises sending the emergency information to a computing device configured with a predictive model, and the computer-implemented method further comprising: receiving, based on an output of the predictive model, an indication of an estimated time that the at least one emergency response device will arrive at the location associated with the emergency.

Example 53 may include a non-transitory computer-readable medium having instructions stored thereon that, when executed by at least one computing device, cause the at least one computing device to perform operations comprising: sending emergency information that indicates a type of an emergency and a location associated with the emergency; and receiving, based on the type of the emergency and the location, a notification that at least one emergency response device of a plurality of emergency response devices configured to respond to the emergency is en route to the location associated with the emergency.

Example 54 may include the non-transitory computer-readable medium of Example 53, the sending the emergency information comprising sending the emergency information to a computing device configured with a predictive model, and the operations further comprising: receiving, based on an output of the predictive model, an indication of an estimated time that the at least one emergency response device will arrive at the location associated with the emergency.

Example 55 may include a system for facilitating an emergency response, comprising: a memory; and at least one processor coupled to the memory and configured to: send emergency information that indicates a type of an emergency and a location associated with the emergency; and receive, based on the type of the emergency and the location, a notification that at least one emergency response device of a plurality of emergency response devices configured to respond to the emergency is en route to the location associated with the emergency.

Example 56 may include the system of Example 55, wherein to send the emergency information, the at least one processor is further configured to send the emergency information to a computing device configured with a predictive model, and the at least one processor is further configured to: receive, based on an output of the predictive model, an indication of an estimated time that the at least one emergency response device will arrive at the location associated with the emergency.

Example 57 may include a computer-implemented method for facilitating an emergency response comprising: sending, by an emergency response device, an indication of an emergency response function associated with the emergency response device; receiving, based on a type of an emergency corresponding to the emergency response function, a notification of the emergency; sending, based on the notification, an indication of a current location associated with the emergency response device; and sending, based on a distance between the emergency response device and a location associated with the emergency being within a distance threshold, an indication of an update to the current location associated with the emergency response device.

Example 58 may include a non-transitory computer-readable medium having instructions stored thereon that, when executed by at least one computing device, cause the at least one computing device to perform operations comprising: sending an indication of an emergency response function associated with an emergency response device; receiving, based on a type of an emergency corresponding to the emergency response function, a notification of the emergency; sending, based on the notification, an indication of a current location associated with the emergency response device; and sending, based on a distance between the emergency response device and a location associated with the emergency being within a distance threshold, an indication of an update to the current location associated with the emergency response device.

Example 59 may include a system for facilitating an emergency response, comprising: a memory; and at least one processor coupled to the memory and configured to: send an indication of an emergency response function associated with an emergency response device; receive, based on a type of an emergency corresponding to the emergency response function, a notification of the emergency; send, based on the notification, an indication of a current location associated with the emergency response device; and send, based on a distance between the emergency response device and a location associated with the emergency being within a distance threshold, an indication of an update to the current location associated with the emergency response device.

Example 60 may include a system for synchronizing emergency communications, comprising: a user device configured to: send, to an emergency management device, an indication of an emergency; receive, based on the indication of the emergency, at least a portion of information associated with the emergency; and cause, via a graphical user interface (GUI) associated with the user device, display of the indication of the emergency and at least the portion of the information associated with the emergency; the emergency management device configured to: receive the indication of the emergency; determine, based on the indication of the emergency, the information associated with the emergency; and send, to an emergency service provider device, the indication of the emergency and the information associated with the emergency; the emergency service provider device configured to: receive the indication of the emergency and the information associated with the emergency; cause, via a GUI associated with the emergency service provider device, display of the indication of the emergency and the information associated with the emergency; and send, to the emergency management device, a request to send the indication of the emergency and the information associated with the emergency to an emergency response device; the emergency response device configured to: receive the indication of the emergency and the information associated with the emergency; and cause, via a GUI associated with the emergency response device, display of the indication of the emergency and the information associated with the emergency; and the emergency management device further configured to: determine, based on at least a current location of the emergency response device, the information associated with the emergency, wherein the information associated with the emergency indicates the current location of the emergency response device; send, based on the request from the emergency service provider device, the indication of the emergency and the information associated with the emergency to the emergency response device; and send, to the user device, at least the portion of the information associated with the emergency, wherein the portion of the information associated with the emergency indicates, based on the current location of the emergency response device, an estimated time of arrival (ETA) of the emergency response device at a location of the emergency, wherein the indication of the emergency and the information associated with the emergency sent to the emergency service provider device, the indication of the emergency and the information associated with the emergency sent to the emergency response device, and the at least the portion of the information associated with the emergency sent to the user device are sent simultaneously.

Example 61 may include the system of Example 60, wherein the at least the portion of the information associated with the emergency comprises at least one of: first aid instructions, directions to a medical facility, or multimedia content associated with the emergency.

Example 62 may include the system of Examples 60-61, wherein the emergency management device is further configured to receive additional information associated with the emergency.

Example 63 may include the system of Example 62, wherein the additional information associated with the emergency indicates at least one of an update to the current location of the emergency response device or a current location of the user device.

Example 64 may include the system of Example 62, wherein the additional information associated with the emergency indicates a status of the emergency.

Example 65 may include the system of Examples 60-64, wherein the user device is further configured to send the indication of the emergency to the emergency management device via an application programming interface (API).

Example 66 may include the system of Examples 60-65, wherein the emergency management device is further configured to: receive the indication of the emergency; and send the indication of the emergency to the emergency service provider device via an application programming interface (API).

Example 67 may include the system of Examples 60-66, wherein the emergency service provider device is further configured to: receive the indication of the emergency and the information associated with the emergency; cause display of the indication of the emergency and the information associated with the emergency, and send the request to send the indication of the emergency and the information associated with the emergency to the emergency response device via an application programming interface (API).

Example 68 may include the system of Examples 60-67, wherein the emergency response device is further configured to: receive the indication of the emergency and the information associated with the emergency; and cause display of the indication of the emergency and the information associated with the emergency via an application programming interface (API).

Example 69 may include the system of Examples 60-68, wherein the user device is operated by an emergency monitoring center, wherein the emergency is associated with a subscriber of the emergency monitoring center.

Example 70 may include the system of Examples 60-69, wherein the emergency response management device is further configured to: receive information that indicates a type of the emergency and a location associated with the emergency; determine, based on the location associated with the emergency, a plurality of emergency response devices for responding to the emergency; and determine, based on the type of the emergency, the emergency response device from the plurality of emergency response devices.

Example 71 may include the system of Examples 60-69, wherein the emergency response management device is further configured to: receive, from the emergency response device, the ETA.

Example 72 may include the system of Example 71, wherein the emergency response management device is further configured to: validate the ETA; and send, to the user device, an indication of the validated ETA.

Example 73 may include the system of Example 72, wherein the emergency response management device configured to validate the ETA, is further configured to: determine, based on the current location of the emergency response device and the location of the emergency, an estimated travel path for the emergency response device; determine a plurality of network devices along the estimated travel path; determine, based on a time-stamped indication of a first location of the emergency response device received from a first network device of the plurality of network devices and a time-stamped indication of a second location of the emergency response device received from a second network device of the plurality of network devices, a velocity of the emergency response device; determine, based on the velocity and the location of the emergency, another ETA for the emergency response device at the location of the emergency; and validate, based on a match between the ETA and the another ETA, the ETA.

Example 74 may include the system of Examples 60-73, wherein the emergency response management device is further configured to: receive a request to establish a communication session between the user device and the emergency response device; and establish, based on the request, the communication session, wherein the communication session is configured to communicate at least one of audio content, video content, or textual content.

Example 75 may include the system of Example 74, wherein to receive the request to establish the communication session, the emergency response management device is further configured to: receive the request to establish the communication session from at least one of the user device or the emergency response device.

Example 76 may include a system for synchronizing emergency communications, comprising: a memory; and at least one processor coupled to the memory and configured to: receive, from a user application, an indication of an emergency; determine, based on the indication of an emergency, emergency information, wherein the emergency information indicates a type of the emergency and a location associated with the emergency; determine, based on the type of the emergency and the location associated with the emergency, an emergency responder of a plurality of emergency responders within a proximity to the location associated with the emergency; determine, based on a current location of the emergency responder and the location associated with the emergency, an estimated time of arrival (ETA) of the emergency responder at the location associated with the emergency; update, based on information from multilateration communications between the emergency responder and a plurality of network components along a travel path between the current location of the emergency responder and the location associated with the emergency, the ETA; and send the emergency information to a responder application associated with the emergency responder and at least a portion of the emergency information to the user application, wherein at least the portion of the emergency information indicates the updated ETA.

Example 77 may include the system of Example 76, wherein to determine the emergency responder, the at least one processor is further configured to: cause an emergency service provider application to display, via a graphical user interface (GUI) associated with the emergency service application, an interactive element indicative of the location associated with the emergency; cause, based on the type of the emergency and the location associated with the emergency, display of a plurality of interactive elements indicative of the plurality of emergency responders, wherein each emergency responder of the plurality of emergency responders is associated with a respective location that is within the proximity to the location associated with the emergency; and receive, based on a selection of the interactive element indicative of the emergency responder, an indication of the emergency responder.

Example 78 may include the system of Examples 76-77, wherein to determine the ETA, the at least one processor further configured to: determine the ETA based on at least on of: an output of a predictive model, an indication of the current location of the emergency responder received from the emergency responder, or an indication of the ETA received from the emergency responder.

Example 79 may include the system of Examples 76-78, wherein the at least one processor is further configured to: determine, based on the type of the emergency, at least one emergency support facility; and send to the user application, based on the location associated with the emergency, directions to the at least one emergency support facility.

Example 80 may include the system of Examples 76-79, wherein the at least one processor is further configured to: cause the emergency responder to display the emergency information via a emergency responder application and the user application to display at least the portion of the emergency information.

Example 81 may include the system of Example 80, wherein to cause the emergency responder application to display the emergency information and the user application to display at least the portion of the emergency information, the at least one processor is further configured to: send the emergency information to the emergency management application and at least the portion of the emergency information to the user application simultaneously.

Example 82 may include the system of Examples 76-81, wherein the at least one processor is further configured to: receive, from the user application, additional information associated with the emergency; and send, to the emergency responder, the additional information.

Example 83 may include the system of Examples 76-82, wherein the additional information associated with the emergency comprises at least one of audio content, video content, or textual content.

Example 84 may include A system for synchronizing emergency communications, comprising: a memory; and at least one processor coupled to the memory and configured to: receive via an emergency responder application configured with an emergency responder, based on the emergency responder being within a proximity to an emergency, emergency information, wherein the emergency information indicates a type of the emergency and a location associated with the emergency; send to an emergency service provider application, based on a current location of the emergency responder and the location associated with the emergency, an estimated time of arrival (ETA) of the emergency responder at the location associated with the emergency, wherein the emergency service provider application is configured to: validate, based on information from multilateration communications between the emergency responder and a plurality of network components along a travel path between the current location of the emergency responder and the location associated with the emergency, the ETA, and send, to a user application, the validated ETA; send to the emergency service provider application, based on an update to the current location of the emergency responder and the location associated with the emergency, an update to the ETA, wherein the emergency service provider application is configured to: validate, based on additional information from multilateration communications between the emergency responder and a least a portion of the plurality of network components along the travel path between the updated current location of the emergency responder and the location associated with the emergency, the updated ETA, and send, to a user application, the updated ETA.

Example 85 may include A system for synchronizing emergency communications, comprising: a memory; and at least one processor coupled to the memory and configured to: send, via a user application, an indication of an emergency, wherein an emergency service provider application is configured to determine, based on the indication of the emergency, emergency information, wherein the emergency information indicates a type of the emergency and a location associated with the emergency; receive from the emergency service provider application, based on the type of the emergency, the location associated with the emergency, and a current location of an emergency responder, an indication of a validated estimated time of arrival (ETA) of the emergency responder at the location associated with the emergency, wherein the validated ETA is validated based on information from multilateration communications between the emergency responder and a plurality of network components along a travel path between the current location of the emergency responder and the location associated with the emergency; and receive from an emergency service provider application, based on an update to the current location of the emergency responder and the location associated with the emergency, a validated update to the ETA, wherein the validated update to the ETA is validated based on additional information from multilateration communications between the emergency responder and a least a portion of the plurality of network components along the travel path between the updated current location of the emergency responder and the location associated with the emergency.

The breadth and scope of the disclosure should not be limited by any of the above-described examples, aspects, and/or embodiments, but should be defined only in accordance with the following claims and their equivalents.

What is claimed is:

1. A system for facilitating an emergency response comprising:
one or more memories; and
at least one processor each coupled to at least one of the memories and configured to perform operations comprising:
receiving emergency information that indicates a type of an emergency and a location associated with the emergency;
causing, based on the type of the emergency, the location associated with the emergency, and an indication of an emergency response service provided by a user of an emergency response device, a first user interface of an emergency management application to display a notification of the emergency, wherein the first user interface is displayed by the emergency response device;
determining an optimal route that includes:
a shortest path of a plurality of paths between a location of the emergency response device and the location associated with the emergency, and
acceptable network conditions determined from an operational status of one or more network devices along the plurality of paths between the location of the emergency response device and the location associated with the emergency, wherein the operational status of the one or more network devices satisfies an a operational threshold;
causing the first user interface to display an indication of the optimal route; and
causing, based on an indication of the location of the emergency response device, a second user interface of the emergency management application to display a notification indicating that the emergency response device is en route to the location associated with the emergency.

2. The system of claim 1, wherein the second user interface is displayed by at least one of a user device, a public safety agency device, or a private monitoring center device.

3. The system of claim 1, wherein the causing the second user interface to display the notification indicating that the emergency response device is en route to the location associated with the emergency is further based on the location associated with the emergency and the location of the emergency response device being within a threshold distance.

4. The system of claim 1, the operations further comprising:
causing the first user interface to display at least one of an optimal route to the location associated with the emergency, medical information for a user associated with the emergency, or situational information associated with the emergency.

5. The system of claim 1, the operations further comprising:
causing the first user interface to display at least one of the emergency information that indicates the type of the emergency or the location associated with the emergency.

6. The system of claim 1, wherein the emergency information comprises at least one of: audio content, video content, or textual content.

7. The system of claim 1, the operations further comprising:
receiving different emergency information that indicates a type of a different emergency and a location associated with the different emergency;
receiving a respective indication of an emergency response service provided by a respective user of each emergency response device of a plurality of emergency response devices and a respective indication of a location for each emergency response device of the plurality of emergency response devices;
selecting, based on the respective indication of the emergency response service provided by the respective user of at least one emergency response device of the plurality of emergency response devices matching the different emergency and the respective indication of the location for the at least one emergency response device being within a distance threshold of the location associated with the different emergency, the at least one emergency response device; and
causing, based on the selecting the at least one emergency response device, a third user interface of the emergency management application to display a notification of the different emergency and an indication of the location associated with the different emergency, wherein the third user interface is displayed by the at least one emergency response device.

8. The system of claim 1, the operations further comprising:
causing, based on an indication that the emergency response device is at the location associated with the emergency, the first user interface of the emergency management application to display a request for video content from the emergency response device.

9. The system of claim 1, the operations further comprising:
establishing, via the emergency management application and based on an interaction with at least one of the first user interface or the second user interface, a communication session between a user device associated with the second user interface and the emergency response device.

10. The system of claim 1, the operations further comprising:
causing a third user interface of the emergency management application to display at least one of the emergency information or the indication of the location of the emergency response device, wherein the third user interface is displayed by a Public Safety Answering Point (PSAP) device.

11. The system of claim 1, wherein the emergency response service provided by the user of the emergency response device comprises at least one of firefighter service, police service, emergency medical service, or roadside assistance service.

12. A computer-implemented method for facilitating an emergency response comprising:
receiving emergency information that indicates a type of an emergency and a location associated with the emergency;
causing, based on the type of the emergency, the location associated with the emergency, and an indication of an emergency response service provided by a user of an emergency response device, a first user interface of an emergency management application to display a notification of the emergency, wherein the first user interface is displayed by the emergency response device;
determining an optimal route that includes:
a shortest path of a plurality of paths between a location of the emergency response device and the location associated with the emergency, and
acceptable network conditions determined from an operational status of one or more network devices along the plurality of paths between the location of the emergency response device and the location associated with the emergency, wherein the operational status of the one or more network devices satisfies an a operational threshold;
causing the first user interface to display an indication of the optimal route; and
causing, based on an indication of the location of the emergency response device, a second user interface of the emergency management application to display a notification indicating that the emergency response device is en route to the location associated with the emergency.

13. The computer-implemented method of claim 12, wherein the causing the second user interface to display the notification indicating that the emergency response device is en route to the location associated with the emergency is further based on the location associated with the emergency and the location of the emergency response device being within a threshold distance.

14. The computer-implemented method of claim 12, further comprising:
causing the first user interface to display at least one of an optimal route to the location associated with the emergency, medical information for a user associated with the emergency, or situational information associated with the emergency.

15. The computer-implemented method of claim 12, further comprising:
causing the first user interface to display at least one of the emergency information that indicates the type of the emergency or the location associated with the emergency.

16. The computer-implemented method of claim 12, wherein the emergency information comprises at least one of: audio content, video content, or textual content.

17. The computer-implemented method of claim 12, further comprising:
receiving different emergency information that indicates a type of a different emergency and a location associated with the different emergency;
receiving a respective indication of an emergency response service provided by a respective user of each emergency response device of a plurality of emergency response devices and a respective indication of a location for each emergency response device of the plurality of emergency response devices;
selecting, based on the respective indication of the emergency response service provided by the respective user of at least one emergency response device of the plurality of emergency response devices matching the different emergency and the respective indication of the location for the at least one emergency response device being within a distance threshold of the location associated with the different emergency, the at least one emergency response device; and
causing, based on the selecting the at least one emergency response device, a third user interface of the emergency management application to display a notification of the different emergency and an indication of the location associated with the different emergency, wherein the third user interface is displayed by the at least one emergency response device.

18. The computer-implemented method of claim 12, further comprising:
causing, based on an indication that the emergency response device is at the location associated with the emergency, the first user interface of the emergency management application to display a request for video content from the emergency response device.

19. The computer-implemented method of claim 12, further comprising:
establishing, via the emergency management application and based on an interaction with at least one of the first user interface or the second user interface, a communication session between the emergency response device and the at least one of a user device, a public safety agency device, or a private monitoring center device.

20. The computer-implemented method of claim 12, further comprising:
causing a third user interface of the emergency management application to display at least one of the emergency information or the indication of the location of the emergency response device, wherein the third user interface is displayed by a Public Safety Answering Point (PSAP) device.

21. The computer-implemented method of claim 12, wherein the emergency response service provided by the user of the emergency response device comprises at least one of firefighter service, police service, emergency medical service, or roadside assistance service.

* * * * *

UNITED STATES PATENT AND TRADEMARK OFFICE
CERTIFICATE OF CORRECTION

PATENT NO. : 12,382,269 B2
APPLICATION NO. : 17/823302
DATED : August 5, 2025
INVENTOR(S) : Cabanas et al.

Page 1 of 1

It is certified that error appears in the above-identified patent and that said Letters Patent is hereby corrected as shown below:

In the Claims

In Column 61, Claim 1, Line 67, delete "an a" and insert -- an --, therefor.

In Column 63, Claim 12, Line 48, delete "an a" and insert -- an --, therefor.

Signed and Sealed this
Ninth Day of September, 2025

Coke Morgan Stewart
*Acting Director of the United States Patent and Trademark Office*